US010250693B2

(12) United States Patent
Colrain et al.

(10) Patent No.: US 10,250,693 B2
(45) Date of Patent: *Apr. 2, 2019

(54) IDEMPOTENCE FOR DATABASE TRANSACTIONS

(71) Applicant: Oracle International Corporation, Redwood Shores, CA (US)

(72) Inventors: Carol L. Colrain, Redwood Shores, CA (US); Stefan Heinrich Roesch, San Mateo, CA (US); Kevin S. Neel, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 506 days.

This patent is subject to a terminal disclaimer.

(21) Appl. No.: 14/587,570

(22) Filed: Dec. 31, 2014

(65) Prior Publication Data
US 2015/0172390 A1 Jun. 18, 2015

Related U.S. Application Data

(63) Continuation of application No. 13/448,258, filed on Apr. 16, 2012, now Pat. No. 8,984,170, which is a
(Continued)

(51) Int. Cl.
*H04L 29/06* (2006.01)
*H04L 29/08* (2006.01)

(52) U.S. Cl.
CPC .......... *H04L 67/142* (2013.01); *H04L 67/146* (2013.01); *H04L 67/148* (2013.01); *H04L 67/42* (2013.01)

(58) Field of Classification Search
CPC ..... H04L 67/142; H04L 67/42; H04L 67/146; H04L 67/148
See application file for complete search history.

(56) References Cited

U.S. PATENT DOCUMENTS 6,041,357 A 3/2000 Kunzelman et al.
6,442,552 B1 * 8/2002 Frolund ............ G06F 17/30861
707/613

(Continued)

OTHER PUBLICATIONS

Colle et al., "Oracle Database Replay," ACM, 2009 (4 pages).
(Continued)

*Primary Examiner* — Michael A Keller
*Assistant Examiner* — Austin J Moreau
(74) *Attorney, Agent, or Firm* — Hickman Palermo Becker Bingham LLP

(57) ABSTRACT

A method, machine, and computer-readable medium is provided for managing transactional sets of commands sent from a client to a server for execution. A server receives, from a client in a second session, a request that identifies a set of commands that were sent by the client in a first session. The set of commands comprises one or more transactions. The server determines that at least one transaction of the one or more transactions in the set of commands has not committed. Based at least in part on determining that the at least one transaction of the one or more transactions has not committed, the server blocks, from the second session, completion of the at least one transaction in the first session to prevent committing of the at least one transaction in the first session.

20 Claims, 15 Drawing Sheets

Related U.S. Application Data continuation-in-part of application No. 13/229,641, filed on Sep. 9, 2011, now Pat. No. 8,549,154.

(56) References Cited

U.S. PATENT DOCUMENTS

| | | |
|---|---|---|
| 6,728,747 B1 | 4/2004 | Jenkins et al. |
| 7,536,462 B2 | 5/2009 | Pandya |
| 7,539,746 B2 | 5/2009 | Bankier et al. |
| 7,552,218 B2 | 6/2009 | Kaluskar et al. |
| 7,631,107 B2 | 12/2009 | Pandya |
| 7,761,435 B2 | 7/2010 | Stanev et al. |
| 7,849,173 B1 | 12/2010 | Uhlik |
| 7,849,177 B2 | 12/2010 | Uhlik |
| 7,853,698 B2 | 12/2010 | Stanev et al. |
| 8,005,966 B2 | 8/2011 | Pandya |
| 8,024,299 B2 | 9/2011 | Dias et al. |
| 2003/0028654 A1 | 2/2003 | Ablanic et al. |
| 2003/0131045 A1 | 7/2003 | McGee et al. |
| 2003/0204769 A1 | 10/2003 | Coughlin |
| 2004/0015600 A1 | 1/2004 | Tiwary et al. |
| 2004/0216109 A1 | 10/2004 | Bhogi et al. |
| 2005/0021514 A1 | 1/2005 | Barga et al. |
| 2005/0038848 A1 | 2/2005 | Kaluskar |
| 2005/0131879 A1 | 6/2005 | Ghosh et al. |
| 2005/0186975 A1 | 8/2005 | Yach et al. |
| 2005/0228834 A1 | 10/2005 | Shinkai |
| 2006/0036617 A1 | 2/2006 | Bastawala |
| 2007/0067266 A1 | 3/2007 | Lomet |
| 2007/0261054 A1 | 11/2007 | Chesebro et al. |
| 2008/0010240 A1 | 1/2008 | Zait |
| 2008/0097960 A1 | 4/2008 | Dias et al. |
| 2008/0097961 A1 | 4/2008 | Dias et al. |
| 2008/0097995 A1 | 4/2008 | Dias et al. |
| 2008/0097996 A1 | 4/2008 | Dias et al. |
| 2008/0098003 A1 | 4/2008 | Dias et al. |
| 2008/0098048 A1 | 4/2008 | Cao et al. |
| 2008/0134219 A1 | 6/2008 | Dorrance et al. |
| 2008/0228834 A1 | 9/2008 | Burchall et al. |
| 2009/0182787 A1* | 7/2009 | Parkinson ............... G06F 17/30 |
| 2009/0327468 A1* | 12/2009 | Hirsch ..................... G06F 9/54 709/223 |
| 2010/0005097 A1 | 1/2010 | Liang et al. |
| 2010/0030818 A1 | 2/2010 | Cooper et al. |
| 2010/0042601 A1 | 2/2010 | Kelley et al. |
| 2010/0063982 A1* | 3/2010 | Lawrence ......... G06F 17/30731 707/794 |
| 2010/0179645 A1 | 7/2010 | Chen et al. |
| 2010/0293137 A1 | 11/2010 | Zuckerman et al. |
| 2010/0318394 A1 | 12/2010 | Nayak et al. |
| 2011/0212783 A1 | 9/2011 | Dale |
| 2011/0218981 A1 | 9/2011 | Retnakumari et al. |
| 2011/0258630 A1* | 10/2011 | Fee ....................... G06F 9/4843 718/101 |
| 2012/0179645 A1 | 7/2012 | Lomet et al. |
| 2013/0066837 A1 | 3/2013 | Colrain et al. |
| 2013/0066949 A1 | 3/2013 | Colrain et al. |
| 2013/0066952 A1 | 3/2013 | Colrain et al. |
| 2013/0066955 A1 | 3/2013 | Neel et al. |
| 2013/0297566 A1 | 11/2013 | Colrain |
| 2013/0304714 A1 | 11/2013 | Lee et al. |
| 2014/0095547 A1 | 4/2014 | Guo et al. |
| 2014/0229531 A1 | 8/2014 | Neel et al. |

OTHER PUBLICATIONS

"Database Replay", Oracle White Paper, 2007 (19 pages).

Galanis et al., "Oracle Database Replay," ACM, 2008, pp. 1159-1170 (12 pages).

European Patent Office, "Office Action", in application No. PCT/US2012/054326, dated Jan. 3, 2013, 11 pages.

Current Claims in application No. PCT/US2012/054326, dated Jan. 2013, 4 pages.

Colrain, U.S. Appl. No. 15/009,660, filed Jan. 28, 2016, Office Action dated Aug. 10, 2018.

* cited by examiner

IDEMPOTENCE FOR DATABASE TRANSACTIONS

BENEFIT CLAIM; CROSS-REFERENCE TO RELATED APPLICATIONS

This application is a continuation of prior U.S. patent application Ser. No. 13/448,258, entitled IDEMPOTENCE FOR DATABASE TRANSACTIONS, filed Apr. 16, 2012 which is a Continuation-in-part of application Ser. No. 13/229,641, issued as U.S. Pat. No. 8,549,154, entitled "RECOVERING STATEFUL READ-ONLY DATABASE SESSIONS," filed Sep. 9, 2011, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

This application is related to and filed on the same date as the Application having Ser. No. 13/448,267, also entitled "Idempotence For Database Transactions," the entire contents of which is incorporated by reference as if fully set forth herein.

This application is also related to (1) U.S. Pat. No. 7,747,754, entitled "Transparent Migration Of Stateless Sessions Across Servers," filed Aug. 12, 2004, the entire contents of which is incorporated by reference as if fully set forth herein; (2) U.S. Pat. No. 7,502,824, entitled "Database Shutdown With Session Migration," filed May 1, 2006, the entire contents of which is incorporated by reference as if fully set forth herein; (3) U.S. Pat. No. 7,552,218, entitled "Transparent Session Migration Across Servers," filed Aug. 12, 2004, the entire contents of which is incorporated by reference as if fully set forth herein; (4) U.S. Pat. No. 7,415,470, entitled "Capturing And Re-Creating The State Of A Queue When Migrating A Session," filed May 17, 2005, the entire contents of which is incorporated by reference as if fully set forth herein; (5) U.S. Pat. No. 7,634,512, entitled "Migrating Temporary Data Of A Session," filed Apr. 4, 2007, the entire contents of which is incorporated by reference as if fully set forth herein; (6) U.S. patent application Ser. No. 13/076,313, entitled "Application Workload Capture And Replay System," filed Mar. 30, 2011, the entire contents of which is incorporated by reference as if fully set forth herein.

TECHNICAL FIELD

The technical field relates to managing transactional sets of commands sent from a client to a server for execution.

BACKGROUND

Servers and Clients

A server is an operating software process that provides a service to one or more clients. The server may be a server instance of several different server instances of related software that are operating to provide services to clients. Clients communicate with servers on server connections. In particular, clients send commands to servers, and the servers execute the commands and, optionally, send results back to the clients. As used herein, a server "operation" refers to a function, procedure, or other action taken by the server pursuant to executing one or more commands the client. A single command may trigger multiple server operations or may correspond to a single server operation. For example, some commands may request the server to return results in addition to performing a data manipulation function. Other commands may merely request confirmation that data manipulation commands were performed, or may not request any response.

A client may request execution of a set of commands that are specified in the request. In response, the server may execute the set of commands and confirm, to the client, that the set of commands were executed. For example, the server may provide results to the client or may merely provide an indication that the set of commands were executed. The connection between the server and the client may become unavailable at any time, planned or unplanned. For example, the server may fail, or a network device or other resource supporting the connection between the server and the client may fail. If the connection between the server and the client becomes unavailable before the server has responded to a set of commands, the client is unable to determine whether or not the set of commands has been completed.

Database servers and database applications are provided herein as examples of servers and clients, respectively. However, various techniques described herein may apply to any server-client system.

Database Instances

A database comprises data and metadata that is stored on one or more storage devices, such as a hard disk, a stick of random access memory, a cluster or a cloud storage system. Such data and metadata may be stored in a database logically, for example, according to relational and/or object-relational database constructs. A database application interacts with an instance of a database server ("database instance") by submitting, to the database instance, commands that cause the database instance to perform operations on data stored in a database. A database command is a request to access or modify data from a database. The command may cause the database instance to perform operations on the data in the database and/or return the data from the database.

In a multi-node database system, a database may be served by multiple database instances, and each database instance may be configured to access all or part of the database. An instance of a server is a combination of integrated software components, such as one or more processes executing on one or more computing devices, and an allocation of computational resources, such as memory, storage, or processor cycles, for executing the integrated software components on a processor. A database instance is a combination of integrated software components and an allocation of computational resources for accessing, modifying, or otherwise using a database. Database instances may be grouped into logical domains called services. Multiple database instances may be installed or configured on a single machine or on separate machines. When processing database commands, a database instance may access the database or a cache of information from the database. In one example, the database is stored in non-volatile memory, and the cache is stored in volatile memory.

When multiple database sessions share access to the same data, user commands executed in a session may lock a portion of the database while the portion is in use by a database instance serving the session. For example, the user session may lock the portion for exclusive read and/or write access, and other user sessions are prevented from accessing and/or modifying the portion while the portion is locked.

The user session then releases the lock when the database instance is finished accessing and/or modifying that portion of the database. After the lock is released, other instances may access and/or modify the portion or obtain a lock on the portion.

Database commands may be submitted to a database instance in the form of database statements that conform to a database language supported by the database instance. One non-limiting example of a database language supported by many database instances is a Data Manipulation Language ("DML") called Structured Query Language ("SQL"), including proprietary forms of SQL supported by such database servers as Oracle®, (e.g. Oracle® Database 11 g). SQL data definition language ("DDL") instructions are issued to a database server to create or configure database objects, such as tables, views, or complex types. Although SQL is mentioned as one example, there are many other example database languages and exposed interfaces to the database, any of which may be used in conjunction with the techniques described herein.

Procedural Language/Structured Query Language ("PL/SQL") extends SQL by providing constructs found in procedural languages, resulting in a structural language that is more powerful than standard SQL. PL/SQL commands are organized into blocks of variable declarations, sub-commands that include procedural and SQL commands, and exception-handling commands. PL/SQL commands may be sent to a database server to cause the database server to perform a variety of actions as the PL/SQL commands are executed. The database server may also receive and execute Java-based commands, remote procedure call commands, or commands that conform to other programming languages or constructs.

Multiple database commands may be sent from a database client to the database instance in a single request to perform work. The database commands may be processed by the database instance, and the database instance may return results to the database client in a single response to all commands that were submitted in the request. Handling multiple commands in a single roundtrip request and response may result in an efficient use of database connections. In other words, clients generally use database connections to submit requests less frequently when multiple commands are allowed to be submitted on the requests that use the database connections.

Applications and Logical Connections

Servers, such as mid-tier servers, provide database instance connections to applications that request information from a database. A mid-tier server is a server that provides access to one or more database servers, distributes work to one or more database servers, or manages connections to one or more database servers. An application is any logic running on one or more computing devices that uses a database connection to retrieve information from the database. The retrieved information may be presented or displayed to a user of the application. For example, the application may be accessed from a browser, where the application receives input from the user and presents information to the user. The application may be an application that is accessed through a web portal, over a network, by the user, an application that is installed on a machine of the user, or an application that is distributed among multiple machines.

In one example, an Oracle® Fusion® Application is specially configured to retrieve data from an Oracle® database, and display the information to a user of the Fusion® Application. Applications other than Oracle® Fusion® Applications currently exist, and other database applications may be developed in the future without departing from the present disclosure.

In one example, an application issues a request to a mid-tier server for data from a database. The request may or may not be sent in response to user input. The mid-tier server selects a free connection from a connection pool of free connections to database instances. A database connection that has been selected and/or customized for use by a client or group of clients is referred to herein as a "database session." A database connection may be customized to meet particular needs as a database session for a particular client, or the connection may be generalized such that the connection can be used to support a variety of database sessions for a variety of clients. The mid-tier server sends the client request on the selected connection to a database instance, and the database instance accesses a database to handle the request. The database server processes the request by retrieving or modifying data in the database or by retrieving or modifying the data in a cache of data from the database. The database server establishes state for the database session as the database server processes the request.

Mid-tier servers often maintain connection pools, which include connections to database instances. The connection may refer to either a physical mechanism, such as a physical port, or a logical configuration, or both. There may be a one-to-one mapping of logical connections (i.e., database sessions) to physical connections. On the other hand, there may be more than one logical connection associated with a single physical connection. In one example, the free connections in the connection pool include only those connections that are not allocated to applications for processing requests. As work completes, connections are returned to the connection pool and are available for subsequent applications to borrow from the pool.

In one example, the mid-tier server assigns a logical connection to an application that is requesting access to the database. The logical connection is mapped, directly or indirectly, to one of a plurality of physical connections. The logical connection may be re-assigned to new physical connections without re-assigning a new logical connection to the application. The logical connection may be exposed to the application, and the application may continue to reference the same logical connection as the underlying physical connections change. In one example, a particular logical connection is represented as a connection object that is exposed to the application and that is mapped to another connection object, which may or may not be exposed to the application, and which may or may not be another logical connection. Through a hierarchy of logical connections, the particular logical connection is mapped to a physical connection.

Effect of Database Session Unavailability on the Application

As an application uses a database session to access a database, the application builds up state on the database session. For example, application uses the database session to obtain locks, create temporary variables or database objects, establish user-specific information, establish application-specific information, establish cursor information, create temporary arrangements or selections of data, and/or perform other partially completed operations on data for further processing in the database session. If the database session fails before the further processing occurs, the locks, temporary variables or database objects, user-specific information, application-specific information, cursor information, temporary arrangements or selections of data, and/or the partially completed operations become unavailable to the application, even if the application attempts to reference this information in a new database session.

In one example, the database session may fail or otherwise becomes unavailable if a database instance upon which the database session depends fails or otherwise becomes unavailable. In most cases, failure of the database session causes the application to fail as the in-progress database session is lost. The application's user must restart the application or components of the application and start over with logging in, opening cursors and retrieving data, obtaining locks, creating temporary variables or database objects, establishing user-specific information, establishing application-specific information, establishing cursor information, creating temporary arrangements or selections of data, and/or partially completing operations on data for further processing in the database session. In one example, upon failure of the database session, the user may be left hanging with a blue screen or interrupted with an error message.

In prior client-server systems, if there is a break between the client and the server, the client sees an error message indicating that the communication failed. This error does not inform the client whether the submission executed any commit operations or if a procedural call, ran to completion executing all expected commits and session state changes or failed part way through or yet worse, is still running disconnected from the client.

If the client wanted to know whether the submission to the database was committed, the client could have added custom exception code to query the outcome for every possible commit point in the application. Given that a system can fail anywhere, this is impractical in general as the query must be specific to each submission. After an application is built and is in production, this is completely impractical. Moreover, a query cannot give an accurate answer because the transaction could commit immediately after that query executed. Indeed, following a communication failure, the server may still be running the submission not yet aware that the client has disconnected. For a PL/SQL or Java operation, or other procedure submitted to the database, there is no record for as to whether the procedural submission ran to completion or was aborted part way through. While it may have committed, subsequent work may not have been done for that procedure.

Failing to recognize that the last submission has committed or shall commit sometime soon or has not run to completion can lead to duplicate transaction submissions and other forms of "logical corruption" as users and software might try to re-issue already persisted changes.

Existing technologies do not provide information about the work that was being executed by the resource when the resource became unavailable. For example, the application is not aware of the outcome of the last operation being processed by the resource in case of outages, planned or unplanned. If a server goes down while executing a set of commands, and before the server sends a response to a client for the set of commands, the client is unaware of whether the set of commands was executed by the server before the outage. Even highly complex applications may expose outages to the end users.

Users experiencing resource outages may be frustrated and may lose revenue due to missed business opportunities, decisions made using bad data, troubleshooting expenses, and lost time in restarting the application or redoing the work. Some applications warn the user not to hit the submit button twice, and, when not the warning is not heeded by users, duplicate transactions may be created if both submissions are allowed to complete.

In another example, once the database session has failed, the user may be prevented from entering any information or causing any commands to be submitted to the database before the page is reloaded. Also, reloading the page without checking what data was stored to the database could lead to a duplicate submission. The application may prevent the user from submitting any commands that depend on the state that was lost in the failed database session or may misbehave if needed information is no longer available. In a particular example, fields already presented to the user may be grayed to indicate that, in order to avoid corrupting data stored in the database, the fields can no longer be modified by the application.

Even if the database session fails over to a second database instance, the second database instance may not have any information about the database session beyond what was committed to the database prior to the failure. In order to avoid corrupting the data in the database, applications may reset the information that is displayed to the user to information that matches the data already committed to the database. In other words, when a database instance fails, a user may lose temporary information that would have been available to the user just prior to the failure. Some of the lost information may correspond to information that was being displayed, modified, selected, or arranged by the application and/or user that was using a now unavailable database session, or information that was about to be returned to the application and/or user on the now unavailable database session. The user is often forced to re-enter fields of data again.

The loss of information already entered, modified, selected, and/or arranged by a user may result in user frustration and wasted time in re-entry, re-modification, re-selection, and/or re-arrangement of the information after the application or application component has restarted. The lost information may be information that was retrieved by the user from others, for example, by video, voice, email, or text message. In some cases, the lost information may no longer be retrievable. Losing information can be particularly costly when the user is being assisted by a support service provider as the failure occurs. Loss of information may require further communications with the support service provider, or may even cause the user to lose faith in the reliability of the application, the mid-tier server, or the database server, or the company that provides the application, the mid-tier server, and/or the database server. Further, the user may be selecting, entering, or modifying time-sensitive information prior to failure. Requiring the user to re-enter the time-sensitive information after the failure may result in a delay that causes loss of business, value, or reputation of the user to business clients or business ventures of the user. Requiring re-entry may also result in a loss of opportunity for the user. For example, the user may miss out on items or opportunities that the user had previously selected.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Fast Application Notification

Application developers develop applications that deal with reported outages of underlying software, hardware, underlying communication layers, or other resources in a server-client system. For example, since Oracle 10 g, Fast Application Notification ("FAN") delivers notifications to applications when a resource comes up (i.e., becomes available) or goes down (i.e., becomes unavailable), and application developers may customize their applications to change application behavior in response to the notifications.

DETAILED DESCRIPTION

Figure 1:
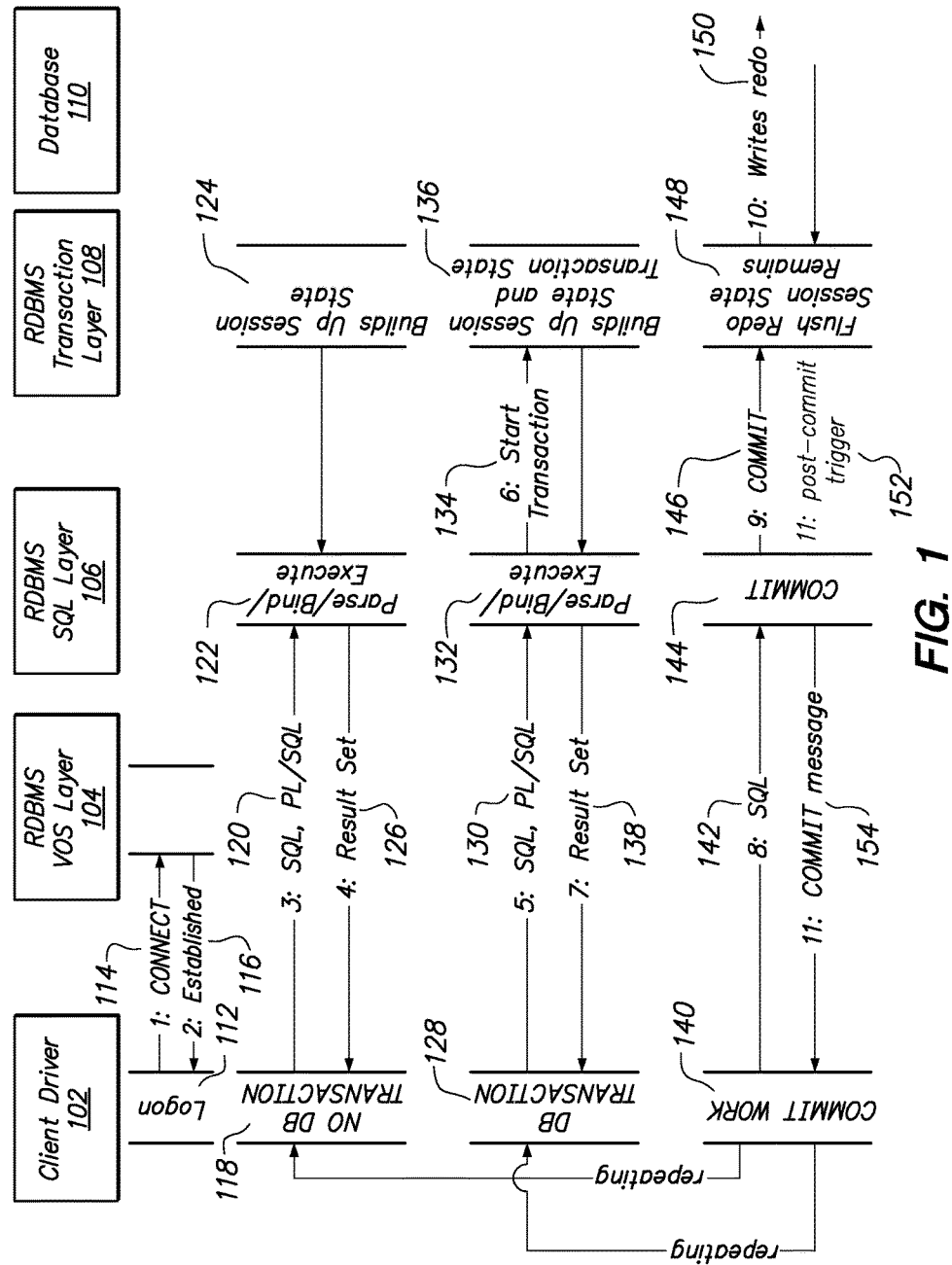
FIG. 1 illustrates example steps for preserving transaction state in a database system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are disclosed herein for recovering the state of a database session. In other words, the techniques can be used to determine whether a transactional set of commands has completed or partially completed. For example, a set of commands may be partially completed if one or more transactions have committed but one or more other transactions have not committed, if there was more information to return with a commit outcome for the set of commands, or if there was otherwise more work to do by the server to complete the set of commands. Although the techniques may be described with reference to specific embodiments, the functionality described herein may be provided by the performance of a method, by a set of one or more stored instructions that, when executed, cause performance of the method, or by a set of one or more machines specially configured to perform the method.

In one embodiment, information about a latest transactional set of commands in a session may be stored in a connection object that is sent to a client in response to a request for a session. In an example method, a client receives a logical identifier such as a logical transaction ID (LTXID) at authentication, at checkout, and on every commit an update on this LTXID. In the example, every completed commit operation, or every completed set of commands that includes at least one commit operation, may cause a server instance to provide the client with a new or updated LTXID. The client holds, based on updates from the server, the next LTXID that will be used at the server, if the next set of commands from the client is committed. The server instance stores and controls the changing LTXID. In the example, the server instance stores or holds this information in the connection object for the session.

In one embodiment, the connection object is a JDBC connection object or OCI service handle or ODP.Net connection object. The client application gets the connection object from a client library, and the client library uses the connection object to open a physical connection (socket) to the server. The client library passes information to the server so that the server can authenticate the client and determine the client's privileges. Until the connection object is returned to the connection pool, the connection object remains assigned to the same application.

A first server receives multiple transactional sets of commands from a client in a first session. If any transaction in caused by a set of commands is committed, a Logical Transaction ID (LTXID) for the set of commands is stored as part of that commit operation. If there are transaction(s) that have committed and transaction(s) that have not yet committed, the stored information indicates that the set of commands is in an intermediate or embedded state. In one embodiment, the client sends, for execution, a set of commands to the server during each roundtrip between the client and the server. Following any set of commands that includes a commit, the LTXID for the set of commands is updated to reflect completion of the transaction(s), and the updated LTXID is sent to the client and is held in the connection object. For example, the LTXID may be sent to the client along with any results that were obtained by executing the transactional set of commands. If no transaction in the transactional set of commands has committed, the client has the LTXID of the previous transactional set of commands that the client sent for execution before the current transactional set of commands.

In one embodiment, any commit results in an increase in the LTXID and the return of a new LTXID. If the set of commands containing the commit has both committed and completed, the LTXID recorded (i.e., the previous LTXID) has a status or outcome that includes that the set of commands "completed." In this embodiment, each commit results in updating the last LTXID on the same session. In another embodiment, each completed transactional set of commands results in updating the last LTXID on the same session.

A second server receives, from the client in a second session, a request that identifies a particular set of command(s), for example, by using a logical identifier that was previously passed to the client. The second server determines whether the request identified the latest transactional set of commands received for execution in the first session. If not, the second server may notify the client that the client is not synchronized with the servers.

The second server may also determine whether no transaction caused by the particular set of command(s) has committed in the particular set of commands, the second server enforces any uncommitted state by blocking the transaction(s) identified by that LTXID from committing so guaranteeing the outcome. Uncommitted state includes any state that would have committed in the first session if the first session had successfully completed, but that did not commit because the first session did not complete. Enforcing uncommitted state prevents the uncommitted state from later committing once another session has treated the uncommitted state as uncommitted. Once blocked the second server may notify the client that the set of commands identified by that logical transaction ID has not committed. Once the set of transactions has been blocked, the second server may notify the client that the identified transaction(s) have not committed (or that the identified events have not occurred). The second server may also cause execution of the particular set of commands in the second session, thereby causing the transaction(s) or event(s) to occur for the first time in the second session after the first session has been blocked.

The second server also determines whether at least one transaction caused by the particular set of command(s) has committed and whether any other transactions caused by the particular set of command(s) have not yet committed, or might not have yet committed or if there were more operations subsequent to that commit. In the same embodiment or in various other embodiments, the second server may determine whether some session state change had been lost, and/or whether results for the client have been lost. If transaction(s) have committed but there was more work to do after the commit(s), the server may indicate, to the client, that the commit is in an intermediate "embedded" state. The client may use the committed status and may choose to continue or not depending on whether a completion status was required.

In various examples provided herein, a database system provides transaction idempotence from the perspective of the database transactional layer and extends access to this information to clients using the logical transaction IDs. In other words, a server in the database system keeps track of transactions that were committed by the server using the logical transaction IDs, and the server prevents transactions from being completed more than once by blocking those that did not commit also using the Logical transaction ID. A transaction is a set of operations that change data. In database systems, the operations are specified by one or more database commands. Committing a transaction refers to making the changes for a transaction permanent in the database. To preserve data integrity, changes by a transaction are made atomically, in an all-or-nothing manner, when the transaction is committed. Either all of the changes are committed, or the transaction is rolled back. When a transaction is made permanent, the logical transaction identifier is recorded as a part of that transaction at commit. After commit, the next logical transaction identifier to use is returned to the client. In one embodiment a running commit number that is part of the logical transaction id is incremented and returned to the client as part of the LTXID after each commit completes, or after each set of commands that includes at least one commit completes.

In one embodiment, if a first database session experiences an outage while handling a transaction, the transaction may be completed on a second, different database session without the risk of having the transaction also completed on the first database session by enforcing the uncommitted state by blocking, on the second session, the transaction(s) identified by that LTXID from committing in the first session. The server may provide transaction idempotence transparently to the client and in a manner that scales for multiple clients in multiple sessions with multiple servers, even when multiple transactions are being executed in a session.

In one embodiment, the server allows a transaction to be committed even if execution of the transaction was not completed during a first attempt. The server saves a Logical Transaction Identifier ("LTXID") at commit for transactions against the database. These transactions may include, for example, transactions executed using auto-commit, from inside PL/SQL, from inside server side Java, from remote transactions, from parallel transactions, from distributed transactions, and from callouts that cannot otherwise be identified using generic means. The server uses the LTXID to support at-most-once execution semantics such that database transactions protected by LTXIDs cannot be duplicated regardless of whether there are multiple copies of the transaction in flight. In other words, the client may submit several requests to complete the same transaction, and the server may prevent the transaction from being completed more than once.

In one embodiment, the server blocks commits of in-flight work to ensure that, regardless of the outage situation, another submission of the same transaction, for example by a browser or mid-tier client, cannot commit. The server may identify repeated attempts to complete the same transaction by keeping track of the state of the transaction as affected by the various attempts to complete the transaction using a logical transaction id (LTXID) for each attempt to resubmit that transaction. For example, the server may enforce the uncommitted state by updating the logical transaction ID that represents a transactional set of commands to a blocked state when the server attempts to resolve the set of commands in case the set of commands had already been submitted for execution.

In one embodiment, the server keeps track of work that is committed for a set of commands associated with an LTXID. The server may identify whether work was committed as part of a top-level call (client to server), or was embedded in a procedure such as a PL/SQL or Java procedure at the server or was part of a commit operation that involved returning other information such as out binds or returned messages. The server may store an indication that the set of commands has an embedded commit state. The embedded commit state indicates that, while a commit completed, the entire procedure in which the commit executed has not yet run to completion. Any work beyond the commit cannot guarantee to have completed until the parent procedure returns at the database server, and all results are received by the client.

In one embodiment, if a client requests resolution of a submitted transaction, the server identifies whether the database system is ahead of, in-sync, or behind the original submission. The server may reject the client's request when there are gaps in the submission sequence of transactions from a client. The server may notify the client of a synchronization error if the client attempts to force completion of a transaction for which the server or client are not in sync on an LTXID sequence.

In one embodiment, a client driver is configured with a callback that fires when the LTXID is incremented by a committed call from the client to a server. The callback is used by higher layer applications such as Oracle's WebLogic Server and third party applications to keep track of the current LTXID at the client. The client may reference the current LTXID even if the client's database session becomes unavailable.

In one embodiment, LTXIDs are assigned to ensure namespace uniqueness across globally disparate databases and across databases that are consolidated into a pluggable infrastructure.

In one embodiment, the server increments a commit sequence if any set of calls from the client in that session successfully committed any work. The logical transaction id including the commit number is shared with the client when the return code for the call is returned to the client. The commit sequence is used to maintain the ordering on the session. Updating a sequence in a consistent manner allows a server to validate that the client and the server are synchronized (i.e., on the same LTXID). Updating the sequence in a consistent manner may also allow the client to determine a next LTXID, although this is not required if the LTXID processing is performed at the server. If the LTXID processing is performed at the server, the client might merely hold the LTXID, for example, to be returned on a new session when a prior session becomes unavailable. Updating the sequence and the permanent record of the sequence state allows that permanent record to grow in proportion to the number of sessions rather than the number of transactions, which may be much larger. Growth proportional to transactions can use much more space, memory, and processing power than the more limited growth proportional to sessions.

In one embodiment the client may determine the outcome of the last commit operation generically, following an outage, even if the commit messages that were sent back to the client before the outage do not provide such information. The server guarantees the commit results sent back to the client by enforcing the uncommitted status for transactions that were in-flight and rolled back due to the outage. By making this information available to the client, the server helps the client avoid duplicate transaction submission and other forms of "logical corruption" that may result if users and applications try to re-issue changes that have already been committed to the database.

In one embodiment, the client does not need to maintain modification numbers that are tied to particular database objects. The client may determine whether a set of commands has completed by referencing the logical identifier instead of the objects affected by commands. For example, the client may reference the sets of commands using an LTXID, without regard to which database objects may be affected by the transactional sets of commands, to probe as to whether the transactional sets of commands have been completed.

In one embodiment, the client does not need to submit additional transactions for the purpose of determining whether past submitted transactions have committed and if those commits were complete. For example, the client does not need to submit DML commands that update a transaction history table in the database each time the client submits other commands that may commit changes to the database. The transaction history table may be automatically updated when the client submits a transactional set of commands without requiring the client to submit separate statements to update the transaction history table. Submitting such other statements would cause a significant increase in traffic between the server and the client.

In one embodiment, the server does not allow the client to re-submit a transactional set of commands merely because the transactional set of commands had not completed when the client previously checked the outcome of the set of commands. Before re-executing the set of commands, the server may attempt to determine whether the last transaction committed, for example, by using the logical transaction id to block the status in a transaction history table. If another server in a previous session has already updated the transaction history table to reflect that the set of commands has been committed, then the second server indicates, to the client, that the identified transaction has committed. In other words, if the set of commands has committed in a previous session before the transaction history table is updated, then any attempt to re-execute using the same LTXID on a new session is blocked by the committed status. However, if the set of commands is not committed in the previous session before the transaction history table is tested, then completion of the transaction in the previous session is blocked so the commands may be re-executed in the new session with no risk of duplication. The re-execution in the new session will use a new LTXID. If the other server attempts to commit the transactional set of commands in the previous session, the other server will detect that the transactional set of commands has been blocked to avoid duplicate execution of the transactional set of commands (i.e., an unpredictable outcome). In response, the other server will roll back any changes from the transactional set of commands that have been made in this session.

In one embodiment, the server maintains the status or outcome of single-round trip transactions such as those using auto-commit, or embedded in PL/SQL or Java. One or more transactions may be opened and closed in a single request from the client to the server. For example, the client may call a PL/SQL procedure or a Java procedure that commits several different transactions to the database at several different commit points internal to that PL/SQL or Java block. If any transaction is committed, the outcome for the round trip for that LTXID is committed. When commit is embedded within the block, the outcome of the commit is recorded as embedded. When commit is the last operation for the block on the stack, the commit can be recorded or upgraded to a full commit.

In various embodiments, the server maintains the outcome of remote transactions, and/or autonomous transactions, and/or transactions in callouts.

In one embodiment, the server maintains an embedded status or outcome for PL/SQL, DDL, and Data Control Language ("DCL") commands.

In one embodiment, the server detects when a set of commands includes a transaction. When the transaction starts, the server attempts to record the LTXID as part of the transaction. If the transaction has already been started or committed or is blocked, the server avoids attempting the transaction again. If the transaction has been started or committed, the server blocks completing the later transaction. If the current server succeeds in blocking other attempts at completing or blocking the transaction, the server may attempt to complete the transaction without taking a risk of having the transaction completed more than once.

In another embodiment, the server detects when a set of commands includes a transaction. When the transaction starts, the server registers the LTXID to record at COMMIT as part of the transaction. At COMMIT, if the transaction has already been blocked, for example, in another session, the current transaction is blocked from committing and rolls back.

In one embodiment, the server may process a transaction sequence from a client even if a database is restored to an earlier version or if the failover occurs to a later incarnation of the database. For example, the server may manage the LTXID for a session such that the commit sequence is monotonically increasing, and the client may rely on this consistent characteristic to determine an LTXID for a transactional set of commands that have been sent, but for which a result has not yet been received.

In one embodiment, the server may process multiple transactions at a high frequency, keeping track of the outcome of the multiple transactions as they are processed. For example, the server may update the commit number on each LTXID as transactional sets of commands are committed, without the need to create new LTXIDs for each transaction.

In one embodiment, the server masks the impact of outages relating to a database conversation with the client or end user. Because servers maintain commit outcomes, one server is aware of the outcome of a transaction when another server experiences an outage while executing the transaction. The server may avoid outages that otherwise may result in a visible impact on the user, may cause loss of entered data, or may cause restart of the application or components of the application, consuming valuable time and resources. The server may mask outages and conversation interruptions without placing a burden on the application developers. Server software may allow requests to be retried or continued safely at other servers in the system without the risk of duplication.

Knowing the transaction outcome may result in an improved end user experience, higher application availability, an improved application developer productivity handling outages, better integration and synergy between server, middle-tier, and application products. Server features may be accomplished without significant changes to the application. Server features may prevent interruption to user service in many scenarios where service would otherwise be interrupted due to an outage. In one example, a server provides a generic infrastructure for at-most-once execution semantics in the case of planned and unplanned outages, and duplicate submissions. The server may preserve commit outcomes, promote a known, expected outcome for every transaction, and support at-most-once transaction execution.

Figure 9:
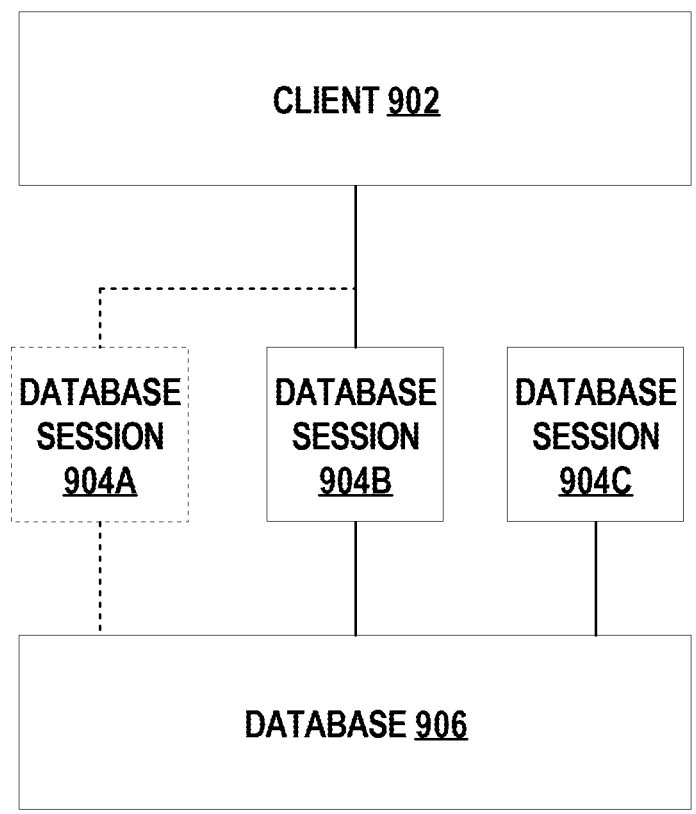
FIG. 9 illustrates an example configuration where a client accesses a database using a database session.

FIG. 9 illustrates an example configuration where a client accesses a database using a database session. In the example, client 902 accesses database 906 using database session 904A. Client 902 may then detect the unavailability of database session 904A, and, without losing the state that was built up on a client-side session, fail over to database session 904B. For example, client 902 may replay commands on session 904B that were originally executed or requested to be executed on session 904A.

In one embodiment, the server may provide an indication of whether or not the commands were committed even if the commands could not have committed. For example, the client may request the outcome of a set of commands that, if partially or fully executed, could not have completed a transaction. After enforcing the outcome by blocking the set of commands, the server may reply to the request by indicating that the set of commands did not complete a transaction, and/or the server may indicate that the set of commands could not have completed the transaction whether or not the set of commands was completed. The server may also indicate, to the client, a server-side progress on the set of commands that specifies which commands have or have not been completed.

In one embodiment, results that would have been sent from the server to the client in response to the set of commands, if such results were sent, would have included a value that the client could rely on for client-side operations. If the client requests an outcome for commands that have not returned such a value, the client may receive an indication that the commands have not completed even if there are no uncompleted transactions in the set of commands. Upon receiving a request for an outcome of the commands, the server may determine that the results would have included such a value and indicate, to the client, that the set of commands has not yet been completed until that value is received by the client. There may be multiple types of data that could have been returned by the server and relied upon by the client when the commands were executed, including transaction tracking information, whether any errors occurred while executing the commands (and possibly a list of the errors), other data that the client explicitly requested (return from select or out binds), and/or data that was automatically returned such as the number of rows affected by the commands. Other types of information might not be relied on by the client, such as whether a transaction is currently open, and the fact that the client may not have received this information might not prevent the server from indicating, to the client, that the set of commands has completed. Other types of information, although not returned to the client, may have been saved in the database for returning to the client on the newly established session. Saved information might also not be required in order to indicate, to the client, that the set of commands has completed.

In one embodiment, the server may return results that were not yet returned to the client. If the server returns, in the newly established session, the results that the client would have relied upon, the server may then treat the set of commands as completed in the newly established session even though the results were not returned in the previous session.

In one embodiment, the set of commands may include a command that makes an explicit change to the session state. For example, a command may change a language that should be used for the session. If the client requests an outcome for commands that changed the session state, the client may receive an indication that the commands have not completed if this session state was not preserved in the database. Upon receiving a request for the outcome, the server may determine that the set of commands would have changed the session state and indicate, to the client, that the set of commands has not yet been completed until the change is made to the session state in the newly established session.

In one embodiment, the server may make changes to the session state that were not yet made. If the server makes, in the newly established session, changes that would have been made in the previous session if the commands were completed, then the server may treat the commands as completed in the newly established session even though the changes were not made in the previous session.

In one embodiment, a server may track multiple transactions that would be caused by commands that were submitted in a single request from the client to the server. For example, the server may number the transactions that are predicted to be executed based on an execution plan for the commands or based on commands that are known by the server to cause transactions. In this manner, the commit outcome for each individual transaction may be tracked even if a single set of commands causes multiple transactions. In this embodiment, the server may provide transaction outcome(s) to the client on a transaction-by-transaction basis for requests that include multiple transactions rather than on a request-by-request basis. In a particular example, the client may request transaction outcomes for a request, and the server may respond by providing multiple transaction outcomes for multiple transactions that were caused or would have been caused if the request was executed to completion. The server may report the completion of individual transactions rather than all of the transactions as a whole, and the server may block individual uncommitted transactions rather than blocking all of the uncommitted transactions as a whole. The enforcing of the uncommitted state by blocking and reporting of this state by the server may be in response to an information request from the client that identifies a set of commands that cause multiple transactions, or by identifying the specific transactions within the set of commands.

In one embodiment, in response to an information request from the client about a transaction identified by an LTXID, a server may determine that a process executing a transaction identified by that LTXID is dead, is guaranteed to never complete, or is predicted to never complete. In one example, the server may make this determination by checking with other components that are responsible for executing the transaction identified by that LTXID. In this embodiment, the server may report, to the client, that the transaction is guaranteed to never complete even if the server has not blocked the transaction.

Executing Transactional Commands

An example database management system (DBMS) such as ORACLE, like many other DMBMs, provides a transaction-based programming model to application programmers through various client driver interfaces including ORACLE's OCI driver and ORACLE's JDBC Driver. Through the drivers, top-level SQL and PL/SQL calls build the transaction state and non-transactional state of the session. In the example system, the client driver sends SELECT, PL/SQL, ALTER SESSION, DML, and TRUNCATE statements to the relational database management system ("RDBMS") and, at the end of the transaction, the changes are committed. The commit may occur in the same round trip to the server or in a separate round trip.

FIG. 1 shows different components and layers of the example system in more detail. The system supports state build up and the commit processing. Following the workflow steps in FIG. 1, in a logon phase 112, a client issues a call to connect with a database system 104-110. In the logon phase 112, the client driver 102 completes the authentication handshake, and establishes the client side session handles. In step 116, the connection with the database system is established. In a no transaction phase 118, client 102 sends SQL and PL/SQL commands to RDBMS SQL Layer 106 in step 120. In phase 122, RDBMS SQL Layer 106 parses, binds, and executes the commands 120. The RDBMS SQL Layer 106 compiles each statement and sends the request to the SQL engine or PL/SQL engine. Executing the commands 120 builds up non-transactional states for the session in step 124. The server returns the result set, output binds, DML returning results, and ORACLE messages to the client in step 126. Some of these results are held in the client driver and passed through to the application.

In a database transaction phase 128, client 102 sends DML commands and PL/SQL commands containing DML to RDBMS SQL Layer 106 in step 130. In phase 132, RDBMS SQL Layer 106 parses, binds, and executes the commands 130. The SQL layer compiles each statement and sends the request to the PL/SQL engine and DML driver. In step 134, executing the commands starts one or more transactions and builds up session state and transaction state at RDBMS Transaction Layer 108 in step 136. A result of the DML operation or an ORACLE error message is returned to client 102 in step 138.

In a commit work phase 140, client 102 sends a commit request or has set auto-commit that encompasses a request to RDBMS SQL Layer 106 in step 142. In a commit phase 144, RDBMS SQL Layer 106 compiles the statement and sends the commit request to transaction layer in step 146. In a flush redo phase 148, RDBMS Transaction Layer 108 flushes change records to disk in step 150. RDBMS Transaction Layer 108 builds the success of committing in a post-commit trigger, and causes the post-commit trigger to be returned to the RDBMS SQL Layer in step 152. RDBMS SQL Layer 106 returns a COMMIT message to client 102 in step 154.

In one embodiment, the client receives a logical transaction id at authentication, at checkout, and at each successful commit of a transaction or of a transactional set of commands, when the acknowledgement of the transactional set of commands is received. In one embodiment, there is an outage between the client driver and the DBMS such as, for example, when the foreground process or database instance crashes or the network fails or any of these are aborted. The client receives an error message and the server side transactional and non-transactional states are lost. If the last communication to the DBMS is a commit request 142 or might contain a commit request, then applications using prior systems are unaware of the commit outcome after the application sent the commit request. The commit might or might not have completed, depending at which point the outage occurs. For example, the application may not know whether the commit message has been lost or not, and the application cannot safely query the outcome of the last commit request and restore the lost commit message because the operation may commit immediately after queried.

If the client has entered work and submitted this work to the server prior to an outage, the state at the client remains after the outage, potentially with entered data, returned data, data, and variables cached. The non-transactional session state that the application needs to operate within is lost in prior systems. If a transaction has been started and a commit has not been issued, the in-flight transaction is rolled back and needs to be resubmitted. If a transaction has been started and a commit has been issued, the commit message that is sent back to the client is not durable in prior systems. The client using prior systems is left not knowing whether the transaction committed or not.

In prior systems, the commit message that is sent back to the client is not durable. If there is a break between the client and the server, the client sees an error message indicating that the communication failed. This error does not inform the application whether the submission executed any commit operations or if a procedural call, ran to completion executing all expected commits and session state changes or failed part way through or even is still running disconnected from the client.

Application developers may write custom code to reconnect after an outage, but applications have no mechanism to re-establish non-transactional session state that was built up prior to the outage, or to test the server in an attempt to determine if the submitted work was committed or needs to be repeated. Any code module can fail, and application developers are unable to perform this form of error handling at every commit point to determine if a given transaction committed or not, and what states to restore to continue. An application could use additional bandwidth between the application and server to write modification numbers or store other uniform information for that could be queried. Using this additional bandwidth is undesirable, and maintaining modification numbers is not safe in terms of chronological ordering and when redirected to different databases at failover. When there are no primary keys or modification numbers, the application has nothing to query for change-tracking purposes and the approach of querying itself is fundamentally flawed because the thing that is queried can commit immediately after querying. Additionally, for batch managers that submit jobs that contain multiple commits, resubmission of the job is not possible if the job has not maintained a record of the place to restart if resubmitted.

A query submitted by an application of application-tracked data does not reveal whether the transaction has been completed because a transaction could commit immediately after that query executed. Indeed, following a communication failure, the server may still be running the submission not yet aware that the client has disconnected. For PL/SQL or Java commands, there is no record for a procedural submission as to whether the submission ran to completion or was aborted part way through. While commands in a procedure may have committed, subsequent work may not have been done for that procedure.

Applications are also not able to track local transactions, remote transactions, distributed transactions, parallel transactions, replicated transactions, and XA transactions. Even if an application is able to determine, in a specific scenario, what commands were executed prior to a specific failure, rebuilding non-transactional session state that was built up over an application lifetime is non-trivial for an application that is modifying non-transactional session state at runtime.

Failing to recognize that the last submission has committed or shall commit sometime soon or has not run to completion can lead to duplicate transaction submissions and other forms of "logical corruption" as users and software might try to re-issue already persisted changes.

If a lost transaction is submitted again, the re-submission could preserve atomicity and consistency if the system allows for it. However, the transaction cannot be validly resubmitted if the non-transactional state building up to the transaction is incorrect or if the transaction already committed. In prior systems, real operations between a server and client are not idempotent. In the absence of idempotence, resubmission can lead to transactions applied more than once.

Detecting Unavailability or Timeout of a Database Session

As an example, a client may detect unavailability or timeout of a database session before or after the client receives results from a latest set of commands sent for execution in the session. In one embodiment, the client receives a notification that the database session has gone down after the client sent a set of commands for execution in the database session. In response, the client may attempt to block the set of commands, whether or not the set of commands was executed. The client may alternatively attempt to replay the set of commands on a new database session. If the client chooses to replay the set of commands on the new database session, the server that is providing the new database session may prevent duplication of transactions. For example, the server may prevent re-execution of commands that were already executed in the initial session. The server may also block execution of transactions in the initial session before replaying the transactions in the new session.

In one embodiment, monitoring logic receives information that indicates a database session has become unavailable to the application. For example, the information may indicate that the database instance has failed or is about to fail, or a service or other resource provided to the application by the database instance has failed or is about to fail. As another example, the information may indicate that the database instance has failed to respond for at least a threshold amount of time (i.e., the instance has timed out). The unavailability of the database session could result from a planned or unplanned outage. For planned outages, the information received by the monitoring logic indicates that an outage is planned even though the database session may still be available. Indicating a planned "down" or outage allows work to be completed before failing over and recovering the session. Indeed, when using a connection pool, if all work completed, there is no need to recover the session because the application request has completed. Conversely, if using a dedicated session, the replay will move the session to another instance, allowing for the planned outage. In one embodiment, a database instance may be made unavailable to one service but not to another service, in order to reduce a load on instances in the database system. The monitoring logic may receive information from any agent or component that keeps track of the availability of the original database session. The monitoring logic may respond to the information by closing the database session (for example, a session served by an unavailable database instance), opening a new database session (for example, a session served by a new database instance), and causing replay of commands, which were previously sent on the now unavailable database session, on the new database session. When used to "shed" work in this manner, the replay will be at a less loaded database instance.

In one embodiment, the monitoring logic checks for whether or not the database session is available each time the application submits commands for execution on the database session. Therefore, detection of whether or not the database session has become unavailable may be performed synchronously with receipt of a command to be executed on the database session. This technique may be available if the socket is closed. If the node or network fails, an error is not received until after TCP/IP keepalive expires.

In one embodiment, an efficient technique for monitoring receives a Fast Application Notification ("FAN") events asynchronously with commands. The FAN event comes in, eliminating both wasted code path checking whether the session is available, and eliminates the need to wait on TCP keepalive.

The FAN monitoring logic subscribes to a service that publishes availability information to subscribers. For example, the monitoring logic may receive updated information in Fast Application Notification ("FAN") events. With fast notification of changes through which a number of events are published for system state changes, applications can quickly recover and sessions can quickly be rebalanced. When a resource associated with a service experiences a change in outcome, such as a termination or a start/restart, a notification event is immediately published for use by various subscribers to the event. For example, a notification event is issued when a database instance becomes available or unavailable, or when a service becomes available or unavailable on an instance. Notification events contain information to enable subscribers to identify, based on matching a session signature, the particular sessions that are affected by the change in outcome, and to respond accordingly. This allows sessions to be quickly aborted and ongoing processing to be quickly terminated when a resource fails, and allows fast rebalancing of work when a resource is restarted.

The notification events occur for outcome changes for services and for the resources that support the services, such as a particular instance, an instance, a node or a database cluster. When a service offered by one or more instances starts, a notification event (UP) is issued that may be used to start applications that are dependent on the service. When the service offered by one or more instances terminates, and also when an instance, node, or network terminates, a notification event (DOWN) is issued to halt the dependent applications. When managing clusterware can no longer manage the service because the service has exceeded its failure threshold, a notification event (NOT_RESTARTING) is issued to interrupt applications retrying the service. In one embodiment, the NOT_RESTARTING event initiates switching to a disaster service.

Upon connecting to the cluster, a unique signature (i.e., a locator) is generated for an associated session and recorded on a handle as part of the connection. In an embodiment, the signature comprises a service identifier, a node identifier, and database unique name, and an instance identifier, each of which is associated with the session. In the context of a database cluster, notification events contain information to enable subscribers to identify the particular sessions that are affected by the change in outcome, i.e., the signatures of the affected sessions. For some types of events, information used to identify affected sessions includes identification of the service and the database associated with the outcome change. For other types of events, the information used to identify affected sessions additionally includes identification of the instance and node associated with the outcome change. The affected sessions are the sessions with signatures that match the signature included in the event payload.

In various examples, there are different times when replay can start after the detection. The monitoring logic may receive information from the FAN events, clear the dead sessions, but not immediately initiate replay. For example, upon receiving a command to execute on a known-to-be unavailable session, the driver establishes a new session on which to rebuild client state that existed for the previous, unavailable session. In another embodiment, the driver may start replay in response to detecting unavailability.

In one example, the monitoring logic triggers replay on an available database session in response to receiving a command to be executed on a database session that has already become unavailable. In this embodiment, the monitoring logic may detect that the database session has become unavailable without restoring the database session. For example, replay is unnecessary if no further commands are executed in the database session after the database session has become unavailable. In one embodiment, the monitoring logic knows that the session is unavailable by FAN or a received error. Replay is invoked if there is a command in-flight or, if there is a command not in flight, replay is invoked when the application next sends a command. If the application never sends a command, replay does not occur.

In another example, the replay logic triggers replay on an available database session before receiving a command to be executed on a database session that is unavailable. In this manner, the database session may be restored before the application submits any other commands on the database session. Upon receiving another command to be executed on the database session, the monitoring logic may have already caused replay to be started or completed to restore the database session. Thus, the newly received command may be executed more efficiently as it replays needed sessions only.

Maintaining Logical Transaction Identifiers ("LTXIDS")

The logical transaction id is a globally unique id that uniquely defines a database transaction from the application perspective. The logical transaction id is stored in the OCI session handle and in a connection object for the thin JDBC driver. The logical transaction id is the foundation of the idempotence semantics.

Users connect through database services. To enable at-most-once execution semantics a new attribute is added to the service definition. This attribute is called commit_outcome. If this attribute is set for a service, logical transaction ids are created; otherwise the pre-12c behavior is retained. The following description describes example steps for creating and maintaining the logical transaction ids.

An application connects with the corresponding driver to the database. When the driver connects to the database, it starts a new database session. As part of the session creation, it also creates a new logical transaction id (LTXID). The logical transaction id is only created and stored in the user session structure in memory and is then returned to the client driver. The logical transaction id is not yet stored in the transaction history table. The new logical transaction id is returned to the driver and the user can query the session handle to obtain the logical transaction id value. The logical transaction id starts at commit number zero. If only reading, the ltxid does not change. This is the case for example of active data guard and read only databases.

If the application is using a connection pool, then the connection pool already holds logical transaction id (LTXID) on server and client side sessions. At checkout from the pool, the application uses the LTXID on the session that it checked out. This LTXID has the commit number returned to the pool at last check-in.

In an example method, a server receives a set of commands for execution in a session. The server session already holds the LTXID that was passed to the client at authentication or that the client obtained at checkout. The set of one or more commands, if completed in the session, would cause execution of: a first server operation that starts a transaction, and a second server operation that commits the transaction. In this example, the server determines whether the set of commands includes at least one command that, if executed, would start at least one transaction. In response to determining that the set of commands includes at least one command that, if executed, would start at least one transaction, the server updates stored information for the LTXID as part of the commit operation. In one example, the server performs a server operation that includes both committing changes and inserting or updating stored information to the transaction history table to indicate that at least one transaction in the set of commands has committed using that LTXID. After committing, a new LTXID is generated and is returned to the client on the return trip for the commit message.

In one embodiment, the server stores a transaction history table that includes an entry for each transactional set of commands of the multiple transactional sets of commands that were received in the session. The server may update the stored information to indicate that a transaction has started in a set of commands by adding an entry to the transaction history table for the set of commands.

Figure 14:
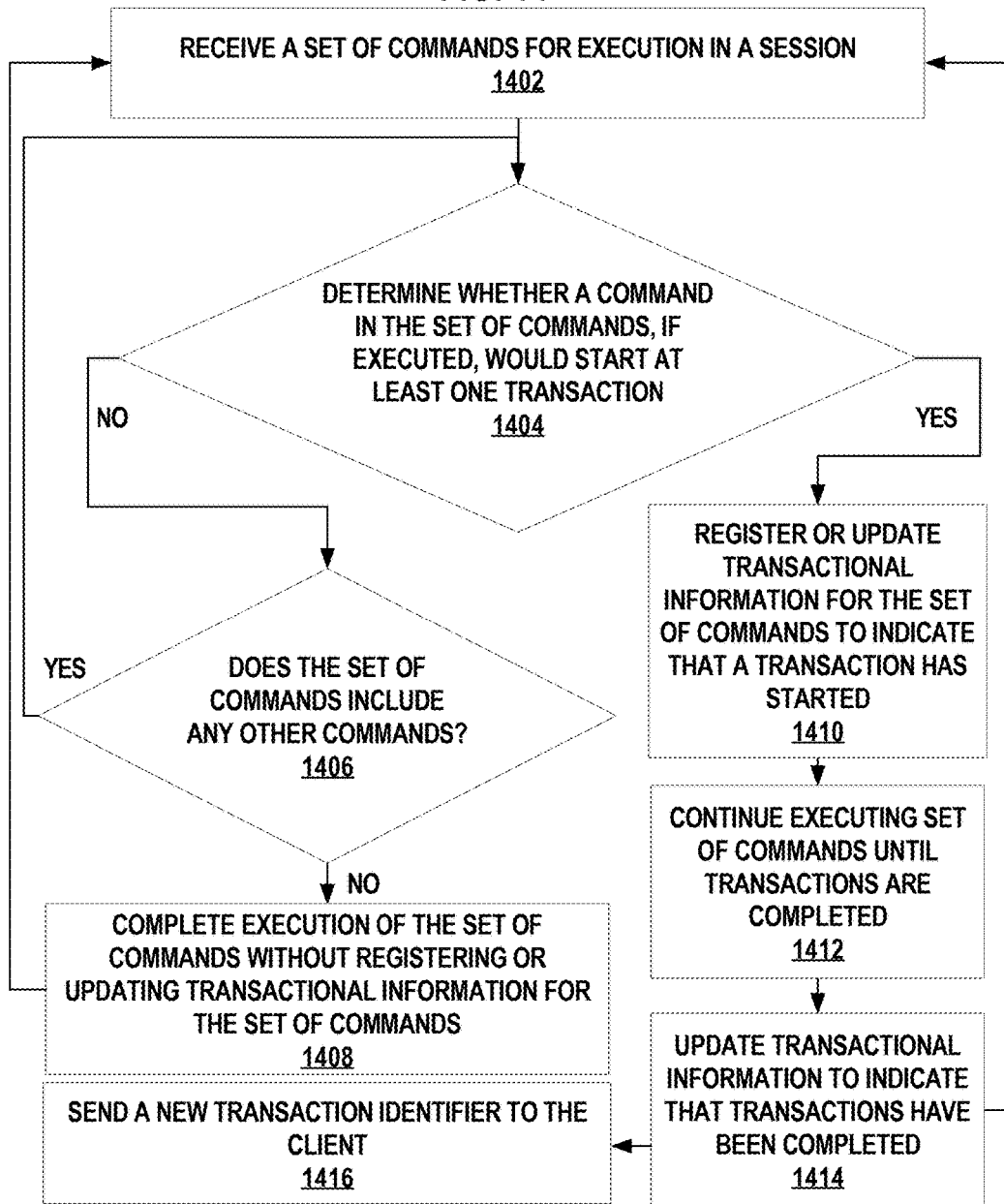
FIG. 14 illustrates an example method for maintaining a record of transactional sets of commands.

FIG. 14 illustrates an example method for maintaining a record of transactional sets of commands. In step 1402, a server receives a set of commands for execution in a session. For example, the server may receive a request that names a sequence of one or more commands to be executed by the server. The server determines, in step 1404, whether a command in the set of commands, if executed, would start at least one transaction. If the command would not start a transaction, then the server, in step 1406, determines whether the set of commands includes any other commands. If so, then the server re-performs step 1404 for the second command. If the server never reaches a command that starts a transaction, then, in step 1408, the server completes execution of the set of commands without registering or updating transactional information, such as an LTXID, for the set of commands. In another embodiment, the server stores a temporary update to the LTXID even if there are no transactions in the set of commands, but the temporary update is not committed unless the server detects a transaction or potential transaction to be executed.

On the other hand, if the server determines that the next command in the set of commands, if executed, would start a transaction, the server registers, in step 1410, that the LTXID is to be recorded if that transaction committed. The server continues executing the set of commands until open transactions are committed in step 1412. When committed, the LTXID is inserted if it is the first time that this LTXID has been seen. Otherwise, the LTXID is updated. In one embodiment, the server keeps track of each committed transaction within the set of commands using an updated LTXID at each commit. In another embodiment, the server only keeps track of whether or not there is at least one committed transaction in the set of commands. Upon committing an open transaction, in step 1414, the server inserts or updates the LTXID to indicate that the open transactions have been committed. After committing, the next LTXID to use is generated and is returned to the client in step 1416.

The logical transaction identifier ("LTXID") uniquely defines a transactional set of commands and is used to determine whether a last transaction committed or not, and if it did commit whether that commit was complete or not. The logical transaction identifier may include unique fields for the database and instance in order to detect if a failover is against the same or a different database. A logical transaction identifier containing such fields is said to be "globally unique." The logical transaction id to use next is held by the server side on each server side session. The transaction identifier may also include unique fields for the instance, session, version, and/or service. In one example, the logical transaction id is passed to and held or stored in the Oracle® Call Interface ("OCI") session handle or ODBC or ODP.Net session handle or in a connection object for the thin Java™ Database Connectivity ("JDBC") driver. The client holds a copy of the next logical transaction id that the server plans to use.

In one embodiment, the system prevents duplicate execution of transactions based on the logical transaction identifier. Duplicate execution may be detected at commit time. In this embodiment, at each commit point, constraint checks in the server are violated if the transaction has already been committed. If so, the commit is aborted and the transaction is rolled back. If not, the commit proceeds. Allowing the commit to proceed blocks later attempts to commit a transaction using the same LTXID. An LTXID may be stored or updated at commit time. After committing, a copy of the next LTXID that the server plans to use for that session is returned to the client.

After an outage, the client can connect to the server. Then using the LTXID from the previous connection can test the outcome of the last transaction. If that transaction was not committed, the server may block that LTXID, so preventing an earlier in-flight transaction using that LTXID from committing, that was active before the replay. An attempt to block the LTXID may fail if the LTXID has already been committed, or if the LTXID was previously blocked.

In one embodiment, the current LTXID for a session describes the next transaction to be committed in the session. The current LTXID may be calculated from the previous LTXID in some predictable manner, such as by incrementing the previous LTXID. The server passes the client the next LTXID that the server plans to use, when the server sends a notification to the client that the transaction associated with the previous LTXID has committed.

In one embodiment, the LTXID includes:
Version
Database identifier
  Includes Pluggable database identifier for consolidated databases
Database instance identifier
Logical session number (GUID)
Commit number
Service identifier In various embodiments, the LTXID may be used to support at-most-once execution semantics for:
Local transactions
Autonomous transactions
Commit on Success (auto-commit)
Read-only transactions
Recursive transactions
Distributed and Remote transactions
Parallel DML
Job Scheduler transactions
XA transactions The logical session number (GUID) is automatically assigned at session establishment. In one embodiment, the GUID is an opaque structure that cannot be read by an application. In one embodiment, the GUID is unique for the life of the transaction history.

In one embodiment, for scalability, the running commit number is increased when a database transaction is committed. For transaction managers such as WebLogic, it is possible to specify an additional attribute. This attribute is used for the WebLogic Server or Tuxedo or other transaction manager's own global transaction identifier ("GTRID") and can be used in general to describe XA transactions.

In one embodiment, the logical transaction id eliminates the possibility of duplicate transactions. Use of the logical transaction id to eliminate the possibility of duplicate transactions is referred to as Automatic Transaction Idempotence. The logical transaction id is persisted on commit and is reused following a rollback. During normal runtime, an LTXID is automatically held in the session at both the client and server for each database transaction. At commit, the logical transaction id is persisted as part of committing the transaction.

In one embodiment, in support of the at-most-once protocol, the RDBMS maintains the logical transaction id for the retention period agreed for retry. The default retention period is 24 hours. A customer may choose to extend this period to a week or longer, or reduce this period as desired. The longer the retention period, the longer the at-most-once check lasts that blocks an old transaction using an old LTXID from replay. When multiple RDBMS are involved, as is the case when using Data Guard and Golden Gate, the logical transaction id is replicated to each database involved.

In one example, the getLTXID API provided for 12 c ORACLE JDBC (thin and OCI) and OCI clients allows an application the ability to retrieve the next logical transaction id that will be used for that session. The GET_LTXID_OUTCOME PL/SQL package allows an application to determine the outcome of an action using the gotten logical transaction id. The GET_LTXID_OUTCOME package may involve blocking the LTXID from committing so that the outcome is known, for example, when a transaction using that LTXID is in flight. GET_LTXID_OUTCOME is called before attempting a replay and is available for applications to include in their applications. As used herein, GET_LTXID_OUTCOME and FORCE_OUTCOME may be used interchangeably to refer to a package with this functionality. In one embodiment, the package returns whether the transaction committed or not, whether that commit was a complete user call or not, and whether the LTXID was blocked.

In one embodiment, a mapping of logical transaction identifiers to database transactions is persisted in a transaction history table. For a given session, a server may insert if the first time for an LTXID or update a current LTXID when the server executes a COMMIT or a last COMMIT in a set of commands in the session. The insert or update is stored in the transaction history table, which is available to other sessions and servers in case of an outage.

In one embodiment, the server executes a callback to create or update an LTXID entry when a transaction is opened. The server inserts a first occurrence when redo is generated, and the server updates subsequent occurrences in a predictable manner. The server may also execute a callback to create or update an LTXID at commit. After the redo is durable on disk, the server may increment the commit number in the LTXID by one or update the commit number in some other predictable or deterministic manner. The server may return the increment or other update of the commit number on the session handle with the commit outcome.

In one embodiment, a user connects to the database and creates a new database session. If the database service associated with the user session has the "commit_outcome" attribute set, a new logical transaction id (LTXID) is created for this session. For example, the RDBMS kernel invokes a create LTXID function to create a new logical transaction id as part of creating the new user session. The logical transaction id is only stored in memory at this point and is not yet persisted. The LTXID is returned to the client on the session handle. The logical transaction id is unique, and the same LTXID will not be created on different database instances of the same cluster or set of databases in a global configuration.

In one embodiment, LTXIDs are created only for user sessions that process SQL. They are not created for background sessions. They are not created for slave processes used by tasks such as Memory Monitor ("MMON"). In an example for parallel DML, only the parallel coordinator has an associated LTXID. In an example for job scheduler, the LTXID is managed for jobs running in the job scheduler slaves.

In one embodiment, LTXIDs are only created when using clients that support LTXIDs. Example clients that support LTXIDs include OCI, JDBC thin and JDBC OCI, OCCI, and ODP.Net clients. This is configured by a setting called COMMIT_OUTCOME on the service that the session connects to.

In one embodiment, the LTXID is created and managed for a user session if the commit_outcome attribute is set on the service when that user is authenticated. If the commit_outcome attribute is set subsequent to connecting, LTXIDs are not tracked at COMMIT for this session. If commit_outcome is set to FALSE, existing sessions that were supporting the LTXID continue to support the LTXID.

In one embodiment, if the create session request does not complete successfully and the user retries the operation, a new logical transaction identifier is generated. In this embodiment, the old logical transaction identifier is not reused.

In one embodiment, the database unique name and instance number is carried on the LTXID. A server receiving a request for the outcome of a transaction using an LTXID may identify the original database and instance where the transaction was submitted by virtue of the database and instance identifier parts of the LTXID.

Figure 8:
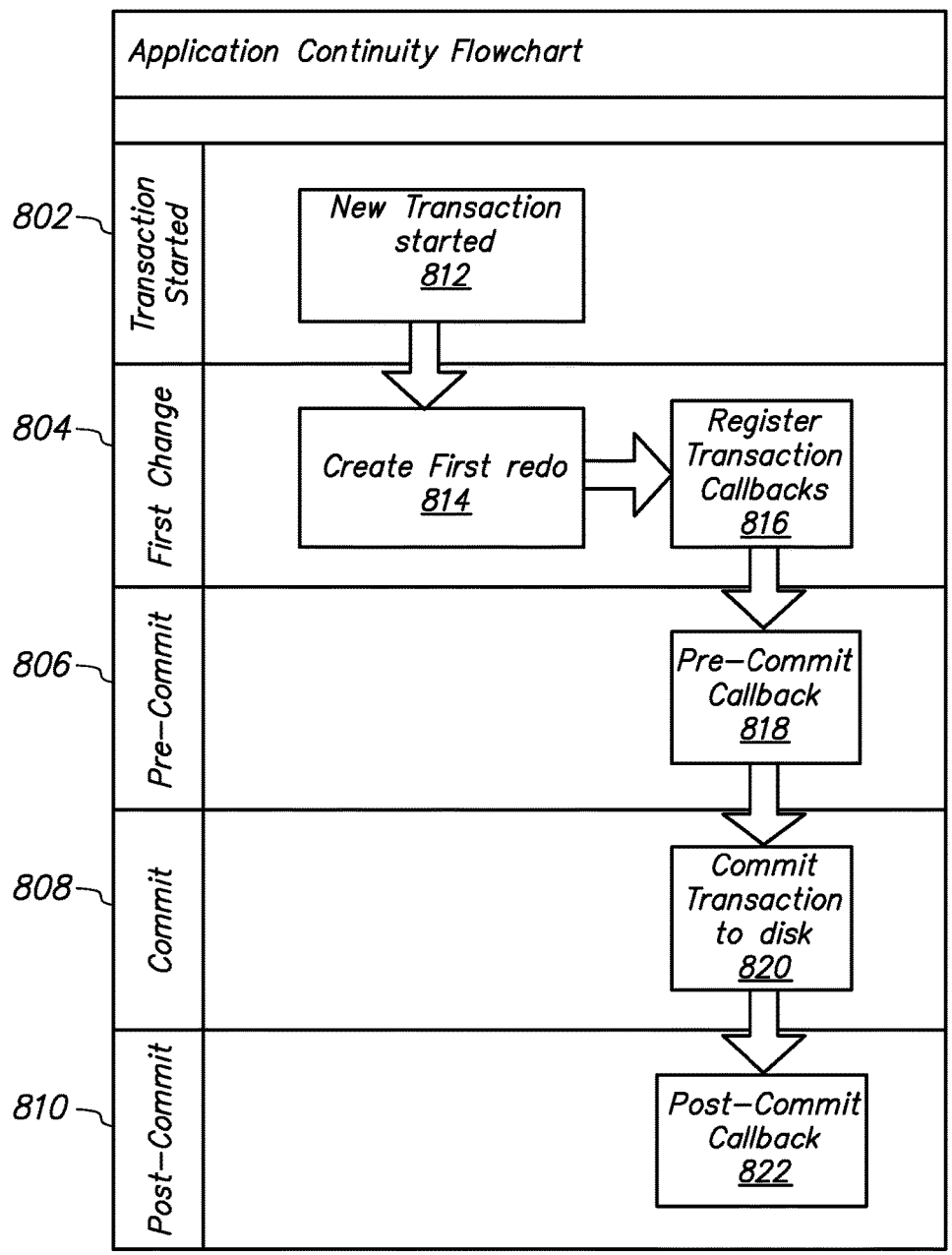
FIG. 8 illustrates phases of an example method for preserving transaction state in a database system.

FIG. 8 illustrates phases of an example method for preserving transaction state in a database system. A new transaction is started in step 812. In the example, the server operates in a typical manner as long as the transaction does not make any changes. After the application has issued the first change creating first redo in step 814, two commit callbacks are registered in step 816: the pre-commit callback and the post-commit callback. When the transaction commits, the pre-commit and the post-commit callback are automatically invoked. In step 818, the pre-commit callback is invoked before the transaction is committed to disk in step 820. In step 822, the post-commit callback is invoked after the transaction is committed to disk.

In one embodiment, the server sets the outcome of a transactional set of commands to EMBEDDED when a transaction has committed and COMMIT statement(s) being executed are nested in PL/SQL or Java blocks, or are return statements from such blocks and functions, COMMIT statement(s) are nested in Java stored procedures, or COMMIT statement(s) are executed with calls that return additional information. AUTOCOMMIT mode that returns the number of rows processed and COMMIT ON SUCCESS that can be set on any command including SELECT inside a transaction are examples on the last where the application expects more information after the COMMIT. The server identifies whether a COMMIT is the last item in a PL/SQL execution stack and, upon execution of the COMMIT, sets the COMMIT outcome for an LTXID to COMMITTED rather than EMBEDDED if that PL/SQL does not have function results or out parameters to return. In one example, the server sets the COMMIT outcome to COMMITTED rather than EMBEDDED if the COMMIT is the only COMMIT in the PL/SQL execution stack. In another example, the server sets the COMMIT outcome to COMMITTED if a COMMIT was previously set to EMBEDDED in the same PL/SQL execution, and the last COMMIT executes and that PL/SQL does not have function results or out parameters to return. In another example, if an implicit COMMIT is the last item in a PL/SQL execution stack, the server sets the outcome of the commit to COMPLETED rather than EMBEDDED.

In one example, a DDL command executes as a combination of a recursive and top level COMMIT depending on the DDL command. The number of COMMITs executed and the level executed is DDL specific. In the example, the DDL command increments the LTXID if the DDL command if any commits occur. The outcome of the COMMIT for the DDL command is updated to COMMITTED when it runs to completion. The intermediate COMMITs executing pursuant to the DDL command have an intermediate COMMIT outcome of EMBEDDED. In a particular example, the DDL command increments the LTXID by exactly one. In other words, in the particular example, sets of commands with recursive COMMITs advance the LTXID by exactly one regardless of the number of COMMITs. In another embodiment, the LTXID changes in some other consistent or predictable manner that can be shared with the client. This ensures that the LTXID commit sequence is synchronized with the client for any round trip to the server.

The table below illustrates several examples of command structures and corresponding processes for maintaining the LTXID.

| Structure | Example Behaviour | Other Example(s) |
| --- | --- | --- |
| DDL that is purely recursive | Single increment of LTXID with outcome COMMITTED | |
| DDL with a top level COMMIT at end | Single increment of LTXID with outcome COMMITTED | |
| DDL with greater than one top level COMMIT, including one at end | Single increment of LTXID with outcome COMMITTED. Intermediate COMMIT have outcome EMBEDDED overridden by the last COMMIT | Multiple increment of LTXID, intermediate COMMITs have outcome EMBEDDED. Last has outcome COMMITTED |
| Any of above with an open TX beforehand | Single increment of LTXID with outcome EMBEDDED Outcome EMBEDDED overridden by the last COMMIT | Multiple increment of LTXID, intermediate COMMITs have outcome EMBEDDED. Last has outcome COMMITTED |

Obtaining the Outcome for a Transaction Using the LTXID

In an example method, a server receives, from a client in a second session, a request for the outcome or outcome of a set of command(s) that were sent by the client in a first session. The request identifies the set of command(s), for example, by using the LTXID for the first session. The set of commands, if completed in the first session, would cause execution of a first server operation that starts a transaction, a second server operation that commits the transaction, and a response to the client for that second operation that reports to the client, that the set of one or more transactions have committed. Completion of the set of commands is not reported, to the client, until after the second operation has committed the transaction. In this example, the server determines whether there are any transactions in the set of commands that have committed. Based at least in part on determining there are no transactions in the set of commands that have committed, the server sending, to the client, a response to the request for the outcome or outcome that indicates that the set of commands may be treated as uncommitted.

In another example method, a server receives, from a client, a request for the outcome of a set of command(s) that were sent by the client in a session. The set of command(s), if completed in the session, would cause execution of a first server operation that starts a transaction, a second server operation that commits the transaction, and a response to the client for that second operation that reports to the client, that the set of one or more transactions have committed. Completion of the set of one or more commands is not reported, to the client, until after the second operation has committed the transaction. In this example, the server determines whether at least one transaction in the set of commands has committed. Based at least in part on determining that at least one transaction in the set of commands has started but has committed, the server sends, to the client, a response to the request that indicates that at least one transaction in the set of commands has committed. The server may also report whether the last call from the client that includes this commit has completed or is partial (embedded).

In one embodiment, the client sends the set of commands to a server in a session where that server session is configured to record LTXID should a transaction commit. The same or a different server receives the request for outcome from the client for the transaction using this LTXID in another, different session. For example, a first server may fail while executing the set of commands, and the client may be failed over to a second session with a second server or the same server. The client may request, on the second session, the outcome of the set of commands that were previously sent on the first session by using the LTXID even if the first server never reported results of the set of commands.

In one embodiment, the client requests the outcome of a single PL/SQL command, which, if completed in the session, would cause execution of several server operations in addition to the first server operation that starts the transaction, the second server operation that commits the transaction, and a response to the client for that second operation that reports to the client that the set of one or more transactions have completed. The server operations may include operations that start transactions and operations that commit transactions. In one embodiment, the set of commands, if completed in the session, would cause execution of at least one server operation between the first server operation and the second server operation. For example, the at least one server operation may make temporary change(s) to database object(s) in a database, and the second server operation, if completed in the session, may commit the temporary change(s) together with the LTXID and the outcome of that LTXID—embedded or completed. In another example, the first server operation that starts the transaction is an operation that, if executed, would cause a server to make temporary changes.

In one embodiment, the server processing the request is a server or instance of multiple servers that provide access to a database in multiple sessions. In some implementations, each session is assigned to at most one server at a time. In one example, before a set of commands is sent by the client in a session, a server may be providing the client with access to the database in the session and that access includes the next LTXID that will be used if a transaction is committed. If the session becomes unavailable to the client after the set of commands are sent by the client in the session, the client may not have known whether the set of commands, or transaction(s) within the set of commands, had not been started, had committed in part, or had committed and run to completion. In one embodiment, the client can request the outcome of the set of commands in a new session with a new server. In another session with the client, another server may provide the outcome of the set of commands that were sent by the client to the initial server in the initial session by passing the LTXID from the previous session.

In one embodiment, a request for the transaction outcome identifies a set of commands based the identifier called the LTXID that is unique to the set of one or more commands among a plurality of sets of commands sent in the session. In one example, the identifier (Logical transaction ID—LTXID) for one set of commands may be generated based on the LTXID of a previously sent set of commands. In a particular example, a part of the LTXID is incremented as different sets of commands are committed by the server. In one embodiment, a new identifier is assigned to after any new set of commands is committed by the server. This is the next LTXID that will be used for the next transaction to be committed. In another embodiment, new identifiers are assigned only to sets of commands that include at least one transaction, or "transactional sets of commands." In this manner, an identifier uniquely identifies a transactional set of commands among multiple transactional sets of commands.

In one embodiment, the identifier is unique to a set of commands among multiple sets of commands sent in a session, and the session, among multiple sessions in which multiple servers provide access to a database. For example, the identifier is unique to a transaction across the local and global databases.

In one embodiment, committing of different sets of commands are reported to the client by piggybacking, on different messages to the client, the next identifier to use for the next transaction submitted by that client. The client does not return this identifier. The server session already holds the identifier ready to use should that client issues another commit operation. The different messages may include different sets of results of the different sets of commands together with the next LTXID. The LTXID is returned with the results of the commands whenever a last call from the client included one or more commit operations that consumed the previous LTXID that the client held. Most important for synchronization, the LTXID that is returned to the client includes an embedded commit number that is monotonically increasing so gaps in the sequence of calls from the client are caught.

In one embodiment, the server blocks completion of the set of commands sent in the first session in response to determining that at least one transaction in the set of commands has committed. In this embodiment, the response to the request may indicate that the set of commands has been blocked from completion in the first session and is safe for completion in a second session. The server may complete the blocked set of commands in the second session or return the result of the first session to the user or take some other action.

In one embodiment, a first server executing a set of commands in a first session completes a first server operation that starts a transaction. The first server operates such that the LTXID will be committed in order for a transaction to commit. Before completion of the at least one transaction, a second server may receive, in a second session, a request that identifies the set of commands using that LTXID that were sent in the first session. The second server determines that at least one transaction has not committed by using the LTXID that was associated with the first session to look up the outcome or outcome of the transaction in stored information such as a transaction history table.

In one embodiment, a server blocks completion of a set of commands sent in a first session by inserting or updating the stored information for the previous sessions' LTXID to indicate that the set of commands has been blocked from completion in the first session. If the original server attempts to complete the set of commands in the first session, a constraint violation will occur at commit and that transaction will roll back. Once the LTXID is blocked, this allows the other server to complete the set of commands in the new server and session and to update the stored information with the LTXID for the new session to indicate that the set of commands has committed. If the stored information does not allow the other server to complete the set of commands in the first session, then the other server may roll back or discard the changes that were not completed in the first session.

Figure 10:
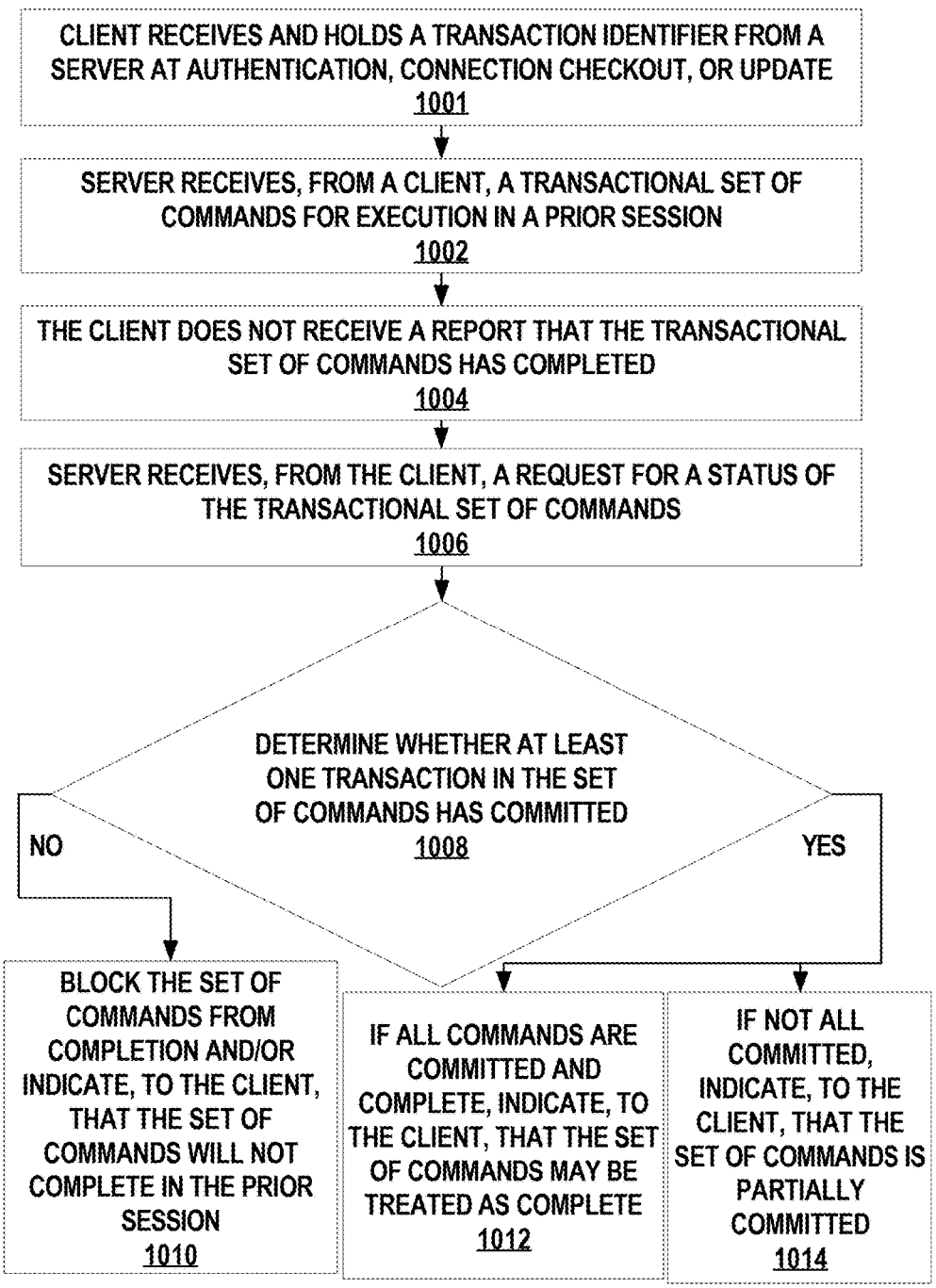
FIG. 10 illustrates an example method for determining an outcome of a transactional set of commands.

FIG. 10 illustrates an example method for determining the outcome of a transactional set of commands using the LTXID. In step 1001 the client first receives and holds an LTXID from the server at authentication, at connection checkout from a pool, or at an update from the server that results from a commit operation. At step 1002, a first server receives, from a client, a transactional set of commands for execution in a prior session. In step 1004, the client does not receive a report that the transactional set of commands has completed. Without receiving such a report, the client would typically be unaware of the outcome of the transactional set of commands. In the example, the client accesses the old LTXID from the previous session. A second session at the same or a different server then receives, from the client in step 1006, a request for a outcome of the transactional set of commands using that past LTXID. The second server determines whether at least one transaction in the transactional set of commands has committed in step 1008. If all of the transactions in the transactional set of commands have committed, the second server sends, to the client in step 1012, a response that indicates the transactional set of commands may be treated as complete or committed. If there is the possibility of more work after the commit, the response at step 1014 indicates that the set of commands may be partially committed or EMBEDDED, or that the client cannot safely proceed as if there is no pending work yet to be completed. Alternately, if no transaction has committed using that LTXID, the second server may block completion of the transactional set of commands for that LTXID, and/or indicate, to the client, that the set of commands will not complete in the prior session, as shown in step 1010 of FIG. 10 or step 1112 of FIG. 11. If the commands have been blocked, the second server may choose to execute the transactional set of commands, as shown in step 1114, or may choose to return a result to the user and do no more other than indicating, to the client, that the commands have been blocked, as shown in step 1116.

In one embodiment, the outcome of a set of commands is one of COMMITTED, EMBEDDED, FORCED or an error outcome including SERVER_AHEAD or CLIENT_AHEAD. The outcome of the set of commands is COMMITTED if there are no unexecuted COMMITs left in the set of commands. The outcome of the set of commands is EMBEDDED if one or more COMMITs have been executed, but there are still unexecuted COMMITs left in the set of commands or work to complete such as returning out parameters of results. The outcome of the set of commands is FORCED if a server is attempting to complete the set of commands after one or more failures to complete the set of commands. The outcome may be SERVER_AHEAD if the client requests the outcome of a set of commands other than the latest set of commands. Finally, the outcome may be CLIENT_AHEAD if the server is one or more LTXID calls behind the client as identified by the commit sequence in the LTXID. Other outcomes may also be returned to the client, with varying degrees of specificity about the progress of the set of commands, including the progress of any COMMITs in the set of commands, individually or as a group.

| OUTCOME FOR AN LTXID USING FORCE_OUTCOME | | | |
|---|---|---|---|
| COMMITTED | EMBEDDED | FORCED | Interpretation |
| TRUE | FALSE | FALSE | The user call committed and ran to completion |
| TRUE | TRUE | FALSE | The user call committed but may have more work to do or information to return |
| FALSE | FALSE | TRUE | The user call did not commit |

In another embodiment, a public interface is provided GET_LTXID_OUTCOME with one input parameter LTXID, and two parameters are returned—COMMITTED—with values TRUE or FALSE and USER_CALL_COMPLETED—with values TRUE or FALSE, plus error codes that include the errors for CLIENT_AHEAD and SERVER_AHEAD, when requesting the outcome of an LTXID (by calling GET_LTXID_OUTCOME). The result of the of the transaction is determined to be COMMITTED=TRUE, if any command in the set of commands committed. The result of the of the transaction is determined to be USER_CALL_COMPLETED=TRUE, if the commit was the final call and no additional results need to be returned to the client

| OUTCOME FOR AN LTXID USING GET_LTXID_OUTCOME | | |
|---|---|---|
| COMMITTED | USER_CALL_COMPLETED | Interpretation |
| TRUE | TRUE | The user call committed and ran to completion |
| TRUE | FALSE | The user call committed but may have more work to do or information to return |
| FALSE | FALSE | The user call did not commit |

Blocking Completion of a Set of Commands Using the LTXID

In an example method, a server receives, from a client in a second session, a request that identifies a set of command(s) that were sent by the client in a first session using the LTXID as identification. The set of one or more commands, if completed in the first session, would cause execution of a first server operation that starts a transaction, and a second server operation that commits the transaction. In the example, the server determines whether any transaction in the set of commands has committed. In response to the request and based at least in part on determining that no transactions in the set of commands have committed, the server blocks completion of the set of commands sent in the first session. In one use case, in addition to blocking completion of the set of commands sent in the first session, the server causes completion of the set of commands in the second session.

Figure 11:
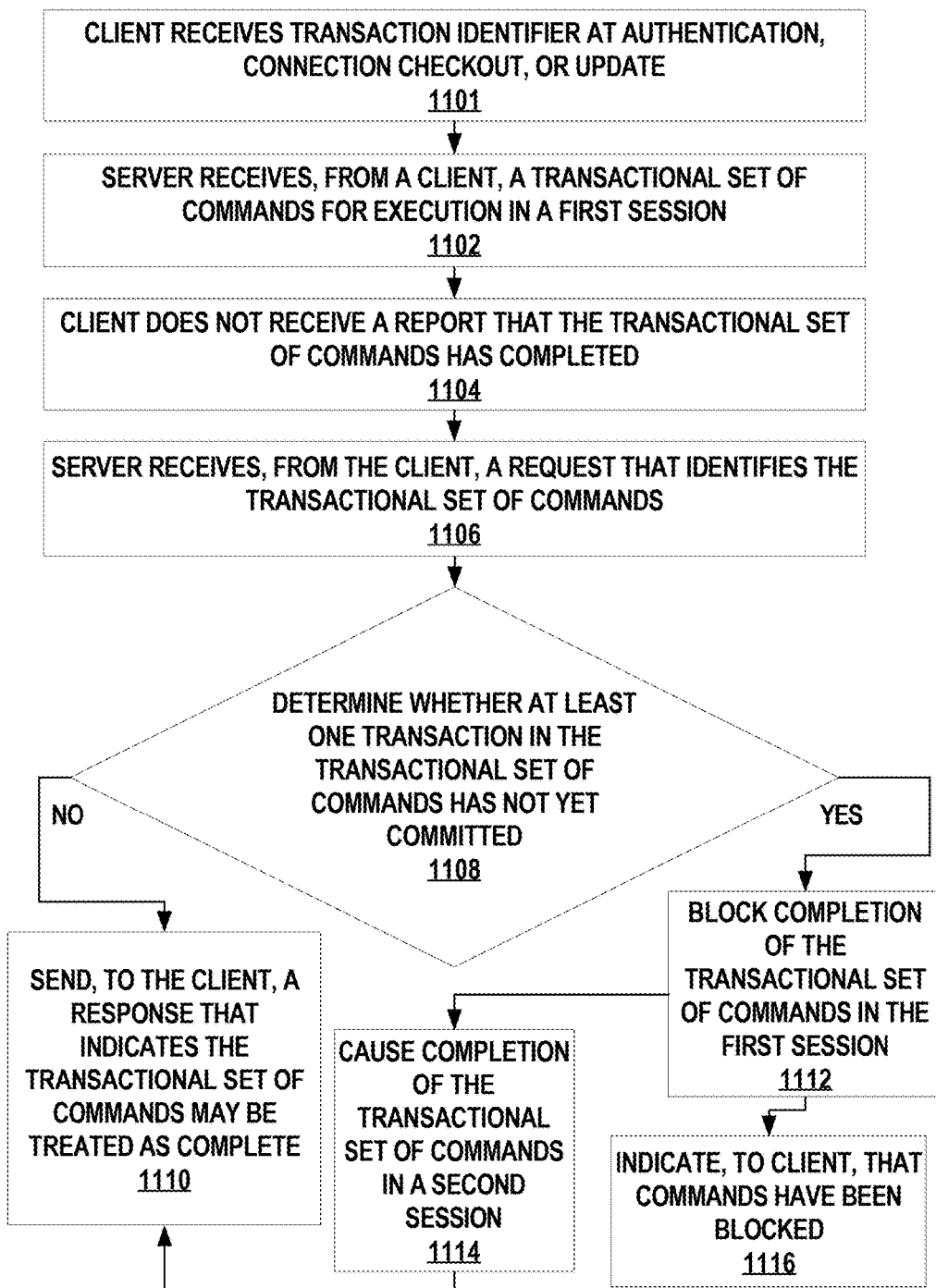
FIG. 11 illustrates an example method for forcing execution of a set of commands.

FIG. 11 illustrates an example method for forcing execution of a set of commands. In step 1101, a client receives a logical transaction ID (LTXID) at authentication, at checkout, and an update on this LTXID with successful commit operations that provide the client a new LTXID. The client holds the next LTXID that will be used at the server. The server session holds and controls this same LTXID. In step 1102, a first server receives, from a client, a transactional set of commands for execution in a first session. In step 1104, the client does not receive a report that the transactional set of commands has completed. For example, the client may fail to receive the report after a specified period of time after the set of commands were sent for execution. As another example, the client may receive a notification that the first session has become unavailable—the client receives an error indicating that a recoverable failure has occurred. Examples of such failures are storage, node, server, network or planned shutdown. In step 1106, a second server receives, from the client, a request that identifies the transactional set of commands using the LTXID from the original session as identification. In step 1108, the second server determines whether at least one transaction in the transactional set of commands has not yet committed. If all transactions in the set of commands have committed, in step 1110, the second server sends, to the client, a response that indicates the transactional set of commands has completed. If transactional commands existed after the commit or data was to be returned with the result of the commit (but was not), the set of commands will have outcome embedded and that the user call has not completed. If there are no committed transactions in the set of commands, the second server blocks completion of the transactional set of commands in the first session in step 1112, for example, by blocking the LTXID in the transaction history. Once the transactional set of commands is blocked in the first session, the second server may choose to return the uncommitted result to the user. In one embodiment, the second session executes the transactional set of commands to completion in a second session, in step 1114, such that the client may receive an indication that the transactional set of commands may be treated as complete in step 1110. In an alternative embodiment, in step 1116, the second server may merely indicate, to the client, that the set of commands have been blocked, and the client may then choose whether or not to replay the commands.

In one embodiment, the database system enables recovery of work from an application perspective and masks most system, communication, and hardware failures from the user. A blocking mechanism prevents end-user transactions from being executed more than once. In some scenarios, an end-user may still see an interruption in service when there are outage(s) that are for non-recoverable errors such as logic failures or outside timing guidelines.

In one embodiment, the application and the data sources operate in an integrated manner such that the transactional and non-transactional states of the involved components are recoverable if any component fails or becomes unresponsive. When a component fails, the recovery restores the state exactly as the state was before the failure occurred. When a request times out waiting for a reply and is re-submitted, the original transaction is detected using the LTXID and the new session blocks the original transaction from completing if it has not committed. To support at-most-once execution semantics, a component may identify and allow replay if the statement is uncommitted.

In one embodiment, for an application, a recoverable error is a class of errors that arise due to an external system failure that is independent of the application session logic that is executing. Recoverable errors occur following planned and unplanned outages of networks, nodes, storage, and databases. For example, the application receives an error code that can leave the application unaware of the outcome of the last operation submitted. The application may communicate with a server to re-establish a database session and resubmit the pending work for the class of recoverable errors. The application does not resubmit work following call failures due to non-recoverable errors. An example of a non-recoverable error that would not trigger automatic replay is if the replay of the commands would produce different data values than the commands would have produced in the now unavailable session.

A work request from a client may span across several database transactions. For example, "check-out" action may comprise four database transactions: updating a credit card, updating the inventory, shipping the order, putting an item on back-order. The database transaction is the simplest level of retry, and the database system may re-establish the conversation state for a database session and repeats the database transaction, for recoverable errors. In one embodiment, the entire database transaction is repeatable if it did not commit. In one embodiment, when the client driver detects that the user session has failed, the client driver requests a new user session. In one example, on a new session with its own LTXID, the client calls the PL/SQL package GET_LTXID_OUTCOME passing the last logical transaction id of the failed user session. GET_LTXID_OUTCOME takes the action to commit this LTXID to the transaction table if that transaction has not already committed. When the LTXID is not already there, this has the effect of blocking any further usage. GET_LTXID_OUTCOME returns normal outcome back to the client COMMITTED and USER_CALL_COMPLETED. If the LTXID is out of sequence, GET_LTXID_OUTCOME will also report errors that indicate that the server is ahead (SERVER_AHEAD) or the client is ahead (CLIENT_AHEAD). Once the application has received the outcome of the last transaction, the application is able to proceed with actions such as replaying or not on the present session with the LTXID belonging to that session.

In one embodiment, the client obtains a new session and sets the last logical transaction id of the failed user session on the session handle. When the connect request is processed at the server, and the session handle references a logical transaction id, which triggers a call of the GET_LTXID_OUTCOME function to obtain the state of the transaction associated with this LTXID. The connect request returns the outcome of the transaction to the user in the session handle. Depending on the outcome of the last transaction, the last transaction can be replayed or no replay is necessary because the transaction has already been committed or can return the result to the application.

In one embodiment, the client is not authorized to test the transaction table for transaction outcome. Accessing the transaction table may provide a moment-in-time outcome, but the moment-in-time outcome may change as transactions continue to be committed against the database. If queried, a moment-in-time outcome may be out-of-date by the time the outcome reaches the client. Accordingly, a request for the outcome may be integrated with a blocking mechanism that prevents the reported outcome from becoming out-of-date. The blocking mechanism prevents a transaction from becoming COMMITTED after the outcome of the transaction has been reported to the client. The transaction may then be automatically committed in a new session or committed in the new session at the request of the client.

Detecting that a Server and a Client are not Synchronized

In another example method, a server receives, from a client, a request that identifies a particular set of command(s) that were sent by the client in a session using the LTXID. The request identifies the LTXID but does not identify a latest set of command(s) among multiple sets of commands that were received in the session. The latest set of commands, if completed in the session, would cause performance of a first server operation that starts a transaction, and a second server operation that commits the transaction. In this example, the server determines that the request fails to identify the latest set of commands among multiple sets of commands that were received in the session. In response to determining that the LTXID fails to identify the latest set of commands among the multiple sets of commands that were received in the session, the server sends, to the client, a response to the request that indicates that the client is not synchronized with the server.

In various examples, the server may determine that the server is ahead of the client, that the client is ahead of the server, or that the server and client are not synchronized regardless of whether the client is ahead or the server is ahead. In one example using the commit sequence in the LTXID, the server determines that the particular set of commands was committed before the latest set of commands, and the response from the server to the client further indicates that the server is ahead of the client. In a further example where the response indicates that the server is ahead of the client, the server determines that a first identifier of the particular set of commands is before a second identifier of the latest set of commands using the commit sequence in the LTXID.

In another example using the commit sequence in the LTXID, the server determines that the particular set of commands is not among the multiple sets of commands that were received in the session. The server may or may not determine whether the particular set of commands is before an earliest recorded set of commands that was received in the session, or after a latest recorded set of commands that was received in the session. In yet another example using the commit sequence in the LTXID, the server determines that a first identifier of the particular set of commands is after a second identifier of the latest set of commands, and the response further indicates that the client is ahead of the server.

In one embodiment, the server receives an unsynchronized request from the client in one session, and the unsynchronized request references a set of commands sent by the client in another, different session. In the one session, the server sends the response to the client indicating that the request from the client is not synchronized with the server.

In one embodiment, in addition to the unsynchronized request, the server receives, from the client, another request that identifies the latest transaction among the multiple transactions that were received in the session. In this embodiment, the server determines whether any transaction in the transactional set of commands has committed. Based at least in part on determining that at least one transaction in the transactional set of commands has committed, the server sends, to the client, another response to the other request that indicates that at least one transaction in the set of commands has committed and whether there is work to be done or data to be returned after that commit, that is the user call is complete or not. In a particular example, the requests reference a set of commands sent in a first session, and the server receives and responds to the requests from the client in a second session.

In one embodiment, in addition to an unsynchronized request that references a set of commands sent in a first session, the server receives, from the client in a second session, a second request that identifies the latest set of commands among the multiple sets of commands that were received in the first session. In this example, the server determines whether no transaction in the set of commands has committed. In response to determining that no transaction in the set of commands has committed, the server blocks completion of the set of one or more commands sent in the first session. In a particular example, the server also causes completion of the set of commands in the second session.

In one embodiment, in addition to the unsynchronized request, the server receives, from the client, a second request that identifies the latest set of commands among the multiple sets of commands that were received in the session. In this example, the server determines whether there are any transactions in the set of commands that have committed. Based at least in part on determining there is a transaction in the set of commands that has committed and there is no work to be done or data to be returned after that commit, the server sends, to the client, a response to the request that indicates that the user call may be treated as committed and complete.

Figure 12:
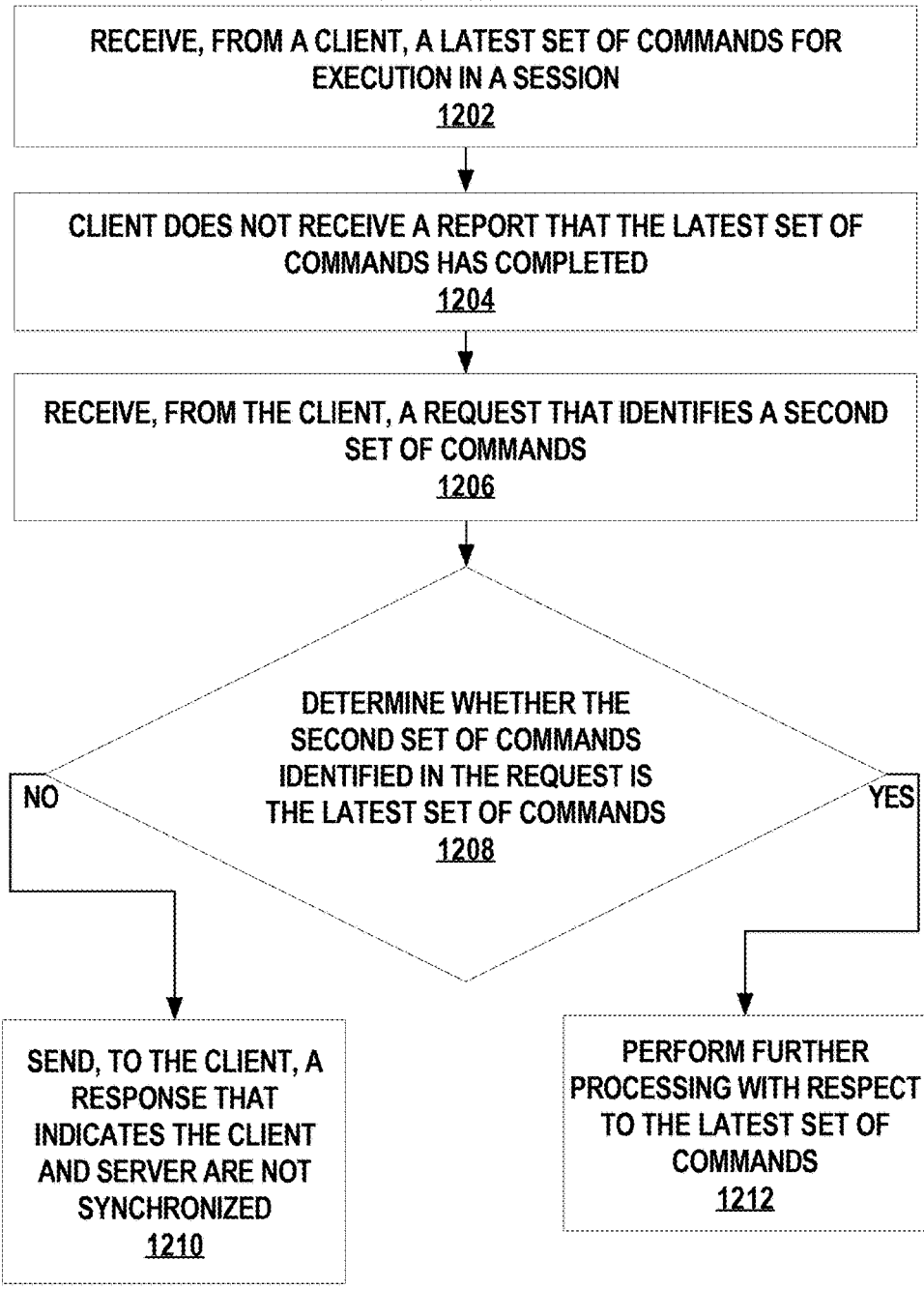
FIG. 12 illustrates an example method for checking whether a client is synchronized with a server.

FIG. 12 illustrates an example method for checking whether a client is synchronized with a server. In step 1201 the client first receives and holds an LTXID from the server at authentication or at check-out from a pool. In step 1202, a first server receives, from a client, a latest set of commands for execution in a session. The client does not receive a report that the latest set of commands has completed in step 1204. In 1206, a second server receives, from the client, a request that identifies a second set of commands using the LTXID that was passed to the client. The second server determines, in step 1208, whether the second set of commands identified in the request is the latest set of commands by using that LTXID. If not, the second server sends, to the client in step 1210, a response that indicates the client and the server are not synchronized. If the request identifies the latest set of commands, the second server performs further processing with respect to the latest set of commands in step 1212. For example, the second server may perform steps 1012, 1112, and/or 1114 of FIGS. 10 and 11.

Example Client-Side Features

In one example, when the driver proxy or WebLogic Server or third parties fail over a session, the client first acquires the LTXID from the previous failed session using the client driver provided APIs—getLTXID for JDBC and OCI_ATTR_GET with LTXID for OCI. Then the client acquires a new session with that sessions' own logical transaction id. The client invokes the GET_LTXID_OUTCOME function with the LTXID gotten from the API. The original LTXID of the failed over session is marked as blocked if that LTXID has not been used or is one higher than the last used. The return state tells the driver that the last transaction is uncommitted. A lost transaction can be replayed with the new logical transaction id (the LTXID associated with the newly created session). If this replay itself incurs an outage then the LTXID for the replaying session is used for GET_LTXID_OUTCOME function in yet another session to determine the outcome.

In one example, for replay by WebLogic Server, a Client Driver, or due to repeated request submissions, the client driver or WebLogic Server access the last LTXID that is held by the client driver using getLTXID for JDBC and OCI_ATTR_GET with LTXID for OCI.

The JDBC driver provides a callback that executes on each commit number change received from the server. WebLogic Server uses this callback to record the LTXID in the WebLogic Server cookie. This cookie may be replicated across a WebLogic Server cluster to facilitate recovery of the outcome of the request by any Java Virtual Machine ("JVM"). With many browser windows, the configuration setting for WebLogic Server may be set to one cookie per window so that duplicate submissions are detected.

The table provides example for a client or container using idempotence features to do its own replay. In the table, the number following the LTXID is an example commit number.

| Condition | LTXID on Client Session Handle | Callback on LTXID Change for Containers - JDBC only |
| --- | --- | --- |
| First connection taken from a pool (or a dedicated session). Assume a new session | Session contains LTXID-A 0 | New LTXID-A 0 is set in http session cookie by callback |
| First COMMIT is returned | LTXID-A 1 is returned from the server on commit message and is set in client session handle | Driver callback runs and sets LTXID-A 1 on http session cookie |
| Second and subsequent COMMITS | LTXID-A N is returned on COMMIT message and set in session handle | Driver callback runs and sets LTXID-A N on http session cookie |
| Basic Model Application checks-in gracefully with no transactions open | Session is returned to pool at LTXID-A N. LTXID N will be used by next check out request when running the basic model. | For the basic model, at check in LTXID on http session cookie is destroyed so it can be used by another request |
| Basic Model. Application checks-in gracefully - with implicit commit (RollbackLocalTxUponConn Close in WebLogic Server (default is false). | After commit completes, the callback updates the LTXID-A on the session handle to LTXID-A N + 1 | At check in LTXID on http session cookie is destroyed so it can be used by another request |
| Basic Model. Application checks-in gracefully - with implicit commit off (RollbackLocalTxUponConn Close in WebLogic Server) | The transaction is rolled back so LTXID-A is unchanged. | At check in LTXID on http session cookie is destroyed so it can be used by another request |

| Condition | LTXID on Client Session Handle | Callback on LTXID Change for Containers - JDBC only |
|---|---|---|
| Extended Model. Application checks-in gracefully with no transactions open | Session is returned to pool at LTXID N. LTXID N will be used by next check out request when running the basic model. | For the extended model, the LTXID on the session cookie is kept, should the client return, this will be used to continue |
| Extended Model. Application checks-in gracefully - with implicit commit (RollbackLocalTxUponConn Close in WebLogic Server (default is false). | After commit completes, the callback updates the new LTXID on the session handle to LTXID N + 1 | The COMMIT action advances to LTXID N + 1 via the callback when the commit returns. For the extended model, the LTXID on the session cookie is kept, should the client return, this will be used to continue. |
| Extended Model. Application checks-in gracefully - with implicit commit off (RollbackLocalTxUponConn Close in WebLogic Server) | The transaction is rolled back so LTXID is unchanged. | For the extended model, the LTXID on the session cookie is kept, should the client return, this will be used to continue. As no commit LTXID-N is kept |

In one embodiment, if failovers cascade without completing, the application passes the LAST LTXID in effect to FORCE_OUTCOME. The table provides example workflows for calling GET_LTXID_OUTCOME and responding to the different states reported as a result.

| Condition | LTXID on Client Session Handle | Callback on LTXID Change for Containers - JDBC only |
|---|---|---|
| Application receives an error and calls public FORCE_OUTCOME to determine the TX outcome for replay | Application takes a new connection (with its own LTXID-B 0) and calls FORCE_OUTCOME with the LTXID of the last failed session (LTXID N) | New LTXID-B 0 is set in http session cookie by callback |
| Application finds that the last session TX outcome is COMMITTED | Returns committed outcome to client - if next call is an end of request, the application can continue. | |
| Application finds that the last session TX outcome is COMMITTED and USER CALL has not completed | Returns committed outcome to client and exits - cannot progress past embedded commit as the work in the call is not known to be complete. | |
| Application Replay finds that the last session TX outcome is UNCOMMITTED | Restores mid-tier state if needed, and resubmits with the LTXID on the new session in effect, LTXID-B 0 If the new request executes any commits server returns commit messages with LTXID-B 2 and increasing . . . | New LTXID-B 2..N are set in http session cookie by callback |
| Application Replay Driver receives a recoverable error during replay | Replay driver takes a new connection (with LTXID-C 0) and calls public FORCE_OUTCOME again with the LTXID of LAST session (LTXID-B 0). | Driver callback runs and sets LTXID-C 0 on http session cookie. (Same http session with a different physical db session uses the same WebLogic Server cookie) |
| Application Replay Driver receives another recoverable error during replay | Replay driver takes a new connection (with LTXID-D 0) and calls public FORCE_OUTCOME again with the LTXID of LAST session (LTXID-C 0). | Driver callback runs and sets LTXID-D 0 on http session cookie. (Same http session with a different physical db session uses the same WebLogic Server cookie) |

In one embodiment, if failovers cascade without completing, the replay driver passes the LAST LTXID in effect to PREPARE_REPLAY. PREPARE_REPLAY calls GET_LTXID_OUTCOME if it determines that a transaction may be in effect. The following table provides example workflows for the replay driver.

| Condition | LTXID on Client Session Handle | Callback on LTXID Change for Containers - JDBC only |
|---|---|---|
| ORACLE Replay Driver receives a recoverable error and looks up outcome to replay | Replay driver takes a new connection (with LTXID-B 0) and calls PREPARE_REPLAY with the LTXID of original session (LTXID-A N) | Driver callback runs and sets LTXID-B 0 on http session cookie. (Same http session with a different physical db session uses the same WebLogic Server cookie) |
| ORACLE Replay Driver finds that the last session has tx outcome COMMITTED or and USER_CALL_COMPLETED | Returns committed outcome to client and exits on next call if stateful (dynamic) or purges the transaction and continues if stateless (static). | |
| ORACLE Replay Driver finds that the last session has tx outcome COMMITTED or and not USER_CALL_COMPLETED | Returns committed outcome to client but lets the client know that it cannot continue because more work was to be done | |
| ORACLE Replay Driver finds that the last session has TX outcome BLOCKED | Progresses replaying with the LTXID on the new session in effect, LTXID-B 0 | |
| ORACLE Replay Driver completes replay - no commit in the replay | Session is ready to continue in normal mode with LTXID-B 0 | |
| ORACLE Replay Driver completes replay - commit in the replay as the last call | Replay driver calls END_REPLAY before last call, and issues the last call COMMIT LTXID-B-1 is returned on COMMIT message and set in session handle | Driver callback runs and sets LTXID-B 1 on http session cookie |
| ORACLE Replay Driver receives a recoverable error during replay | Replay driver takes a new connection (with LTXID-C 0) and calls PREPARE_REPLAY again with the LTXID of LAST session (LTXID-B 0). | Driver callback runs and sets LTXID-C 0 on http session cookie. (Same http session with a different physical db session uses the same WebLogic Server cookie) |
| ORACLE Replay Driver receives another recoverable error during replay | Replay driver takes a new connection (with LTXID-D 0) and calls PREPARE_REPLAY again with the LTXID of LAST session (LTXID-C 0). | Driver callback runs and sets LTXID-D 0 on http session cookie. (Same http session with a different physical db session uses the same WebLogic Server cookie) |

In one embodiment, LTXID are created only when using a client that supports LTXID. Example LTXID-supporting clients may include, but are not limited to, OCI, JDBC thin and JDBC OCI clients. The LTXID functionality is supported for public usage on the ORACLE Drivers—JDBC Thin, JDBC OCI, and OCI, and on interfaces that sit above OCI including ODP.NET and OCCI.

In one embodiment, the client uses the LTXID on the session handle if a transaction is started, or if a transaction is open currently, the LTXID that will be recorded with that transaction at COMMIT time.

In one embodiment, the commit number in the LTXID is incremented by the server after COMMIT and the incremented LTXID is returned on the COMMIT message to the client driver. As a conversation progresses, the returned LTXID is used for the next transaction submitted and is then incremented at each COMMIT. This cycle continues with the LTXID advancing at each successful COMMIT.

In one embodiment, the JDBC driver provides a callback that executes on each commit number change received from the server. WebLogic Server uses this callback to record the LTXID in the WebLogic Server cookie. This cookie may be replicated across WebLogic Server cluster to facilitate recovery of the outcome of the request by any JVM. With many browser windows, the configuration setting for WebLogic Server may be set to one cookie per window.

In one embodiment, the client receives a FAN down interrupt or an error. The client aborts the dead session. If the error is recoverable, the client checks out a new session. The client gets the last LTXID using GETLTXID or from the context area. The client calls GET_LTXID_OUTCOME with the last LTXID gotten using GetLTXID. If the transaction is in-flight committed, the client receives a returned result. If no commits occurred, the client may roll back any application state changes and resubmit the request or return the result to the user. If commits occurred and the user call was not complete, the application might return this information to the user but should not replay.

In one embodiment, the LTXID is copied to the http session state at connection check-out, and at every change (that is, every successful commit). At every LTXID change, a callback from the JDBC driver transfers copies the LTXID from the client handle to the http session state (cookie). If a WebLogic Server instance fails, another WebLogic Server can restore the http session state and test the last outcome of the submission to WebLogic Server. Should the database instance (or server) fail, WebLogic Server can use the LTXID to test the outcome of the submission.

In one embodiment, on check-in the LTXID maintained on the session cookie is erased. The erased value is not available beyond a completed requested. In another embodiment, each http session has its own LTXID, which remains on check-in.

In one embodiment, the JDBC driver uses a new data source property called ReplaydataSource. This data source may be a single pool data source to allow the driver to reconnect to a different database instance following a failure. In one embodiment, the data source supports FAN/Fast Connection Failover and Runtime load balancing for fast error detecting and smart workload distribution to a known good location.

Example Connection Pool Features

In one embodiment, LTXIDs are stored in association with connections and sessions that are pre-established and shared in connection pools. In one embodiment, an LTXID exists on the session handle on the server and on the client. The LTXID is associated with an application request at check-out from the connection pool, and is disassociated from the application request at check-in back to the pool. Between check-out and check-in, the LTXID on the session is exclusively held by that application request. After check-in, the LTXID belongs to an idle, pooled session. The LTXID is associated with the next application request that checks-out that connection.

In this embodiment, the connection pool may support duplicate detection and failover for a present http request, basic WebLogic Server replay of one request, and WebLogic Server replay and replication across WebLogic Server or other containers for protection of mid-tier failure using http session state.

In another embodiment, an LTXID is allocated to a user request at first check-out from any mid-tier connection pool, and the LTXID is used at each subsequent check-out request by that web session. The LTXID sequence is not shared by other sessions. In this embodiment, a browser session is bound across requests. Requests are traced from an http session that commits to the database. This embodiment may support duplicate detection and failover for the present http request, and may support WebLogic Server replay and replication across WebLogic Server or other containers for protection of mid-tier failure using http session state. This embodiment may uniquely identify a transaction even if a frustrated user submits a request to complete a transaction after the transaction has been completed by another request.

In one embodiment, when a connection is established and pre-authenticated in the pool for a service that has the commit_outcome attribute set, an LTXID is held on the session at both the server and at the client. If the commit_outcome attribute later changes on/off the existing connections stay as they were when they were created. A database administrator ("DBA") may change the outcome of a pool by recycling the pool.

In many examples, a database session is not created when an HTTP request connects to the connection pool for the first time. Instead, the connection pool may assign an existing connection from the pool to satisfy that checkout request. At checkout, the LTXID owned by that database session is associated with the http session by virtue of checking out the connection.

At check-in, the connection is returned to the connection pool. The LTXID owned by that database session is released by the http session by virtue of checking the session back into the pool. The next checkout by a different http request can use this session, and, in one embodiment, the http session state is destroyed on check-in.

In one embodiment, the first checkout request for an http session is determined by virtue of no LTXID in the http session state for the http session. At FIRST sign-on the connection pool manager will call an LTXID get function to obtain the starting logical transaction id for a connection. The sign-on will set the LTXID, transfer the LTXID back to the client as part of the authentication handshake, and copy the LTXID to the client session handle. Subsequent check-outs use this same LTXID sequence so a round trip is avoided. In one embodiment, subsequent checkout requests arrive with the current and next LTXID set in the http session context from the previous conversation. For incoming http request with an LTXID, WebLogic Server Transaction Manager ("TM") asks the WebLogic Server pool manager to set this LTXID on the session handle.

In one embodiment, when replaying request with an LTXID, WebLogic Server TM asks the WebLogic Server pool manager to set this LTXID on the session handle. WebLogic Server TM then calls GET_LTXID_OUTCOME. If the request was COMMITTED or USER CALL was not completed, WebLogic Server TM returns commit and completion outcome and exits. If not COMMITTED, WebLogic Server has the choice to resubmit the request.

In another example, keeping the LTXID on the http cookie supports the impatient user case. In this way, repeated resubmissions can be detected. Only one using the LTXID will be able to commit.

At check-in the LTXID on the handle is copied to the http session state as the next to use, if this has not already been done.

In one example, if the http session times out, the LTXID state is lost and a new LTXID is allocated on the next check-out request. To support http request replay, the timeout to discard http session state exceeds the replay timeouts—at WebLogic Server and driver.

Conversely, if the LTXID retention period is less than WebLogic Server, replay returns an error as the LTXID is out of sequence or blocks if an 0 commit level.

In one example, if the commit_outcome attribute later changes TRUE/FALSE, the http sessions that started earlier stay with their original value of the attribute.

Managing LTXID when Using Connection Pools

In another example method, a connection manager holds connection objects for each of multiple available database sessions in which multiple database servers provide access to a database. Each one of this connection objects carries an LTXID that was allocated to that session at authentication. In the example, each database session of the multiple available database sessions is assigned to at most one database server and at most one client at a time. The connection object for each database session includes an LTXID that uniquely identifies the database session among the plurality of database sessions. The connection manager receives, from a client, a request for an available database session. In response to the request, the connection manager grants the previously used available database session to the client at least in part by sending, to the client, the connection object for the previously used available database session. This has the affect of granting the LTXID on that connection object to the application. This is the LTXID that will be next used by the server if that application session issues one or more transactions on a round trip.

In one embodiment, to distinguish the next transactional set of commands from the multiple transactional sets of commands that were completed in the previously used available database session, the connection manager uses the logical lranaction identifier that was completed in the previously used available database session. The connection object holds the last LTXID that it received at authentication and after authentication on each on each commit message. This is always the next LTXID that will be used by the server.

In one embodiment, in response to the request for an available connection, the connection manager grants the previously used available database session to the client that has the effect of assigning the LTXID. The connection pool manager may also receive another request, from the client, to return the used connection. In response to the other request, the connection manager releases that LTXID that was in use by the application ready to use for the next checkout request.

Figure 13:
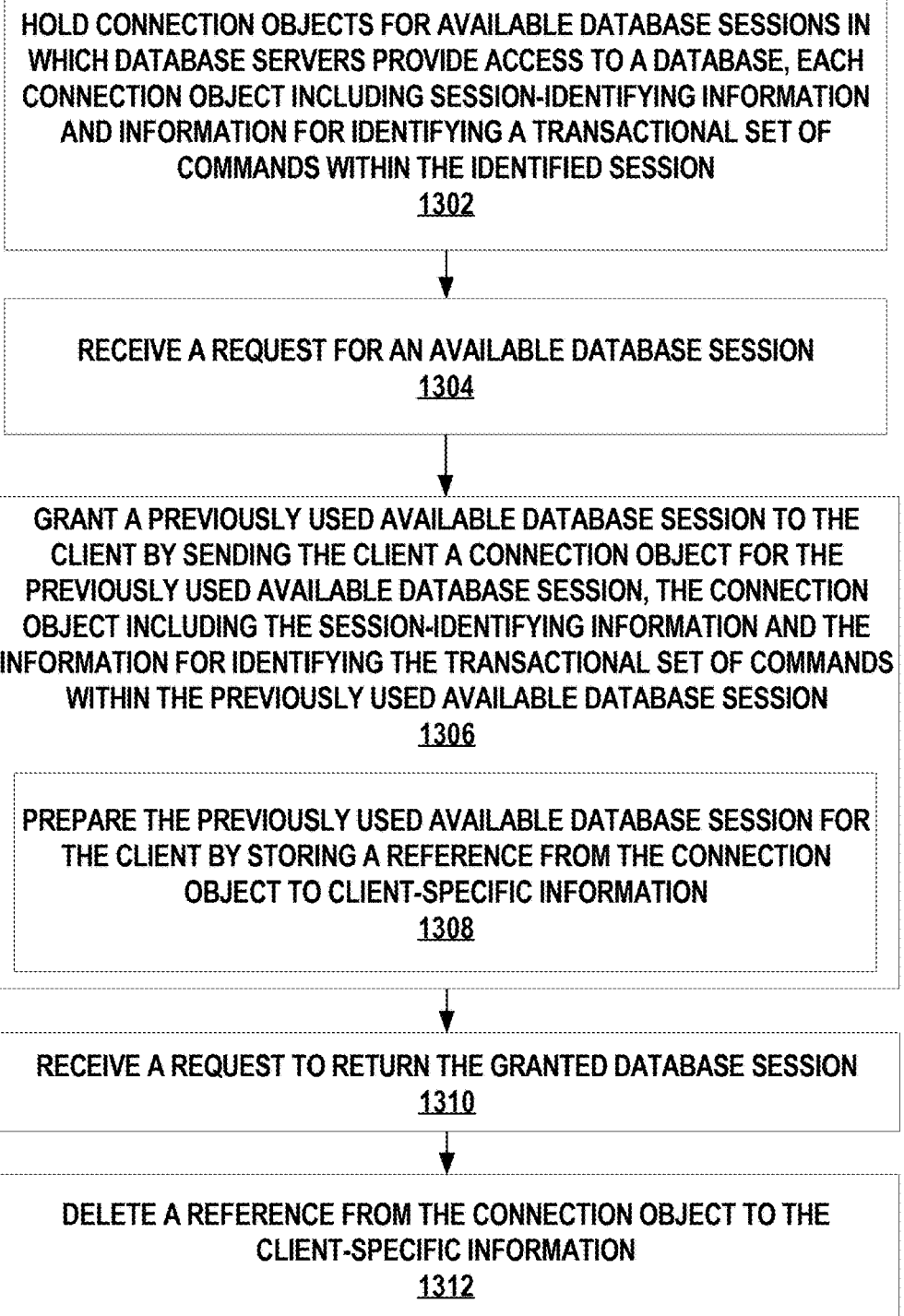
FIG. 13 illustrates an example method for managing a connection object that includes session-identifying information and information for identifying a transactional set of commands within the identified session.

FIG. 13 illustrates an example method for managing a connection object that includes session-identifying information and information for identifying a transactional set of commands within the identified session. In step 1302, the connection manager holds connection objects for available database sessions in which database servers provide access to a database. In the example, each connection object includes an LTXID within the identified session. There is an LTXID for sessions with a service that preserves commit outcome. Regardless of whether transactions have been executed or not, the client holds the next LTXID to use so it can determine the transaction out come if there is potential for a transaction. The LTXID is the next that the server plans to use for that session, and is updated on each commit and returned to the client at that commit. The client sends the LTXID to the server if the client needs to know a transaction outcome.

The connection manager receives a request for an available database session in step 1304. For example, the request may be received from a client that is preparing to execute commands on the database session. In step 1306, the connection manager grants a previously used available database session to the client by assigning, to the client, a connection object for the previously used available database session. In the example, the connection object includes the LTXID within the previously used available database session. The connection pool manager may also grant new database sessions or database sessions that have never been used or have never been used to execute a previous transaction. In each case the client receives the LTXID that will be used if a transaction is issued in a round trip.

In one embodiment, the connection pool manager prepares the previously used available database session for the client by storing client-specific information in association with the connection object, for example, by storing a reference to the client-specific information in the connection object, as shown in step 1308. Step 1308 may be part of the process of granting the previously used available database session to the client. For example, a stored application context, user context, or security context may be associated with the connection object before the connection object is sent to the client. After the client has used the database session or has borrowed the session for a period of time, in step 1310, the connection manager may receive a request from the client to return the granted database session. In response to the request, the connection manager does nothing as there is no client-specific information that is stored in association with the connection object. In another example, the connection manager deletes a reference from the connection object to the client-specific information. In another example, the connection manager deletes the client-specific information itself. Ordinarily the session is released and no action is taken.

Example Server-Side Features

In one embodiment, users connect to the database through database services. The service definition may include an attribute called commit_outcome. If this attribute is set for a service, LTXIDs are created; otherwise, commands may be executed without tracking transactions.

Figure 2:
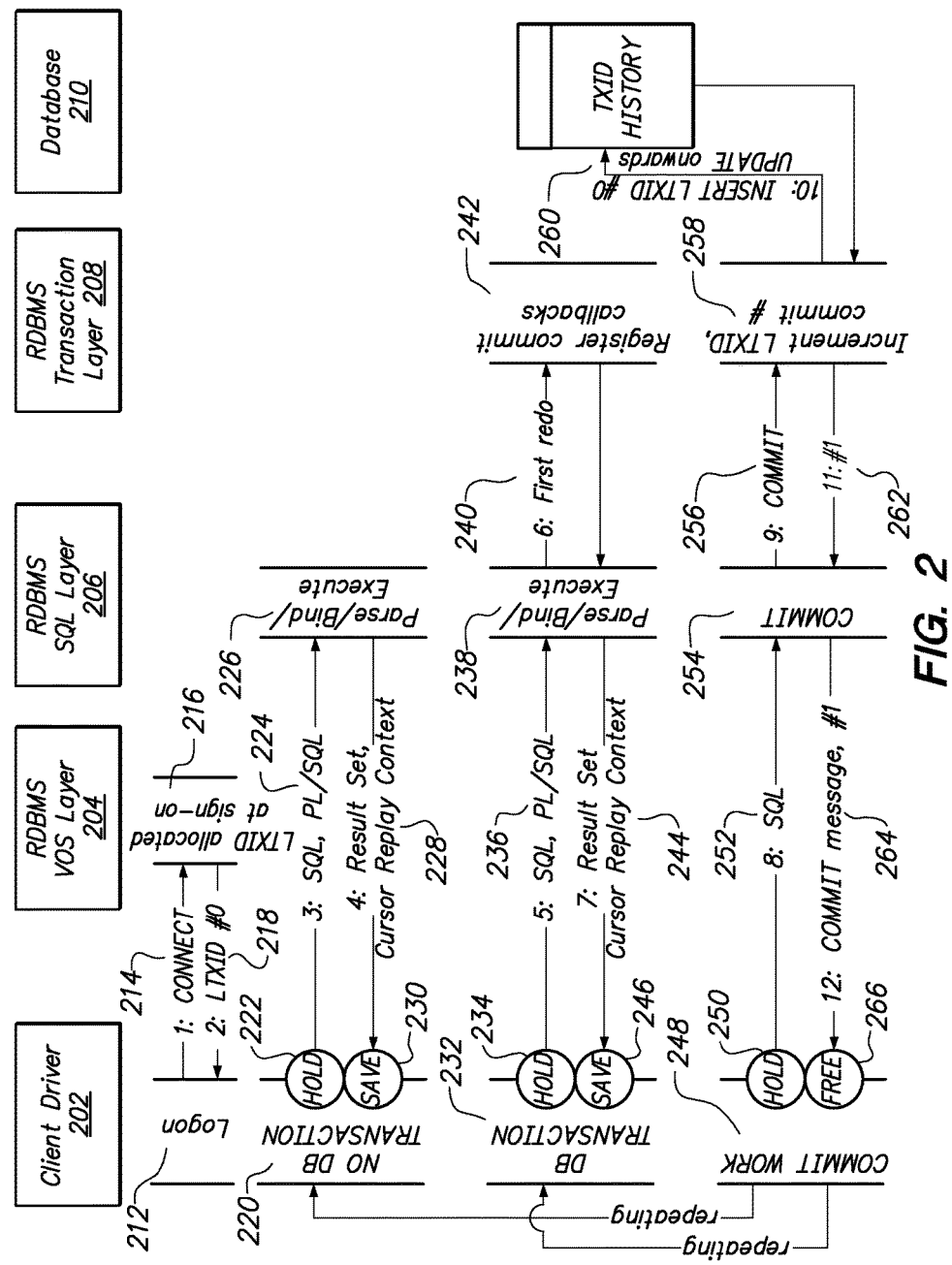
FIG. 2 illustrates example steps for managing a logical transaction identifier ("LTXID") in a database system.

In one embodiment, the server creates and maintains the logical transaction ids. FIG. 2 illustrates example steps for managing a logical transaction identifier ("LTXID") in a database system. As shown, an application connects with the corresponding driver to the server in a new database session in step 214. As part of the session creation, the server also creates a new LTXID. In one example, the LTXID is created and stored only in the user session structure in memory and is then returned to the user. At this point, the LTXID is not yet stored in the transaction history table. The new LTXID is returned to the driver in step 218, and the user can query the session handle to obtain the LTXID value. In one example, the LTXID starts at commit number zero. The LTXID might change only when changes are committed to the database. If only reading, the LTXID does not change. This is the case, for example, for active data guard and read only databases and when browsing and reading to make decisions.

In one embodiment, the application/driver has the ability to set additional attributes to be associated with an LTXID. For example, the additional attributes may be set for LLR transactions and XA transactions, with the integration with WebLogic Server or other containers so that the VM, machine name or participating end points are known.

In one embodiment, a user starts a new database transaction in step 236 by executing a DML, DDL or "SELECT FOR UPDATE" statement to make a first change (first non-recursive redo generation). When the server first generates redo in step 240, the transactions registers a pre-commit and a post-commit callback in step 242. This process works for DDL and DML statements in the same way as long as the DDL is not started when a transaction is already active.

In one embodiment, at commit execution in step 256, the pre-commit callback is invoked in step 258, and inserts or updates a record in the transaction history table in step 260. If the transaction is a first transaction of a user session, a new record is inserted into the transaction history table. In one example, transactions that are executed after the first transaction only update the corresponding record in the transaction history table. In another example, each transaction may have its own record. At commit time the update or insert of the transaction history table is persisted as part of the same database transaction as the client transaction. The pre-commit callback skips autonomous transactions and recursive transactions.

In one embodiment, the new commit number is exactly one higher (commit numbers are strictly monotonically increasing) than the new commit number stored in the transaction history table. Due to the usage of GET_LTXID_OUTCOME, at failover new work continues with an LTXID, and so DBID and instance id from the new instance so there is no need to reset the DBID or instance id to maintain partitioning. In one embodiment, for each user session, there is at most one record in the transaction history table.

After the commit completes, the post-commit callback is invoked. The post-commit callback calls a function to get the next LTXID that is the next LTXID that the server will record. In one embodiment, the function does not create a new LTXID, but the function increments the running commit number part of the LTXID. The new LTXID is returned to the client on the session handle in step 264 so that the client holds the next LTXID that the server plans to use.

In one example, the increment is strictly by one, creating a monotonic increasing sequence. In another example, the LTXID is changed in some other predictable manner. Replay is not accepted if this sequence is out of order, has gaps, or if the specified LTXID is not the expected LTXID. Incrementing the commit number and updating the LTXID at the next commit is a highly scalable operation.

Using a monotonic increasing commit number may protect from replaying against a database that has lost transactions. In one example, if a database has gone back in time by opening at an earlier System Commit Number ("SCN") with Data Guard, Flashback or Media Recovery, a session may be prevented from continuing to record if there is a gap in the commit sequence for that session.

In one example, the client sends the commit request, and the transaction is committed as part of the same commit. The DML against the transaction history table is committed as part of this transaction. First, the pre-commit callback is executed. The LTXID commit record is inserted or updated as part of the pre-commit callback. If the transaction is the first transaction of a user session, a row is inserted, and later transactions update the commit number on the row in the transaction history table. Updating rather than inserting provides high scalability, although other embodiments are also possible.

After the transaction has synchronized the redo and before the commit message is returned, the post-commit callback is invoked. If the transaction has been successfully committed, the running commit number of the logical transaction id is incremented in the end transaction callback and is returned to the SQL layer. The running commit number is monotonically increasing. The new logical transaction id is returned to the driver silently as part of the return result for the commit message. The next transaction of this session uses this new logical transaction id.

As part of a transaction both DML statements and DDL statements can be executed. One difference between the two types of statements is that in the absence of auto-commit mode each DDL statement issues an implicit commit after it has finished its work. In addition if a transaction is already open it first executes an implicit commit before it performs the DDL operation. If no transaction is currently open, a DDL operation is treated in the same way as a DML operation that has auto-commit enabled.

Applications can execute PL/SQL blocks that contain one or more commit operations. For PL/SQL execution, there is no recorded end marker. If a commit is executed inside PL/SQL, a number of conditions can exist. These included nested levels of PL/SQL. There may be a single commit as the last operation executed for the PL/SQL. There may be more commands after the COMMIT and no further COMMITs are executed. There may be other commands after the COMMIT, including further COMMITs. There may be other commands after a COMMIT, including further COMMITs, and a COMMIT is the last operation.

A set of commands may have an outcome of COMMITTED, meaning that the COMMIT occurs at the end of the top-level call. This is the same outcome as a top-level COMMIT. Alternatively, a set of commands may have an outcome of EMBEDDED, meaning that the COMMIT occurs within the top-level call and there may be more work that follows this COMMIT or data to return with the COMMIT result. In this case the "user call" has the outcome committed but is incomplete. For the GET_LTXID_OUTCOME function, COMMITTED=TRUE, USER_CALL_COMPLETED=FALSE.

In one embodiment, if there are one or more COMMITs executed in the PL/SQL, the LTXID is incremented no more than once for the round trip from the client to the server. If COMMIT is the last operation in the PL/SQL and there are no registered callbacks that could potentially COMMIT, the outcome of the COMMIT is set to a FULL commit. If COMMIT is not the last operation in the PL/SQL or there are no registered callbacks that could potentially COMMIT, the outcome of the COMMIT is set to a EMBEDDED commit. Once the outcome is set to EMBEDDED, execution of a last COMMIT operation changes the outcome to COMMITTED. If set to full, the GET_LTXID_OUTCOME function returns COMMITTED=TRUE, USER_CALL_COMPLETED=TRUE.

In one embodiment, by virtue of registering commit triggers at first redo generation, and recording idempotence in the COMMIT call, auto-commit transactions are fully protected. That is the outcome for autocommit transactions can be known by using the LTXID.

In one embodiment, DDL executes an explicit, top-level COMMIT at the beginning and at the end of the DDL. This brackets the DDL and creates an atomic operation. The number of COMMITs executed and the level executed is DDL specific.

In one embodiment, the initial commit is a no-op if there is no transaction open. If a transaction is open, pre-commit and post-commit triggers were registered, and an initial COMMIT has the outcome EMBEDDED.

In one embodiment, DDL increments the LTXID only after the final top level COMMIT. As some DDL have no redo at the time of the last COMMIT, executing the pre-commit trigger explicitly generates redo. The outcome of the COMMIT for DDL is COMMITTED when the DDL completes the last top level COMMIT. The last COMMIT has the outcome updated to COMMITTED if the outcome was set to EMBEDDED by the first COMMIT.

In one embodiment, a PDML statement is executed as several independent slave transactions. A PDML statement with a parallel degree of N has up to N+1 transactions. The PDML statement has one parent transaction and n slave transactions. The parent transaction acts as the co-ordinator and inserts or updates the LTXID. If any of the slave transaction fails, the whole transaction is rolled back (including all the slave transactions) and no LTXID is inserted. PDML internally uses a two-phase commit protocol to provide consistent commit or rollback across several processes and database instances.

Figure 6:
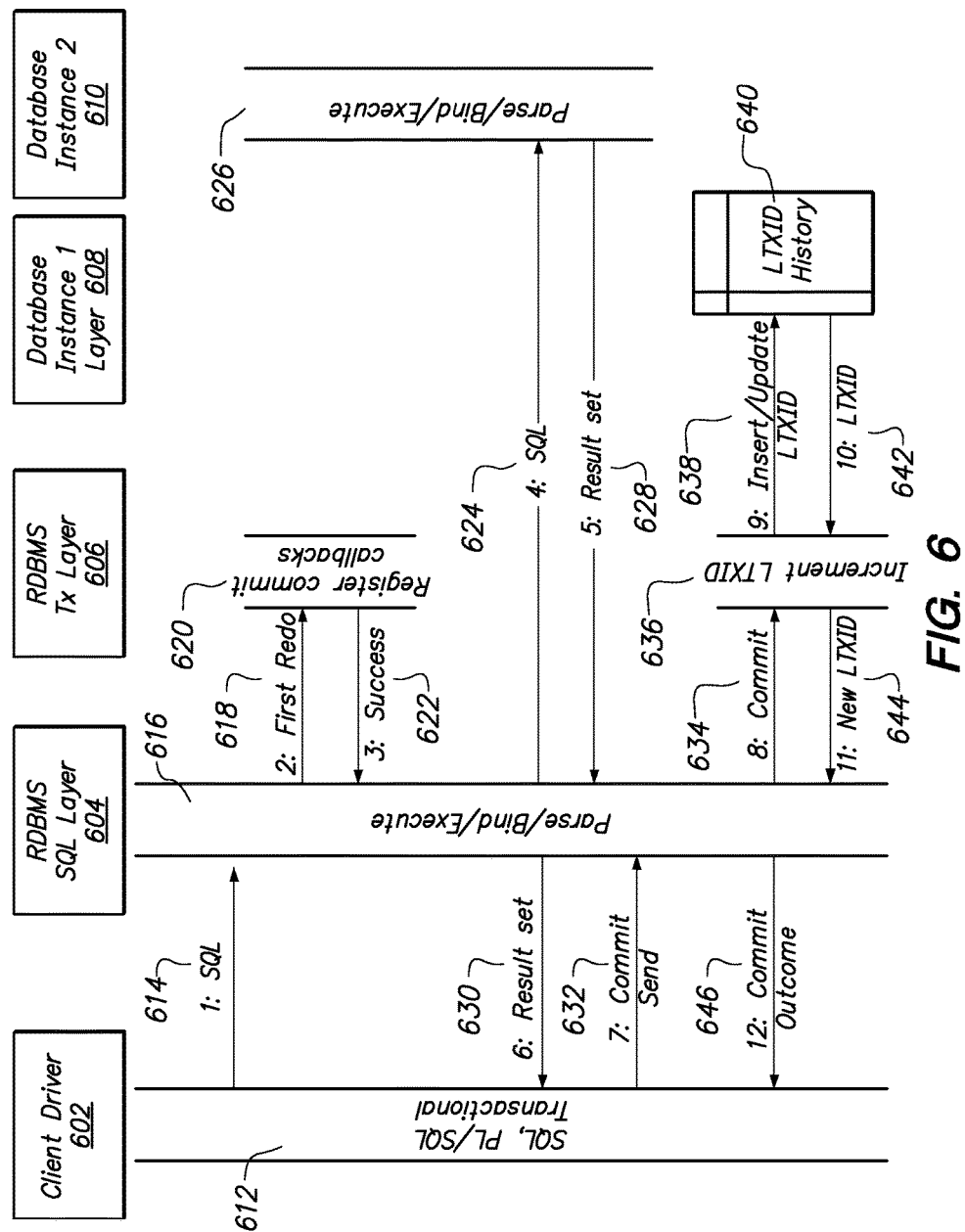
FIG. 6 illustrates example steps for managing a transaction state in a database system when a Parallel Data Manipulation Language ("PDML") statement is executed.

FIG. 6 illustrates example steps for managing a transaction state in a database system when a Parallel Data Manipulation Language ("PDML") statement is executed. The example steps include:

1. SQL statement is sent to the server (step 614)
2. The SQL layer starts a new transaction. (step 618)
3. At the point of the first redo generation the pre-commit and post-commit transaction callback gets registered and the success is returned to the transaction layer (step 622)
4. The slave SQL is created or acquired and sent to the PL/SQL slave processes. (step 624)
5. The result sets are sent back to the query coordinator. (step 628)
6. The result is returned to the client. (step 630)
7. The client process sends the commit command. (step 632)
8. The SQL layer executes the commit command. (step 634)

9. The TX layer commits the transaction and invokes the pre-commit transaction callback. (step 638)
10. The post-commit transaction callback creates the next logical transaction id. (step 642)
11. The new logical transaction id and the transaction outcome are returned to the SQL layer. (step 644)
12. The new logical transaction id and the transaction outcome are returned to the client on the commit message. (step 646)

In one embodiment, in case that the client already has started a local transaction before executing the parallel DML, the transaction is implicitly converted to a "parallel" transaction. No implicit commit of the local transaction is done.

In one embodiment, a client that issues a new distributed transaction acts as the distributed transaction coordinator. On the database where the client is connected, a new LTXID mapping is stored. At commit time, the mapping is inserted into the transaction history table. The LTXID is associated with the distributed transaction. The distributed transaction uses the standard two-phase commit protocol to commit or rollback the transaction.

Remote transactions are different from the other types of database transactions discussed so far: they can create transactions in more than one database.

The different scenarios for distributed transactions can be distinguished (including 1PC optimization):
Two or more different databases
Same RAC database instance
Same database instance When a remote transaction is started, a "fake" transaction may be created on a local database, and at commit time, no commit record needs to be persisted as locally no changes to the database have been made. Only the transaction on the remote database is committed. This behavior may be retained if no logical transaction ids are generated.

In one embodiment, for remote transactions, a fake transaction id normally used is mapped to a "real" transaction, and the logical transaction id is persisted in the transaction history table on the coordinating database when the first redo got generated. This change transitions a remote transaction to a distributed transaction and is handled in the same way as distributed transactions. In one embodiment, 2PC protocol is used for remote transactions.

No logical transaction id is required on the remote database, as the transaction is either committed or rolled back by the distributed transaction co-ordinator. The distributed co-ordinator takes care of the rollback on all database instances using the two-phase commit protocol.

The workflow for distributed transactions is very similar to the case of local transactions. Example steps include:
1. The client sends a SQL statement to the server
2. The SQL layer receives the new statement and starts a new transaction
3. At the point when the first redo is generated the pre-commit and the post-commit transaction callbacks are registered. The first redo can either be local or remote redo. The success of registering the commit callbacks is returned to the SQL layer.
4. The SQL layer sends the SQL command to the remote database for execution. The LTXID is not sent to the other database; it is only persisted on the database where the user is connected.
5. The remote database returns the result set to the SQL layer
6. The result set/result is returned to the client
7. The client issues a commit request
8. The commit request is parsed and is sent to the transaction layer
9. The transaction layer invokes the pre-commit callback and inserts or updates the record in the transaction history table, then the transaction itself is committed and the post-commit callback is executed. The post-commit callback creates the next LTXID.
10. The new LTXID is returned to the transaction layer
11. The LTXID is returned to the SQL layer
12. The LTXID is then sent with the commit message to the client driver
13. The client driver issues a callback to make the LTXID available to higher level containers The commit processing does not change: the distributed transaction invokes the two-phase commit protocol. The transaction is either committed or rolled back on all the databases or transaction tables. The inserts or updates for logical transaction id are persisted as part of the same distributed transaction.

In one embodiment, an additional state of prepared is added to the transaction state table. This state is called IN_DOUBT. If the transaction is in the prepared state, the client should not resubmit the transaction when the transaction outcome is unknown. If GET_LTXID_OUTCOME is called against a transaction that is IN_DOUBT state, the attempt to insert or update the LTXID is blocked waiting on the lock. The application may cancel the request.

In one embodiment, LTXID processing excludes autonomous transactions. Autonomous transactions have a different lifespan than the main transaction, and autonomous transactions do not have a logical transaction id associated with them. Autonomous transactions may be executed more than once. This allows replay of the primary conversation that failed to commit, independent of whether autonomous transactions committed. In this embodiment, no at-most-once execution semantics are provided for autonomous transactions.

One-phase commit (1PC) is an optimization of the two-phase commit protocol. In one embodiment, before issuing the commit (XAcommit), the transaction coordinator sends the prepare message to all the transaction branches, but at most-one will reply with "PREPARED". Others will reply "READ_ONLY". In this case, the commit is sent only to the transaction branch that replied with the state "PREPARED". Since DML cannot occur after prepare, one LTXID is elected for recording. This must be recorded before prepare executes. The LTXID elected is used for GET_LTXID_OUTCOME. In another embodiment, the GTRID is recorded rather than LTXID. As the GTRID is the same for all branches, the client can lookup the GTRID to know the outcome using a similar function GET_GTRID_OUTCOME. There is no need to elect an LTXID in this embodiment as the GTRID already spans the branches.

In one embodiment, for 1PC optimization, the LTXID is recorded and incremented only on the first branch to prepare. WebLogic Server and other containers know which branch is the one that prepared first. WebLogic Server will use the LTXID with GET_LTXID_OUTCOME to determine the transaction outcome. In another embodiment, WebLogic Server can use the recorded GTRID to determine the outcome of the transaction.

In one embodiment, after a client has reconnected after an outage, the client invokes the GET_LTXID_OUTCOME function. The GET_LTXID_OUTCOME function inserts or updates the LTXID that was associated with the previous session if the passed LTXID has not committed. The insert/update will mark the LTXID as blocked. The application is then safe to replay the transaction with the new LTXID (the LTXID that was created when the session was established) or to return the uncommitted outcome to the application or to take some other action with this outcome.

In one embodiment, GET_LTXID_OUTCOME is a publically available PL/SQL function. In one embodiment, an internal FORCE_OUTCOME PL/SQL function has the following outcomes: COMMITTED, EMBEDDED, FORCED plus ERROR codes. FORCE_OUTCOME returns COMMITTED if the transaction has been committed, EMBEDDED if a commit has been executed inside a PL/SQL block or a java stored procedure and this COMMIT was not a single COMMIT and the last call in the PL/SQL block, and FORCED if the transaction has not been committed or has been aborted by a previous call to FORCE_OUTCOME. The public GET_LTXID_OUTCOME PL/SQL function has Boolean outcomes: COMMITTED and USER_CALL_COMPLETED plus ERROR codes. GET_LTXID_OUTCOME returns COMMITTED=TRUE if any transaction has been committed, USER_CALL_COMPLETED=TRUE if a commit has been executed inside a PL/SQL block and this COMMIT was not a single COMMIT and the last call in the PL/SQL block or a java stored procedure or there was more data to return, and COMMITTED=FALSE if the transaction has not been committed or has been aborted by a previous call to the internal FORCE_OUTCOME.

In one embodiment, if the transaction is to be replayed after failover, the original LTXID is recorded with BLOCKED outcome. If the original session attempts to commit the transaction, that commit is detected and rejected. Blocking an outcome prevents an in-flight transaction carrying the same LTXID from committing, and makes it safe for the application to replay according to at-most-once execution semantics. The new LTXID (associated with the session the client reconnected/failed over) is used to replay the transaction.

If a transaction has already updated the record in the transaction history table and the row is locked, the GET_LTXID_OUTCOME function waits until the previous transaction completes. If a row is locked because the transaction is in-doubt, FORCE_OUTCOME also waits.

In one embodiment, the return codes of FORCE_OUTCOME are mapped to the following replay operations: COMMITTED is mapped to CONTINUE; FORCED is mapped to REPLAY; EMBEDDED is mapped to NO_REPLAY/ERROR; SERVER_AHEAD is mapped to NO_REPLAY/ERROR; CLIENT_AHEAD is mapped to NO_REPLAY/ERROR; and OWN_SESSION is mapped to NO_REPLAY/ERROR.

In another embodiment, the return codes of GET_LTXID_OUTCOME are mapped to the following replay operations: COMMITTED=TRUE and USER_CALL_COMPLETED=TRUE are mapped to CONTINUE; COMMITTED=FALSE is mapped to REPLAY; COMMITTED=TRUE and USER_CALL_COMPLETED=FALSE is mapped to NO_REPLAY/ERROR; SERVER_AHEAD is mapped to NO_REPLAY/ERROR; CLIENT_AHEAD is mapped to NO_REPLAY/ERROR; and OWN_SESSION is mapped to NO_REPLAY/ERROR.

In one embodiment, the user executes DDL statements against the database. The DDL driver implicitly commits each statement. The final, implicit commit will create the next LTXID and send the new LTXID back to the client on the same roundtrip. A single DDL can issue several commits. For each of these commits, in one embodiment, the running commit number of the LTXID is increased only for the first. By incrementing the commit number no more than once per round trip, the client will not experience the error SERVER_AHEAD if the client tests the transaction outcome for that LTXID.

In one embodiment, the TRUNCATE DDL operation is idempotent. The TRUNCATE DDL operation executes as a series of recursive operations and does not register for or increment the LTXID. In one embodiment, if there is an open transaction before the TRUNCATE statement is run, this transaction is committed implicitly before the truncate executes. The implicit commit updates the LTXID by one. Otherwise the LTXID is not incremented by the TRUNCATE statement. In another embodiment, the LTXID is incremented whenever the TRUNCATE operation truncates any rows at all.

In one embodiment, the client issues a DDL command with an open transaction. If the application already has a transaction opened when it issues the DDL statement, the open transaction is implicitly committed; the LTXID is advanced at this point. When the DDL executes, this causes the LTXID to increment again. For this reason, each round trip from the client increments the LTXID by no more than one regardless of how many commit operations executed in that round trip.

In one embodiment, if multiple COMMITS do occur, the FORCE_OUTCOME PL/SQL call returns the error SERVER_AHEAD as the LTXID on the client handle is more than one in advance of the server. The client should consider it not safe to replay as the DDL may have more work to do. As above, for this reason in the main embodiment, each round trip from the client increments the LTXID by no more than one regardless of how many commit operations executed in that round trip.

In one embodiment, at commit time, the update or insert of the transaction history table is persisted as part of the same database transaction as the client transaction. After the commit completes, the post-commit callback is invoked. The post-commit callback calls a function to get the next logical transaction id. In one example, the function does not create a new logical transaction id. The function increments the running commit number part of the logical transaction id. The new logical transaction id is returned to the client on the session handle. This is a highly scalable design as the update executes insitu.

In one use case, replay is on a session with its own LTXID. If the transaction is replayed after a failover, a function that gets the next LTXID and is executed as part of the end transaction callback not only updates the commit number, but also updates the instance id value to correctly specify the instance where the next transaction will be executed.

In one embodiment, the NOWAIT option of the COMMIT command is not integrated with commit_outcome services. If a user session, which is connected with a "commit_outcome" service, executes the COMMIT NOWAIT command, the commit will be issued, and there is no guarantee that the commit has been persisted. If the server fails, FORCE_OUTCOME may return the error CLIENT_AHEAD if the LTXID was advanced and received at the client but the commit was not persisted.

In one use case, if the commit statement is not returned to the client (for foreground or instance or network message is lost), the client hangs. After FAN event or error messages arrive, the application can call GET_LTXID_OUTCOME or if using the replay driver with failover_mode is TRANSACTION, the replay driver calls PREPARE_REPLAY that under the covers calls GET_LTXID_OUTCOME.

In one use case, the PL/SQL package GET_LTXID_OUTCOME is called to determine the outcome using current logical TXID. A result of GET_LTXID_OUTCOME may include: COMMITTED=TRUE and USER_CALL_COMPLETED=TRUE—the transaction associated with this LTXID committed and completed; COMMITTED=TRUE and USER_CALL_COMPLETED=FALSE—the transaction committed. However inside PL/SQL and that PL/SQL may or may have needed to return more information to the client following that commit; COMMITTED=FALSE—the transaction is uncommitted; SERVER_AHEAD—the LTXID passed is behind the server by more than one; CLIENT_AHEAD—the LTXID passed is ahead of the server by more than one; OWN_SESSION—the LTXID passed to the server belongs to the current session. The OWN_SESSION state is treated as an error to prevent a session from blocking itself.

In one use case, the internal PL/SQL package FORCE_OUTCOME is called to determine the outcome using current logical TXID. A result of FORCE_OUTCOME may include: FORCED—the passed LTXID is committed with a blocked outcome so an in-flight transaction cannot commit; COMMITTED—the transaction committed; EMBEDDED—the transaction committed inside PL/SQL and that PL/SQL may or may not have completed; SERVER_AHEAD—the LTXID passed is behind the server by more than one; CLIENT_AHEAD—the LTXID passed is ahead of the server by more than one; OWN_SESSION—the LTXID passed to the server belongs to the current session. The OWN_SESSION state is treated as an error to prevent a session from blocking itself.

In one embodiment, the client requests a commit when the transaction has been completed. In other embodiments, the client may not be aware that a COMMIT has been performed. For example, an implicit commit may occur when a DDL statement is executed while a transaction is already active. As another example, several commits may be issued by a single DDL statement. In other examples, a commit may occur within PL/SQL procedures or blocks, in Java stored procedures, or in callouts. In many cases, a commit is executed on the server on the application's behalf using autocommit code. This list is by no means complete and there might be other circumstances under which implicit commits or additional commits are executed.

In one embodiment, if a call does increment the LTXID more than once before returning to the client, then using FORCE_OUTCOME to determine the outcome of that call will result in the error SERVER_AHEAD because the monotonic increasing protocol between the server and client is violated. Accordingly, in one example, for PL/SQL and all user calls, the system will increment the LTXID by no more than one regardless of the number of COMMIT operations issued by that call.

For the rollback and rollback to savepoint statements two different scenarios are distinguished:
  Implicit rollback by the RDBMS
  Explicit Rollback requested by the application In one embodiment, if the transaction is aborted, the end transaction callback is invoked, but a new logical transaction id is not generated. The same logical transaction id is used for the next database transaction. The transaction rolls back.

In one embodiment, if the client executes a "ROLLBACK WORK" statement, similarly no new logical transaction id is generated when the end transaction callback is executed.

In one embodiment, if the transaction fails before the outcome of the rollback is returned to the client, the transaction is rolled back regardless of the failure. If the transaction fails before the rollback is executed, the transaction is also automatically rolled back by instance or PMON recovery. The logical transaction id is not advanced, but the rollback happens anyway.

In one embodiment, auto-commit transactions are treated like normal transactions. A new logical transaction id is returned in the session handle on commit. The new logical transaction id allows the client to interface with the server to determine the success of autocommitted transactions when an outage occurs. This embodiment includes the use of the directive "commit on success" that can be set to commit any open transaction if the call on which it is specified is successful.

In one embodiment, if the client executes the statement "set transaction read only" before starting the next transaction, the transaction is marked as read-only. Read only transactions do not invoke the callback at redo generation, because DML is not executed against the transaction history table. In one embodiment, the logical transaction id is not incremented at commit time for a read-only transaction, which does not change the database. In another embodiment, the logical transaction identifier may keep track of read-only transactions in addition to transactions that change the state of the database, even though the read-only transactions do not change the database. In one embodiment, the transaction history table may not hold a record for read-only transactions because read-only transactions do not change the database.

In one embodiment, if a client issues parallel DML, the user session takes the parallel coordinator role and starts the parent transaction. To execute the query, parallel query slaves are started and these parallel slaves in turn create their own transactions. These slave transactions are linked to the parent transaction. If any of the slave transactions fails on the same or a separate database instance, the parent transaction and all its slave transactions are rolled back. In one example, only the parent transaction is associated with a logical transaction id, as the slave transactions are linked through the parent transaction. The logical transaction id is inserted or updated into the transaction history table on the database instance where the query coordinator is located.

In one embodiment, for a read/write database, the name space of the local database is used for the LTXID. If this is a read only database, or active data guard, dblinks can point back to the primary database. In the case of a loopback, the coordinator may write to the transaction table. The 1PC optimization may also be in effect.

In one embodiment, a two-phase commit mechanism ensures that all nodes either commit or perform a rollback together. If any of the three phases fails after there is a prepare call because of a system or network error, the transaction becomes in-doubt. The recovery ("RECO") process automatically resolves in-doubt transactions when the machine, network, or software problem is resolved. Until RECO resolves the transaction, the data is locked for both reads and writes. The database blocks reads at a higher SCN. In many examples, the database resolves the in-doubt transaction automatically. This also resolves the LTXID associated with that transaction.

In one embodiment, knowing the transaction outcome may be delayed if a distributed transaction is still pending. The transaction result is not returned to the user until the distributed transaction has been resolved. In addition the locks held by the distributed transaction might block other user sessions.

In one embodiment, the client issues XA transactions. XA transactions include one or several transaction branches. These transaction branches are linked by the same global transaction ID ("GTRID"). The GTRID is set in the XA conversation and in the transaction table. Oracle database supports both tightly-coupled branches and loosely-coupled branches. Tightly coupled XA transaction branches are executed serially. Several transaction branches of the same XA transaction are not executed in parallel. A transaction branch is closed before a new one is started (the close of a transaction branch can be invoked implicitly). Each transaction branch has its own LTXID and the same GTRID. In one embodiment, logical transaction id's are not used for XA transactions; instead the GTRID is recorded to know the transaction outcome.

In one embodiment, only the first branch (per database) that generates redo of a XA transaction inserts into the GTRID history table. Additional transaction branches do not make changes to the transaction history. In another embodiment, the first branch to PREPARE and flush redo, processes the pre-commit trigger that records the GTRID.

In one embodiment, clients such as Weblogic Server and Tuxedo have their own globally unique transaction identifiers, GTRIDs. These unique transaction identifiers can be provided as the GTRID that is recorded in the transaction history.

In one embodiment, all branches of an XA transaction have the same GRID. The WebLogic Server GTRID is unique globally and is saved in the http session state. One connection is held for the life of a transaction, and the GTRID and container ID are set in place of LTXID. When sharing connections, a first transaction GTRID is checked to see if the first transaction GTRID is in http session state before resuming the other.

In one embodiment, calling the function XAstart creates a new transaction branch. XAstart results in the allocation of a GTRID and it sets the transaction bit in the transaction state object and the session handle. The XAstart call is the first step in XA protocol when using the XA data source. No queries can be executed before the XAstart function call is executed. Every branch has a branch qualifier.

Figure 7:
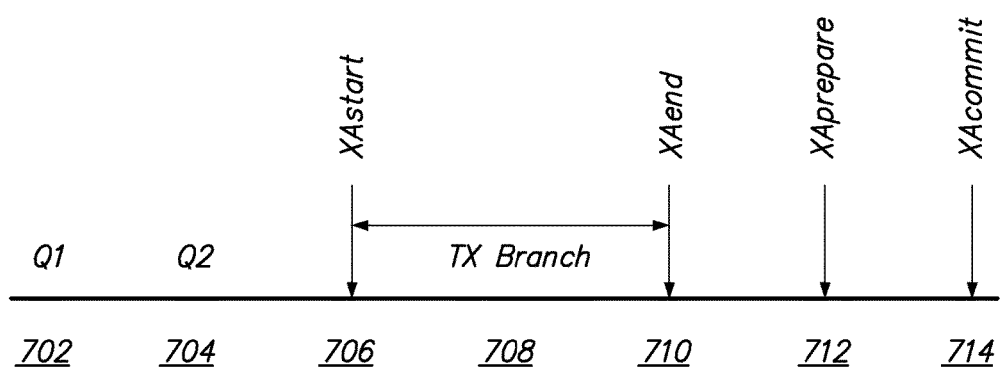
FIG. 7 illustrates an example distributed transaction that may be executed in a database system.

FIG. 7 illustrates an example distributed transaction that may be executed in a database system. As shown, the transaction branch 708 extends between the XAstart call 706 and the XAend call 710.

In one embodiment, there can be up to 32 branch qualifiers per database and transaction. The branch qualifiers are counted from one for every resource participating in the transaction. Every branch of a XA transaction has the same GTRID.

A transaction is started for all XA conversations including those that are reading only. To avoid generating redo where there was none, the commit triggers for the LTXID/GTRID record are registered at the first redo generation. This may not be on the first branch.

One example use case for XA includes the following steps:
1. XA start (1st transaction branch)
2. Query
3. XA end (1st transaction branch end, NO LTXID mapping is inserted, this means we might not insert the mapping into the first branch which makes recovery more difficult)
4. XA start (2nd transaction branch)
5. Query
6. Insert (This would mean we would also insert into the transaction history table.)
7. XA end In one embodiment, a 1PC optimization prevents an XA transaction from entering the in-doubt state (only one transaction branch is committing, so it cannot become in-doubt). The 1PC commit optimization is supported if the transaction branches are routed to the same transaction table. The client continues to issue XAprepare to all but the last branch. The other transaction branches flush the redo on prepare and return read-only. The 1PC optimization is set on the commit call to avoid the XAprepare call for the last transaction branch. If all branches are not to the same instance, the 1PC optimization is rejected.

In one embodiment, XA transactions can be run in 2 different modes: tightly coupled and loosely coupled. Tightly coupled XA transactions may be the default mode. Each branch can see the uncommitted changes of the other transaction branches. Tightly coupled XA transactions execute in strict series rather than in parallel. If a transaction branch is not explicitly ended before a new one is started, an implicit XAend is executed to end the previous transaction branch. WebLogic Server supports the tightly-coupled mode.

Loosely coupled XA transactions are independent and cannot see each other's changes. Both loosely coupled and tightly coupled XA transactions can become in-doubt. The 1PC optimization may avoid transactions becoming in-doubt. The transaction idempotence is used to know the outcome for the 1PC optimized transactions using the GTRID.

One difference between a local transaction and an XA transaction in terms of persisting the commit outcome is that local transactions use LTXID's and XA transaction use GTRID's. A transaction may start as a local transaction and then be migrated to an XA transaction. This type of transaction is called a promotable XA transaction. In one embodiment if the transaction is promoted, at transaction commit time a GTRID is inserted instead of an LTXID, and no new LTXID is generated.

In one embodiment, after a client has reconnected after an outage, the client invokes a force outcome function that inserts or updates the LTXID that was associated with the previous session. The insert/update marks the LTXID as BLOCKED. The application is then safe to replay with the transaction with the new LTXID (the LTXID that was created when the session was established) or to return the outcome of the last transaction to the application and user or to take the next action.

In one embodiment, the GET_LTXID_OUTCOME function can have the following outcomes: COMMITTED with values TRUE/FALSE and USER_CALL_COMPLETED with values TRUE/FALSE plus ERRORs. The function returns COMMITTED=TRUE and USER_CALL_COMPLETED=TRUE if the transaction has been committed and completed, COMMITTED=TRUE and USER_CALL_COMPLETED=FALSE if a commit is executed inside a PL/SQL block or a java stored procedure and it was not a single COMMIT and the last call in the PL/SQL block or if there was more data to return with the COMMIT. COMMITTED=FALSE is returned if the transaction has not been committed or has been blocked earlier.

In one use case, the return codes of the force outcome function are mapped to the following replay operations:
COMMITTED=TRUE and USER_CALL_COMPLETED=TRUE is mapped to CONTINUE COMMITTED=TRUE and USER_CALL_COMPLETED=FALSE is mapped to COMMITTED/NO_REPLAY

COMMITTED=FALSE

Additional ERROR codes

SERVER_AHEAD is mapped to NO_REPLAY/ERROR

CLIENT_AHEAD is mapped to NO_REPLAY/ERROR

OWN_SESSION is mapped to NO_REPLAY/ERROR

In one embodiment, the force outcome function can have the following outcomes: COMMITTED, EMBEDDED, FORCED plus ERRORs. The function returns COMMITTED if the transaction has been committed, EMBEDDED if a commit is executed inside a PL/SQL block or a java stored procedure and it was not a single COMMIT and the last call in the PL/SQL block. FORCED is returned if the transaction has not been committed or has been aborted earlier.

In one use case, the return codes of the force outcome function are mapped to the following replay operations:

COMMITTED is mapped to CONTINUE

FORCED is mapped to REPLAY

EMBEDDED is mapped to NO COMMITTED/NO_REPLAY

Additional ERROR codes

SERVER_AHEAD is mapped to NO_REPLAY/ERROR

CLIENT_AHEAD is mapped to NO_REPLAY/ERROR

OWN_SESSION is mapped to NO_REPLAY/ERROR

If a transaction has already updated the record in the transaction history table and the row is locked, in one embodiment, the force outcome function waits until the previous transaction completes. If a row is locked because the transaction is in-doubt, FORCE_OUTCOME will also wait.

In one embodiment, if the transaction is to be replayed after failover, the LTXID is blocked again by the force outcome function. Forcing an outcome blocks an in-flight transaction carrying the same LTXID from committing. The new LTXID (associated with the session the client reconnected/failed over) is used to replay the transaction. The new LTXID already has the correct database id and instance id.

In one embodiment, if a commit is attempted during replay, an error is raised. The transaction boundaries for the replay are the same as for the original transaction. In one embodiment, this behaviour includes single round trip transactions—namely autocommit and commit embedded in pl/sql. In one embodiment, this behaviour excludes commit for autonomous transactions and recursive transactions. In one embodiment, commit is permitted for an application's own replay, such as WebLogic Replay.

In one embodiment, clients have the ability to test the outcome of the LTXID. The transaction outcome is stored in the session handle. In addition to determine the transaction state by LTXID, in one embodiment, an API is provided to determine the transaction state by GTRID. In one embodiment, the GET_LTXID_OUTCOME API is performed in response to a request to determine the outcome of the last transaction. For example, without blocking a transaction from completion, the transaction queried may be committed, blocking the state of the transaction makes the outcome of the transaction deterministically correct.

In one embodiment, on duplicate submissions, either the transaction has already committed or a transaction is still active. This determination is made using GET_LTXID_OUTCOME from the container. In another embodiment, duplicate submission is detected at insert or update time of the transaction history table and returns an error at the attempt to commit. In another embodiment, the duplicate is detected at commit time rather than begin transaction time.

In one embodiment, disabling the commit_outcome service attribute while the service is active only affects new database sessions. Existing database sessions continue to use commit_outcome service semantics at the time that they were created. Enabling the commit_outcome service attribute only affects new database sessions. Existing database sessions continue to not provide "commit_outcome" semantics if that was the setting when they were created.

In one embodiment, the database administrator has the option to specify the retention time for how long records are stored in the transaction history table. The retention period can be different for each database service. The "Retention_Time" service attribute is added to the service definition. If no retention period is specified a default value of 24 hours is set. The time is measured from the time of last update on an LTXID for the period that that LTXID is then inactive. The units are defined in seconds. In one embodiment, when using GTRIDs, the recycle of GTRID reuse does not exceed the Retention_Time.

In one embodiment, old records are periodically cleaned up to ensure that the number of records in the transaction history table stays small. Only the records whose retention window has expired are deleted. The default timeout between checks is ten minutes. Different time periods may be specified. In one embodiment, when the database comes up, lazy/later cleanup happens under a parameter to avoid a maintenance burst.

In one embodiment, an API is provided in JDBC and OCI—GetLTXID. The logical transaction that is returned is the LTXID that will be used for the next transaction if no transaction is active. If a transaction is in progress, this is the LTXID associated with that transaction. This use case is for customer/application use. In one embodiment, the LTXID is an opaque object that is then passed to GET_LTXID_OUTCOME to determine the transaction outcome.

In one embodiment, clients have the ability to query the "Commit outcome" and "Retention_Time" attributes of a service. Various views provide this additional information.

In one embodiment, the Replay_Initiation_Timeout parameter is set as a value in seconds for which replay is acceptable. The Replay Timeout avoids surprise replaying beyond Replay Timeout. Time starts at first error receipt. The default value is 300 seconds, but other Timeouts may be specified.

In one embodiment, after a failover, Web Logic Server tests the transaction outcomes of active transactions for a container id. This detects all transactions that are committed for that container. It supports the use case for determining all transactions committed and complete at a container outage and blocks further transactions from committing for that container incarnation.

In one embodiment, a request is submitted as a batch request and a batch of transaction outcomes is returned to the client. If there are more active transactions than can be retuned in one reply, additional results can be requested.

In one embodiment, a test for outcome is made safe by applying GET_LTXID_OUTCOME for LTXID and GET_GTRID_OUTCOME for GTRID pairs that are in the delta after the scan between those that have committed and those that are not accounted for.

In one embodiment, a test for outcome is made safe by blocking further transactions from committing for that container incarnation.

In one embodiment, depending on the size of the machine and the number of concurrent transactions, the database administrator may increase/decrease the number of database partitions that are used for the transaction history table per database.

In one embodiment, transaction idempotence supports database consolidation. The transaction history table is stored in the pluggable database itself and not in the root database. When a database gets unplugged, the transaction history is part of the pluggable database.

In one embodiment, the database id is part of the key of the LTXID. Database consolidation has confirmed that the database id will not change, when the database gets plugged in again. In one embodiment, database consolidation prevents the same pluggable database from being plugged in the same root database several times.

In one embodiment, the LTXID belongs to each connection pool and is owned by the application session only for the duration of the check-out. After release, the LTXID remains with the connection pool. In another embodiment, the LTXID belongs to the application.

In one embodiment, the LTXID and cursor replay carry DBID to avoid collisions. The LTXID is qualified with DBID and InstanceId. In one embodiment, if there is a gap for the session attempting to apply the LTXID, failover is rejected as CLIENT_AHEAD or SERVER_AHEAD depending on the case.

In one embodiment, testing the LTXID outcome rejects if the DB has been reset since that DB was allocated. That is, the database has been opened with resetlogs and has lost data. The DB incarnation is changed by the resetlogs. Active data guard lag may be supported because this is the same DBID/incarnation for read only failover.

In one embodiment, the behavior with databases in advance or behind differs slightly depending on the use case for transaction idempotence.

In one embodiment, for public usage on same database, GET_LTXID_OUTCOME returns the error outcome CLIENT_AHEAD if the database has moved backwards in time with respect to the client.

In one embodiment, for public usage on another database, the behavior of GET_LTXID_OUTCOME depends on whether this LTXID was replicated. If so, whether GET_LTXID_OUTCOME returns the error outcome depends on whether the replication has been completed. If not, GET_LTXID_OUTCOME returns one of SERVER_AHEAD or CLIENT_AHEAD unless the commit number is zero. For zero (not seen), the LTXID is blocked.

In one embodiment, for driver replay, the OPI Management Layer looks at the last outcome of transaction bits and statement known to the client and determines whether a transaction could have been active. If a transaction could not have been active, FORCE_OUTCOME is not called. This avoids creating transactions at failover where there were none.

In one embodiment, for driver replay, the database signature carried on the cursor replay context is compared to the database that has been failed over to. The signature comprises Database ID, Database incarnation and Open timestamp. For transactions, if a decision is made to call FORCE_OUTCOME, CLIENT_AHEAD and SERVER_AHEAD errors continue to apply per LTXID. For reading, the replay can progress at current time as a complete request.

In one embodiment, when active data guard is used in a DML forwarding mode, the LTXID is inserted back at the primary database. There is not an attempt to insert LTXID at the active data guard database. The primary database is the source of information about transactions. The standby can generate the LTXID at commit number 0. However, the insert is at the primary database and commit is at the primary database, and the updated LTXID is returned to the active data guard. This functionality relies on the DML forwarding for a service or object being known.

In one embodiment, if the database supports DML Forwarding, the LTXID is generated at session creation at the active data guard. The pre and post COMMIT triggers are registered at first redo generation to execute at the primary. The COMMIT is forwarded to the primary with the LTXID. The incremented LTXID is returned to the active data guard. Also, FORCE_OUTCOME is executed at the primary.

In one embodiment, the server provides a "commit_outcome" service to support application failover and restart. The server may also support the replay_initiation_timeout service attribute to specify a timeout when replay should no longer be retried, and the Retention_Time service attribute so different services can have different retention periods. The server also supports changing the commit_outcome service attribute while the service is active. Existing database sessions started under a service keep their initial commit_outcome service attribute.

In one embodiment, users connect through database services using a service attribute called commit_outcome. If this attribute is set for a service, logical transaction ids are created; otherwise the server does not keep track of transactions.

Figure 3:
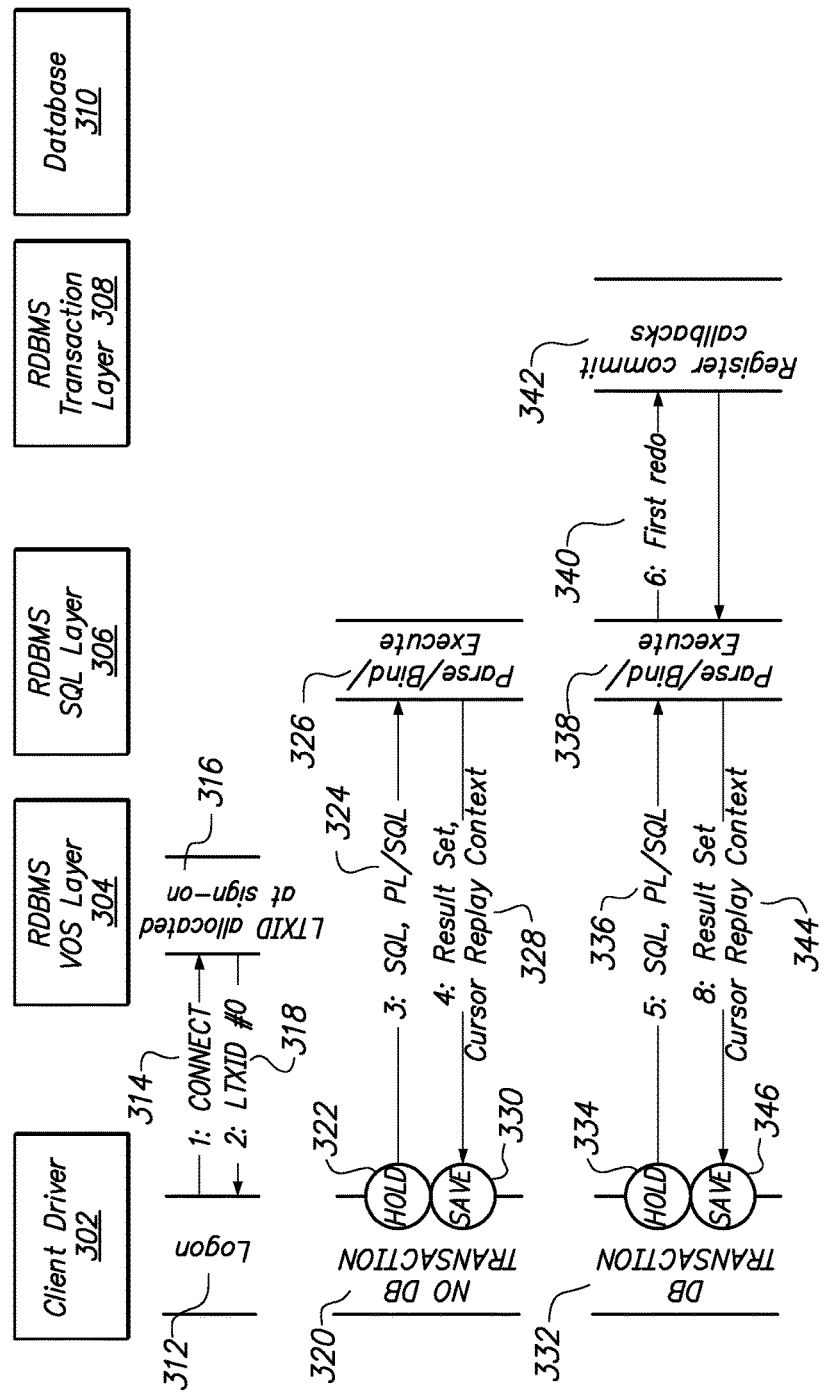
FIGS. 3 and 4 illustrate example steps for preserving transaction state in a database system when a transaction is open and a Data Definition Language ("DDL") statement is executed.

FIG. 3 illustrates example steps for preserving transaction outcome in a database system when a transaction is open and a Data Definition Language ("DDL") statement is executed. The following list describes the example steps in more detail:

1. The client connects to the database instance (step 314)
2. The server creates a new LTXID and returns it to the client as part of the connection handshake. (step 318)
3. The client executes the first SQL statement (step 324)
4. The server returns the results to the client (step 328)
5. The client executes more SQL (step 336)
6. At the point of the first redo generation the pre-commit and post-commit callback is registered. (step 340)
7. So far nothing has changed to the previous case, when only DML has been executed.

Figure 4:
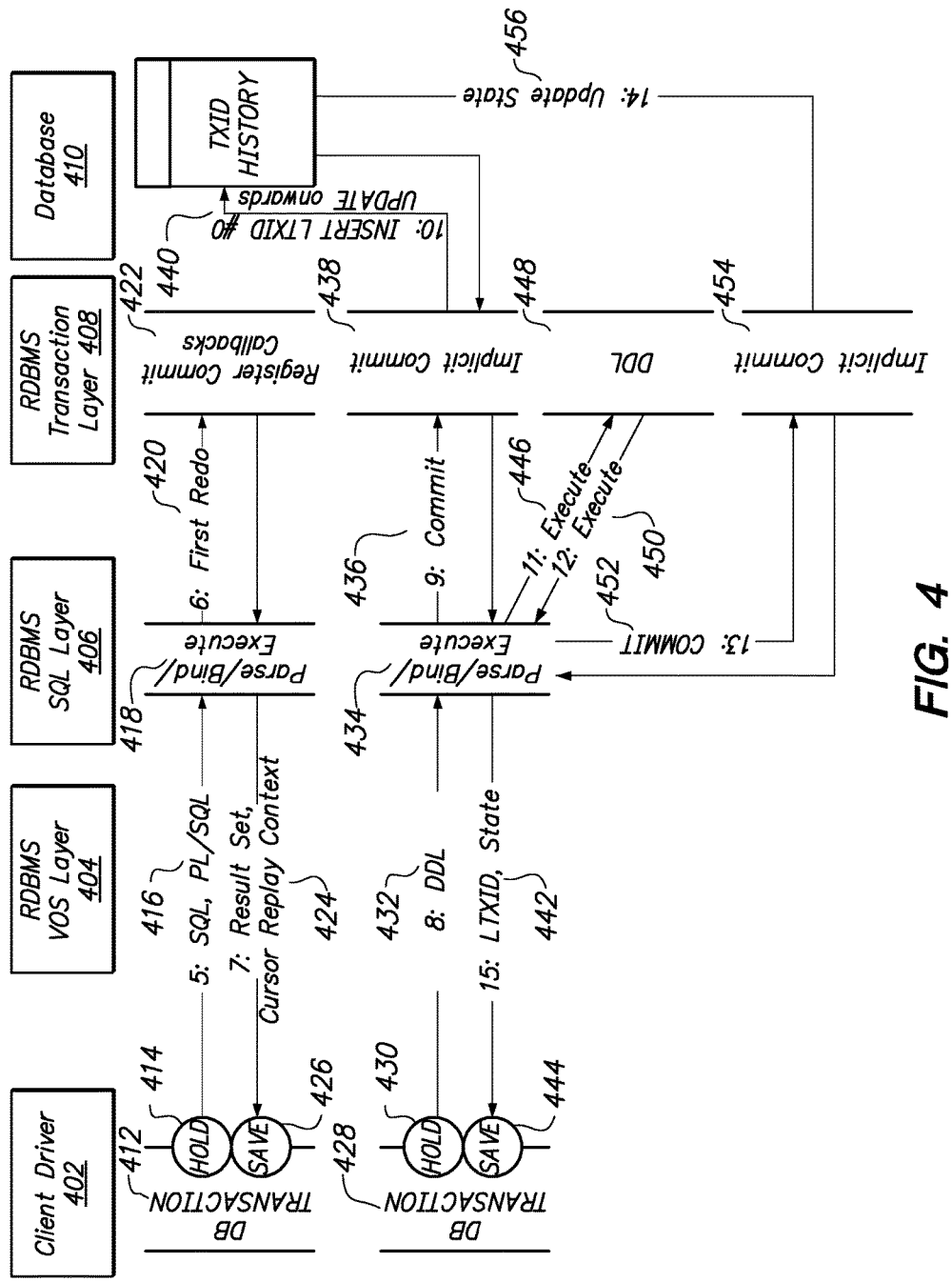

At this point a transaction is active, when the DDL command is executed. FIG. 4 shows further example steps in detail.

The following list describes the individual steps:
8. The DDL statement is sent to the server (step 432)
9. The server issues an implicit commit. (step 436)
10. The pre-commit trigger is invoked which changes the state of the LTXID. The LTXID is advanced at this point (step 440)
11. The server executes the DDL statement. (step 446)
12. The server invokes the implicit commit (step 450)
13. At the point of the first redo generation the server again registers the two transaction commit callbacks. In addition the server sets the state of the LTXID in memory to COMMITTED. (step 452)
14. At commit time the pre-commit trigger updates the transaction history table. The post-commit trigger is invoked and increments the LTXID. (step 456)
15. The new LTXID (original running commit number is incremented twice) and the commit state is returned to the client. (step 442)

In one embodiment, TRUNCATE DDL is implemented as a suite of recursive transactions. They are execute as recursive transactions and can have two phases. For this reason the commit callbacks are not registered for the TRUNCATE itself unless market transactions are added to force a top level commit.

In one embodiment, if a DML is open when the TRUNCATE operation is executed, then this user transaction was previously registered and is implicitly committed. The act of executing this commit increments the commit number in the LTXID. However, because the TRUNCATE itself is solely recursive, a second increment of the LTXID does not occur.

In one embodiment, when the driver proxy or WebLogic Server or third parties fail over a session, they first acquire a new session with that sessions own logical transaction id. They then acquire the LTXID from the previous failed session using the client driver provided APIs—getLTXID for JDBC and OCI_ATTR_GET with LTXID for OCI. The client (driver or WebLogic or other application) invokes the GET_LTXID_OUTCOME function with the LTXID gotten from the API. The original LTXID of the failed over session is marked as blocked if that LTXID has not been used and is one higher than the last used or is zero. The return outcome tells the driver if the last transaction is committed or not. In one use case, an uncommitted transaction can be replayed with the new logical transaction id (the LTXID associated with the newly created session). If this replay itself incurs an outage then the LTXID for the replaying session is used for the GET_LTXID_OUTCOME function. In another use case, the outcome is returned to the application.

Figure 5:
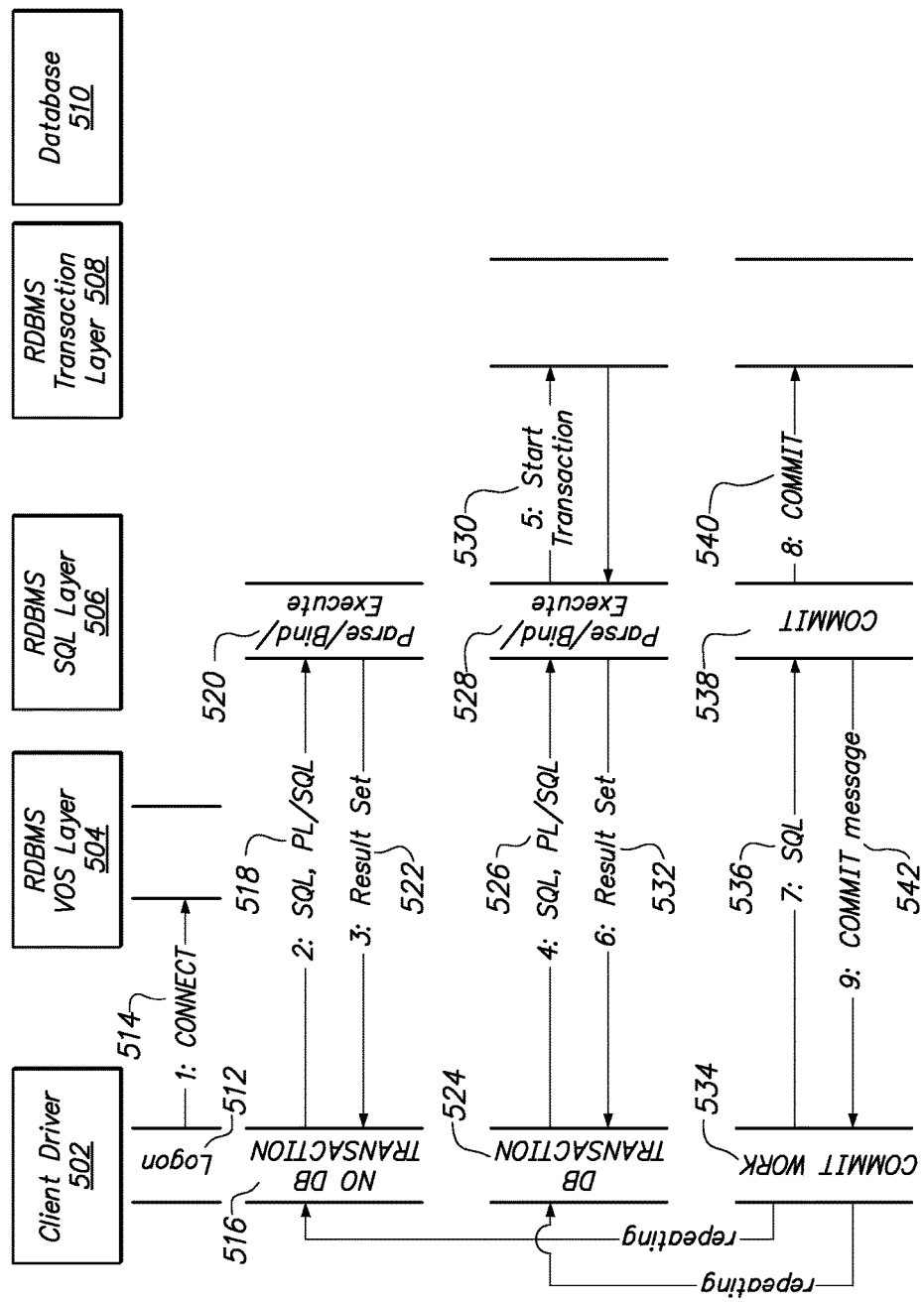
FIG. 5 illustrates example steps for executing transactional sets of commands in a database management system.

In one embodiment, if the session is connected to a service that has the commit_outcome attribute not set, the server does not keep track of transactions. FIG. 5 illustrates example steps for executing transactional sets of commands in a database management system. The client connects to the database and a new session is created in step 514, but no logical transaction id is created or returned to the client. The client can issue queries before it opens a transaction in steps 518 and 522. When the client opens a new transaction in steps 526-532, no insert or update to the transaction history is executed. The client may execute one or more DML statements in steps 526-532 and then commit the transaction in steps 536-542. During the commit, no new logical transaction id is generated if the commit_outcome attribute was not set for the session.

In one embodiment, auto-commit transactions are treated the same as other database transactions in terms of logical transaction ids. The logical transaction ID is persisted automatically at commit, and the logical transaction ID may be used to determine the outcome of autonomous transactions at an outage. One example difference is that every top-level SQL statement is executed in its own database transaction. At the end of each database transaction the commit number part of the logical transaction id is incremented, and returned on the commit message. For a PL/SQL block, auto-commit mode results in a commit at the end of the PL/SQL block, after the block completes execution.

In one embodiment, for XA, only the first transaction branch that generates redo of each database records the GTRID. The mapping is stored in a different table than the LTXID; this table is called the GTRID transaction history table. The GTRID is unique and is stored in the GTRID transaction history table.

In one embodiment, if the transaction branch allocates a transaction state object during the call boundary, redo is generated, and the transaction is active, the GTRID is inserted in the GTRID transaction history table.

In one embodiment, the GTRID mapping is persisted when the DX enqueue lock value associated with a transaction branch changes from NULL to a different value at a call boundary and redo is generated. Transaction branches of a transaction are linked with the same GTRID.

In one embodiment, WebLogic Server sets the Container ID and the GTRID. These are passed on the connection handle to the server for each global transaction.

In one embodiment, when using the XA data source, WebLogic Server issues the XAstart call as the first action on each connection so a transaction is opened immediately. Operations are never in a SELECT-only phase. In one embodiment, WebLogic Server sets the same GTRID on each participating session at XAstart, so the transaction branches are linked. In one embodiment, each transaction includes the following steps:
1. XAstart
2. XAend
3. XAprepare (no XAprepare is required if only one resource is part of this XA transaction)
4. XAcommit In one embodiment, the LTXID transaction history table is partitioned and the instance id is part of the partitioning key. The instance automatically gets instance affinity if only one instance updates or inserts into a partition. As an optimization affinity may be enforced immediately upon the startup of a database instance.

In one embodiment, the transaction mapping for the logical transaction ids is stored for a certain period of time, and the driver/application may query the LTXID mapping. After this retention period has expired, the outcome of the logical transaction can be deleted. Once deleted, the outcome of these transactions may not be determined from the LTXID mapping.

In one embodiment, different retention periods are used for different types of workload. For example, an OLTP application might work very well with a retention period of 3-6 hours. On the other hand, a batch application with long running transactions might work better with a retention period of 24 hours. The retention period can be specified as a new service attribute. If no value is specified, a default retention period of 24 hours is used. The minimum is ten minutes. The retention period is an attribute of the service.

In one embodiment, during an outage, sessions will failover from one database instance to another database or instance. To replay the last transaction the driver can either determine the outcome of the last logical transaction. If the last logical transaction has already been successfully committed or the database is ahead or behind, the next attempt to COMMIT with this same LTXID fails with a constraint violation (the LTXID has already been inserted or is out of sync into the LTXID transaction history table).

In one embodiment, the FORCE_OUTCOME operation determines for the following conditions:
Retained
Collision
Client ahead
Server ahead
Same session
In Doubt (GTRID set, but not in GTRID transaction history table) (Decision to hang)
Error In one embodiment, the transaction history table is cleaned up regularly. MMON may invoke the cleanup function. Two example timeout actions include:
Every 60 minutes to retain the expired transaction history records of its database instance Every 12 hours retain the expired transaction history records of all database instances. One database instance may execute this type of cleanup.

In one embodiment, when the user authenticates a new session, a new logical transaction id is created. The following example steps may be performed:

Check if commit_outcome attribute of service is set
Determine db id and instance id and store it in the LTXID structure
Call the guid function to create the session guid and store it in the LTXID structure
Set the commit number to 0 in the LTXID structure.

In one embodiment, when the a user checks a session from a connection pool, the LTXID on that session is associated with that user. This association stays in place until the session is returned to the connection pool.

In one embodiment, at the point of the first redo, a pre-commit and a post-commit transaction callback are registered. The commit processing consists of three steps:

Pre-commit callback
Transaction commit
Post-commit callback

The pre-commit callback is for inserting or updating the LTXID record. This callback checks for certain restrictions. In one embodiment, the callback does not insert into the transaction history table under these conditions:

Database is read-only
Transaction is on a standby-database
Active data guard instance
Database is in no_logging mode
Transaction is read-only
Autonomous transaction
Not the first change of an XA transaction
Slaves of the PDML transaction
Recursive transaction Two example cases are distinguished for the pre-commit callback:

First transaction of a user session
  Get logical transaction id from user session structure
  Insert new row in the LTXID transaction history table
  Set start date
  Set transaction id
  Set state
Later transaction in the user session
  Get logical transaction id from user session structure
  Update row in the transaction history table (if the commit# in the row is one behind)
  Set the start date
  Set the transaction id
  Set state Three example states that may be returned from the internal force_outcome api include: TOPLEVEL_COMMITTED, EMBEDDED INTERNALLY_COMMITTED and BLOCKED. In one embodiment, during execution of the pre-commit trigger, only the first two states are used. If standard SQL is used, the LTXID state is TOPLEVEL_COMMITTED. If the commit is executed as part of a PL/SQL block or has more data to return to the client with that commit such as occurs with autocommit, the state is set to EMBEDDED INTERNALLY_COMMITTED. This example distinguishes an ordinary commit from a commit was executed inside a call such as a PL/SQL block or autocommit. For example commit that is executed as part of a PL/SQL block does not guarantee that the PL/SQL block has completed.

After the transaction is committed, the post-commit trigger is invoked. The post-commit trigger increments the running commit number of the logical transaction id to create the next LTXID. The next LTXID is sent back to the client as part of the commit message. (For XA transactions the increment is omitted as the GTRID is unique for each TX).

In one embodiment, the commit triggers can fail, and an error is raised. In case of the pre-commit-trigger, the transaction is rolled back. In the post-commit trigger, an error is not expected if only the commit# part of the LTXID is incremented. In case of an error, an error is raised and returned to the client.

In one embodiment, for an XA transaction, a mapping is inserted into the GTRID transaction history table. In one embodiment, no update operation is performed, as each GTRID is different and provided by the client.

In one embodiment, before inserting or updating the transaction history table, the running commit number is verified for its validity: only monotonically increasing values are accepted. The commit# value of the LTXID on the handle is expected to be one in advance of the value stored in the transaction history table.

In one embodiment, an exception handler is defined that catches integrity violations caused by inserting into or updating the transaction history table. This integrity violation error is caught and a new user error is raised instead, to promote error diagnosis. This will make it possible to identify the root cause of the error via an error number.

In one embodiment, if multiple commits are executed in the same PL/SQL block, only the first commit increases the LTXID, and the following commits that are executed as part of the PL/SQL block do not increase the commit# of the LTXID. In this embodiment, each round trip bumps the commit# part of the LTXID at most by one.

In one embodiment, if multiple commits are occur in a round trip from the client such as DDL, PL/SQL, Java only the first commit increases the LTXID, and the following commits that are executed as part of the round trip do not increase the commit# of the LTXID. In this embodiment, each round trip bumps the commit# part of the LTXID at most by one.

In one embodiment, a new post transaction callback is registered to increase the commit# of the logical transaction id, if the transaction was committed successfully. If the commit callback has been invoked after a failover and the extended client message is in use, the instance id part of the logical transaction id is also updated to reflect the new location of the user session.

In one embodiment, a new logical transaction id is created before the commit message is built and returned to the client. In one embodiment, this transaction commit callback is registered only if the session that is executing the statement is associated with a "commit_outcome" service.

In one embodiment, the transaction callback does not raise an error if COMMIT NOWAIT was specified for a "commit_outcome" service and the transaction outcome might not be determined.

In one embodiment, logical transactions ids are purged at regular intervals. The default interval is 60 minutes. After the timeout has expired, the timeout action is invoked by MMON.

In one embodiment, a cleanup function deletes those records from the transaction history table that are outside of the retention window. The retention window is determined by the retention time of the service the session is associated with. When a record is inserted or updated into the transaction history table it also sets the expiration_date.

There are two different timeout actions:
Per instance
Per database

In one embodiment, a timeout action is run on each node of a RAC database and each database instance is responsible to clean out the record it created itself. This may prevent block transfers from other database instances.

In one embodiment, after the database started up, no purge of the transaction history table occurs for the next 30 minutes or for some other specified minimum amount of time.

In one embodiment, if errors are encountered during cleanup, the errors are logged to different logs depending on their severity.

In one embodiment, when a client connects to the database and the LTXID is set specified on the connect message, the FORCE_OUTCOME function is called to determine the outcome of the last transaction. If the transaction has been committed, a new LTXID is generated and is returned to the client with the transaction outcome.

In one embodiment, when a transaction is committed the new LTXID is returned to the client as part of the commit message.

In one embodiment, the LTXID information is stored in the session structures on the server-side and on the client-side. The size of an individual session id might be too big to add to the session structure. In one embodiment, the LTXID is stored in a new structure, and a pointer will be added to point to the entry in the new structure.

Example Data Structures

In one embodiment, the logical transaction id is a globally unique id that uniquely defines the database transaction from the application perspective. The logical transaction id may include the instance number, the logical session guid, that is allocated when the session first connects, plus a running commit number that is updated each time the session commits work.

In one embodiment, there is also a GTRID structure to store additional attributes that can be provided by the client.

In one example, a transaction history table is used to keep track of information about a transaction. The following table describes the definition of an example transaction history table. The name of the table is trans_hist.

| Column name | Data Type | Primary Key | Partitioning Key |
| --- | --- | --- | --- |
| db_id | NUMBER | Yes | Yes |
| instance_id | NUMBER | Yes | Yes |
| session_guid | RAW(64) | Yes | Yes |
| Version | NUMBER | | |
| commit# | NUMBER | | |
| service_id | NUMBER | | |
| start_date | DATE NOT NULL | | |
| State | NUMBER | | |
| Flags | NUMBER | | |
| req_flags | NUMBER | | |
| error_code | NUMBER | | |

In the example, the logical transaction id is formed by the first four columns: db_id, inst_id, session_guid and commit#. The primary key includes the first three columns. The column container_id can be set by the client to associate additional attributes with a logical transaction id. Weblogic, for example, may use this column to store the machine number. It is noted that any attribute setting may be not useful following the next update to LTXID. The service_id column describes the database service under which this transaction has been executed. The start_date column stores when the transaction is committed, for determining if the record in the transaction history table can be deleted. The state column describes the state of a transaction, for determining if a transaction has been committed inside PL/SQL for example. The ntss_state column makes it possible to store non-transaction state settings associated with a logical transaction.

The following table describes the structure of an example GTRID transaction history table. The name of the table is trans_table_xa. In the example, the instance_id column is used for partitioning the inserts and to reduce the amount of pinging during normal operation. The service_id column is used for determining when the record can be deleted. The retention time is an attribute of the service.

| Column name | Data Type | Primary Key | Partitioning Key |
| --- | --- | --- | --- |
| instance_id | NUMBER | Yes | Yes |
| service_id | NUMBER | | |
| start_date | DATE NOT NULL | | |
| container_id | RAW(64) | | |
| Gtrid | RAW(64) | Yes | |
| State | VARCHAR2(20) | | |
| ntss_state | VARCHAR2(30) | | |

In one embodiment, the LTXID transaction history table is partitioned. In one embodiment, old records are purged in a "lazy" fashion in cycles using list partitioning.

In one embodiment, the user session structure is extended to store the logical transaction id. In an example, a pointer is added to the user session structure that points to the new LTXID structure. The new LTXID structure uses the same memory management and indexing scheme as the user session structure.

In one embodiment, the LTXID structure stores the current and the next LTXID of a session. This method avoids a round trip to the server if a new client arrives that needs a new LTXID. This method is only used if clients retain the LTXID for their lifetime, rather than return LTXID to a connection pool at check-in.

Example Service Attributes

In one embodiment, database services have three additional service attributes:
Commit outcome
Retention time
Replay initiation timeout The commit_outcome attribute determines if logical transaction ids are generated and maintained for a service. If the commit_outcome attribute is activated while user sessions are already connected using this service, only new sessions take advantage of the changed setting and create logical transaction ids. If the commit_outcome attribute is being turned off, only new user sessions do not create logical transaction ids; existing user sessions still use logical transactions ids.

In one embodiment, the DBMS_SERVICE package changes the following two procedures and add two more parameters to it:
CREATE_SERVICE
MODIFY_SERVICE In one embodiment, the default value for the attribute Retention_Time is 24 hours, and the maximum value is 30 days. In one embodiment, the default value for replay_Initiation_timeout is 5 minutes, and the maximum value is 3 hours.

The Retention_Time attribute determines how long an LTXID is stored in transaction history table. After this timeout expires the record can be removed from the transaction history table.

In one embodiment, the replay_initiation_timeout determines for how long the replay is retried.

Example Interfaces

In one embodiment, when an HTTP request signs in for the first time, a connection is checked out from the connection pool. This connection holds the next LTXID that will be used if a transaction is committed on that session. The LTXID is replicated to the http session cookie.

In one embodiment, if the function is called for a session that has the commit_outcome attribute not enabled, NULL is returned.

In one embodiment, as part of failover, a client driver invokes the force outcome procedure. The procedure maintains at-most execution semantics even during failover processing. The GET_LTXID_OUTCOME procedure results in an insert or update of the transaction history table with the passed in LTXID if it the transaction carrying this LTXID needs to be blocked in order to return the outcome COMMITTED=FALSE.

A valid pointer to an ltxid is passed in to the external GET_LTXID_OUTCOME function. The result of the function may include one of the following example states:
COMMITTED=TRUE (Transaction has been committed)
COMMITTED=FALSE (Transaction is uncommitted)
USER_CALL_COMPLETE=TRUE The user call ran to completion with no additional actions after the commit
USER_CALL_COMPLETE=FALSE A commit occurred that was inside a PL/SQL block or java stored procedure or had more data to return.
ERROR (Outcome cannot be determined because of an internal error or the server or the client is ahead or the FORCE_OUTCOME is called on the same session as the LTXID)

In one embodiment, if the commit# is 0, the force outcome function inserts a new record in the transaction history table and the record is marked as "blocked".

In one embodiment, WebLogic Server can retrieve the state of a transaction by specifying the combination of ContainerID and the incarnation of that container. This uniquely identifies all transactions issued and committed by that container incarnation. Once called. No further transactions are accepted for commit from this container and incarnation.

In one embodiment, a client API provides the application with the ability to query the outcome of a Logical TXID against the transaction history table, the ability to create an LTXID and return the LTXID on the session handle to the client, the ability to query the transaction outcomes of a WebLogic Server container. The client API may also support a PL/SQL API to query LTXID state using FORCE_OUTCOME.

In one embodiment, a PL/SQL package with procedure GET_LTXID_OUTCOME is used by customer applications and third party application servers to determine the transactional outcome of the last session when that session became unavailable.

The GET_LTXID_OUTCOME may be used to determine if the in-flight transaction on a now unavailable session committed or not. The procedure is used when the original session returned an error due to unavailability. Situations that can cause such session unavailability include session, instance, server or network planned or unplanned outages. When such an outage occurs, the application receives a disconnection error. This error provides no insight as to whether or not the application committed a transaction, and also whether state that the application might have been expecting from that commit should have been returned.

In one embodiment, the following steps are executed by the application to determine if the last transaction committed.

1. The first step is to know if an error is due to loss of access to the database. The OCI and JDBC drivers each provide an interface to check if the error received "is recoverable". Catch the Recoverable exception for JDBC and the OCI attribute, OCI_ATTR_IS_RECOVERABLE for OCI.
2. Once the exception is known to be recoverable, next use the API's provided by each of OCI and JDBC drivers to get the last LTXID that was in use for the now unavailable session. The LTXID is an opaque structure. The LTXID is retrieved immediately before it is used as it is constantly changing. The LTXID is not valid and will result in a rejection if an old LTXID gotten sometime earlier is used.
3. The application now acquires a new session. This can be a pooled session or a new session.
4. The procedure GET_LTXID_OUTCOME is called on the new session, to know if the last call committed. Depending on the outcome of this procedure, the application can return the commit state to the user. If not committed, applications that are stateless between requests can resubmit the last full request, for applications that use requests.

In one embodiment, after a recoverable outage is received, the application obtains the LTXID from the old session. This returns an opaque object containing the LTXID. The application then obtains a new session and calls the PL/SQL GET_LTXID_OUTCOME with that LTXID to find out the transaction last outcome.

If using a JDBC-based container such as Weblogic (or a third party), the LTXID can be made available in the http session cookie via an event that is provided with JDBC driver. After an outage the container obtains a new session and calls GET_LTXID_OUTCOME with the LTXID saved in the cookie to find out the transaction outcome. The event may be available without a container if using JDBC thin or JDBC OCI drivers.

After calling GET_LTXID_OUTCOME, the application looks at the two boolean values returned—COMMITTED to know whether the call is committed, and USER_CALL_COMPLETED if the application expects additional data such as PL/SQL out binds or DML to be returned with the COMMIT or if the COMMIT is part way through a PL/SQL. The example method continues with the three example cases.

1. If the COMMITTED boolean is false and the USER_CALL_COMPLETED boolean is false then the call did not execute any commits.
2. If the COMMITTED boolean is true and the USER_CALL_COMPLETED boolean is true and, then the call did execute commits and there was no additional information to return and no more work to do if that call was Pl/SQL, or autocommit, or due to a user call with commit on success set.

3. If the COMMITTED boolean is true and the USER_CALL_COMPLETED boolean is false, then the transaction did execute commits and there was additional information to return or more work to do. The application may or may not require the latter. Examples when USER_CALL_COMPLETED is false include the message of number of rows changed and for PL/SQL procedures that can be called from higher layers.

In one embodiment, the application may resubmit the last request in case (1). For case (2), the application may return committed to the end user. However, the application might not continue if it expects the data that the commit would have returned. The application may determine whether the application wants to know whether or not a transaction was COMMITED (true/false), or if the application wants the additional state.

In one embodiment, if on reconnection the client is no longer in sync with the server, the procedure GET_LTXID_OUTCOME returns an error code that indicates that the client is ahead or that the server is ahead. The client ahead error could occur if the database has been flashed back or is data guard and was opened earlier or was subject to media recovery. The PL/SQL returns an error indicating that a server is ahead, if a stale LTXID is passed to GET_LTXID_OUTCOME.

In one embodiment, the client may perform the following process:
1. Client receives a FAN down interrupt or error
2. Confirm that the error is recoverable (new interface from OCI and an existing exception class for JDBC)
3. Obtain last LTXID from the old session handle using OCI and JDBC api's provided
4. Obtain a new session
5. Call the PL/SQL procedure GET_LTXID_OUTCOME with last LTXID, returning committed and user_call_completed Booleans.
6A. If committed and user_call_completed, return committed and continue
6B. else if committed and not user_call_completed, return committed with a message that application cannot continue (if the application needs the return data) or continue if the application is stateless and does not need this data.
6C. else if not committed, optionally clean up any application state changes on client side, and resubmit the last request Installation, Tuning, Configuration, and Diagnostics In one embodiment, the customer can influence the storage requirements by setting the retention period. For example, a longer retention period may use more storage resources than a shorter retention period.

In one embodiment, only new sessions will have the ability to be replayed, and an administrator choose to disconnect existing users after the setting has been changed to cause users to obtain a new session. This might be done using FAN to not return sessions to a pool when they check back in.

In one embodiment, work may be failed over to another database instance if "commit_outcome" services are used. When new services get created, the database administrator may decide if this is a "commit_outcome" service and how long the associated retention period is.

In one embodiment, the server provides an interface to allow debugging traces for the logical transaction id to database transaction id mapping and other aspects of the transaction idempotence system.

In one embodiment, the transaction history table is created before using transaction idempotence. For example, the table may be created using a PL/SQL package. The package is used to install and de-install the required objects for the feature. For example, the package creates the tables that are used to store the LTXID's. A drop procedure may remove these tables.

During startup, the server code will detect if the transaction idempotence tables have been created. If the tables have been created, a SGA variable will be set, and application continuity features are enabled.

In one embodiment, when a new instance is added to a RAC database, if the partition has not been created a new partition is added. If the database is RAC or is feeding a database that is a RAC database in a Data Guard or Active Data Guard farm, partitions may be added ahead. This is important for performance when using RAC.

The design uses partitions to ensure that the transaction history table performs well across the database instances as well as inside individual database instances. At runtime the transactions are only inserting or updating the local partitions. At failover, the force operation uses the old instance id. The replay continues with the instance_id for the new instance.

In one embodiment, if idempotence is no longer required, the transaction history table may be dropped. Dropping the transaction history table during a replay may result in an error.

In one embodiment, transaction idempotence is enabled on a service by setting an attribute for the service, COMMIT_OUTCOME. The retention period for transaction idempotence can be adjusted using RETENTION_TIME. For most applications, 24 hours should be more than adequate.

COMMIT_OUTCOME determines whether transaction COMMIT outcome is accessible after the COMMIT has executed. While a COMMIT is durable, this feature makes the outcome of the COMMIT durable also. The feature is used for applications to look up the outcome of the commit last executed after an outage. The feature is used by the Replay Driver, Web Logic Replay and is available to other applications for determining the outcome of the last transaction processed.

RETENTION_TIME is used in conjunction with COMMIT_OUTCOME. It determines the amount of time that the COMMIT_OUTCOME is retained.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
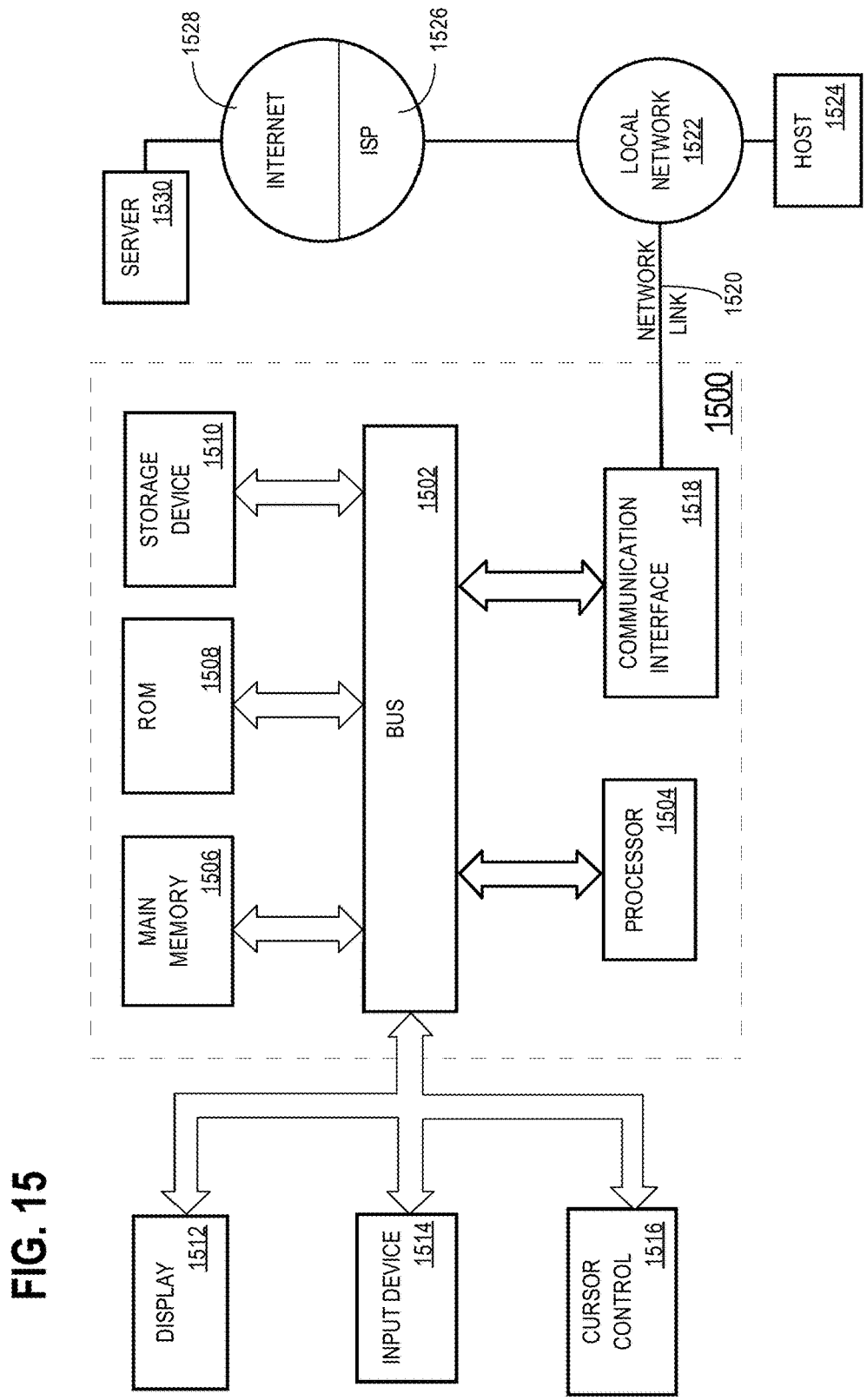
FIG. 15 illustrates an example computer system that may be specially configured to perform example methods described herein.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1510. Volatile media includes dynamic memory, such as main memory 1506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

As used herein, the terms "first," "second," "third," and "particular" are used as naming conventions to distinguish different processes, commands, objects, devices, or other items from each other, so that these different items may be referenced after they have been introduced. The use of these terms does not imply an ordering or timing.

What is claimed is:

1. A method comprising:
   a database server receiving, from a client in a second database session, a request that identifies a set of commands that were sent by the client in a first database session, wherein the set of commands comprises one or more transactions; and
   in response to the request that identifies the set of commands in the first database session:
   the database server determining that at least one transaction of the one or more transactions in the set of commands has not committed, and
   based at least in part on determining that the at least one transaction of the one or more transactions has not committed, the database server blocking, from the second database session, completion of the at least one transaction in the first database session to prevent committing of the at least one transaction initiated in the first database session;
   wherein the method is performed by one or more computing devices.

2. The method of claim 1, further comprising the database server causing the at least one transaction to commit in the second database session.

3. The method of claim 1, further comprising:
   the database server causing completion of execution of the set of commands in the second database session; and
   sending, to the client, in response to the request, an indication that the execution of the set of commands is complete;
   wherein said blocking guarantees at-most-once execution of the at least one transaction across at least two database sessions comprising the first database session and the second database session.

4. The method of claim 1, wherein the request identifies the set of commands by specifying a logical identifier received by the client through the first database session.

5. The method of claim 1, wherein the request identifies the set of commands based at least in part on a logical identifier received by the client upon completion of execution of a previous set of commands initiated in the first database session.

6. The method of claim 1,
   wherein the set of commands comprises a first transaction and a second transaction;
   wherein the database server determines that the first transaction has committed and the second transaction has not committed;
   wherein an intermediate database session state is built when the first transaction has committed and the second transaction has not committed;
   wherein the database server blocking, from the second database session, the completion of the at least one transaction comprises blocking completion of the second transaction initiated in the first database session to prevent committing of the second transaction initiated in the first database session.

7. The method of claim 6, further comprising the database server causing the second transaction to commit in the second database session.

8. The method of claim 1,
   wherein committing the at least one transaction of the one or more transactions in the first database session would require the database server to persist, for the first database session, stored information about one or more outcomes of the set of commands;
   wherein blocking the completion of the at least one transaction of the one or more transactions comprises persisting, outside of the first database session, the stored information about the one or more outcomes of the set of commands;
   wherein the stored information persisted outside of the first database session prevents committing the at least one transaction of the one or more transactions for the first database session.

9. The method of claim 8, wherein the stored information about the one or more outcomes of the set of commands comprises stored information about a respective outcome of each of the one or more transactions of the set of commands.

10. The method of claim 1,
    wherein the set of commands is a single user call from the client;
    wherein the single user call, if completed in the first database session, would cause a plurality of changes of the one or more transactions of the set of commands to be committed in the first database session.

11. A non-transitory computer-readable medium storing instructions that, when executed by one or more processors, cause:
    a database server receiving, from a client in a second database session, a request that identifies a set of commands that were sent by the client in a first database session, wherein the set of commands comprises one or more transactions; and
    in response to the request that identifies the set of commands in the first database session:
    the database server determining that at least one transaction of the one or more transactions in the set of commands has not committed, and
    based at least in part on determining that the at least one transaction of the one or more transactions has not committed, the database server blocking, from the second database session, completion of the at least one transaction in the first database session to prevent committing of the at least one transaction initiated in the first database session.

12. The non-transitory computer-readable medium of claim 11, wherein the instructions further include instructions that, when executed by the one or more processors, cause the database server causing the at least one transaction to commit in the second database session.

13. The non-transitory computer-readable medium of claim 11, wherein the instructions further include instructions that, when executed by the one or more processors, cause:

the database server causing completion of execution of the set of commands in the second database session; and sending, to the client, in response to the request, an indication that the execution of the set of commands is complete;

wherein said blocking guarantees at-most-once execution of the at least one transaction across at least two database sessions comprising the first database session and the second database session.

14. The non-transitory computer-readable medium of claim 11, wherein the request identifies the set of commands by specifying a logical identifier received by the client through the first database session.

15. The non-transitory computer-readable medium of claim 11, wherein the request identifies the set of commands based at least in part on a logical identifier received by the client upon completion of execution of a previous set of commands initiated in the first database session.

16. The non-transitory computer-readable medium of claim 11,
wherein the set of commands comprises a first transaction and a second transaction;
wherein the database server determines that the first transaction has committed and the second transaction has not committed;
wherein an intermediate database session state is built when the first transaction has committed and the second transaction has not committed;
wherein the database server blocking, from the second database session, the completion of the at least one transaction comprises blocking completion of the second transaction initiated in the first database session to prevent committing of the second transaction initiated in the first database session.

17. The non-transitory computer-readable medium of claim 16, wherein the instructions further include instructions that, when executed by the one or more processors, cause the database server causing the second transaction to commit in the second database session.

18. The non-transitory computer-readable medium of claim 11,
wherein committing the at least one transaction of the one or more transactions in the first database session would require the database server to persist, for the first database session, stored information about one or more outcomes of the set of commands;
wherein blocking the completion of the at least one transaction of the one or more transactions comprises persisting, outside of the first database session, the stored information about the one or more outcomes of the set of commands;
wherein the stored information persisted outside of the first database session prevents committing the at least one transaction of the one or more transactions for the first database session.

19. The non-transitory computer-readable medium of claim 18, wherein the stored information about the one or more outcomes of the set of commands comprises stored information about a respective outcome of each of the one or more transactions of the set of commands.

20. The non-transitory computer-readable medium of claim 11,
wherein the set of commands is a single user call from the client;
wherein the single user call, if completed in the first database session, would cause a plurality of changes of the one or more transactions of the set of commands to be committed in the first database session.

* * * * *

UNITED STATES PATENT AND TRADEMARK OFFICE
CERTIFICATE OF CORRECTION

PATENT NO. : 10,250,693 B2
APPLICATION NO. : 14/587570
DATED : April 2, 2019
INVENTOR(S) : Colrain et al.

It is certified that error appears in the above-identified patent and that said Letters Patent is hereby corrected as shown below:

In the Specification

In Column 7, Line 2, delete "10 g," and insert -- 10g, --, therefor.

In Column 20, Line 11, delete "("LTXIDS")" and insert -- ("LTXIDs") --, therefor.

In Column 23, Line 7, delete "12 c" and insert -- 12c --, therefor.

In Column 29, Line 21, delete "of the of the" and insert -- of the --, therefor.

In Column 29, Line 23, delete "of the of the" and insert -- of the --, therefor.

In Column 29, Line 26, after "client" insert -- . --.

In Column 37-38, Line 11, delete "tx" and insert -- TX --, therefor.

In Column 37-38, Line 16, delete "tx" and insert -- TX --, therefor.

In Column 40, Line 66, delete "lranaction" and insert -- transaction --, therefor.

In Column 44, Line 56, after "server" insert -- . --.

In Column 44, Line 60, after "layer" insert -- . --.

In Column 53, Line 47, delete "pl/sql." and insert -- PL/SQL. --, therefor.

In Column 54, Line 18, delete "that that" and insert -- that --, therefor.

In Column 54, Line 39, delete ""Commit outcome"" and insert -- "Commit_outcome" --, therefor.

Signed and Sealed this
Third Day of November, 2020

Andrei Iancu
*Director of the United States Patent and Trademark Office*

CERTIFICATE OF CORRECTION (continued)
U.S. Pat. No. 10,250,693 B2

In Column 58, Line 67, after "instance" insert -- . --.

In Column 59, Line 13, delete "the a" and insert -- the --, therefor.

In Column 64, Line 66, delete "PI/SQL," and insert -- PL/SQL, --, therefor.

In Column 65, Line 16, delete "COMMITED" and insert -- COMMITTED --, therefor.